United States Patent

[11] 3,590,463

| [72] | Inventors | Robert K. Burroughs<br>Batavia, Ohio;<br>Timothy A. Wakefield, Stillwater, Okla. |
|---|---|---|
| [21] | Appl. No. | 803,744 |
| [22] | Filed | Mar. 3, 1969 |
| [45] | Patented | July 6, 1971 |
| [73] | Assignee | The R. K. LeBond Machine Tool Co.<br>Cincinnati, Ohio<br>Division of Ser. No. 632,055, Apr. 19, 1967,<br>Pat. No. 3,443,310. |

[54] TOOL CHANGING METHOD
13 Claims, 54 Drawing Figs.

| [52] | U.S. Cl. | 29/400, 29/200, 29/208, 29/211, 29/401, 29/568 |
|---|---|---|
| [51] | Int. Cl. | B23p 17/00, B23p 7/00, B23p 19/04 |
| [50] | Field of Search | 29/400, 401, 200, 568, 208, 211 |

[56] References Cited
UNITED STATES PATENTS

| 3,186,085 | 6/1965 | Coate | 29/568 |
|---|---|---|---|
| 3,259,976 | 7/1965 | Bergstrom et al. | 29/568 |
| 3,293,734 | 12/1966 | Buckley | 29/200 |
| 3,309,765 | 3/1967 | Kirsten | 29/401 |
| 3,475,807 | 11/1969 | Wise | 29/400 |

*Primary Examiner*—Thomas H. Eager
*Attorney*—Wood, Herron and Evans

ABSTRACT: A method of changing tools on a lathe or other machine tool having multiple cutting tools mounted in a tool turret. A tool changer which practices and carries out the method is operative to remove and replace a tool in the turret while simultaneously another tool in the turret continues the machining cycle so that the cutting operation is not interrupted for a tool change. To this end, a tool transfer slide for transporting tools between the tool turret and a storage matrix is operative to seek, track, "lock onto" and move in synchronization with the tool turret during removal of a tool from the turret and replacement of a new tool.

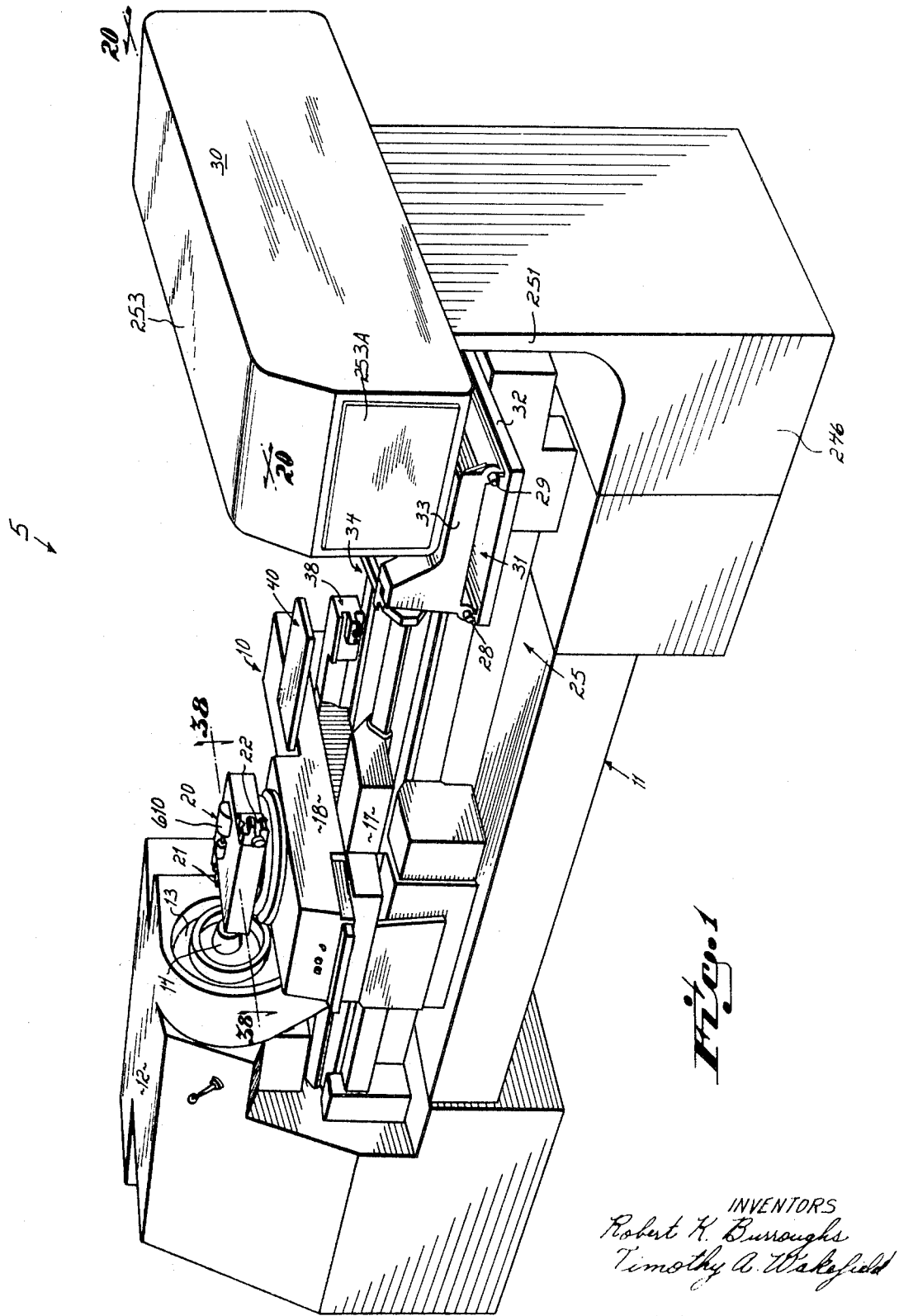

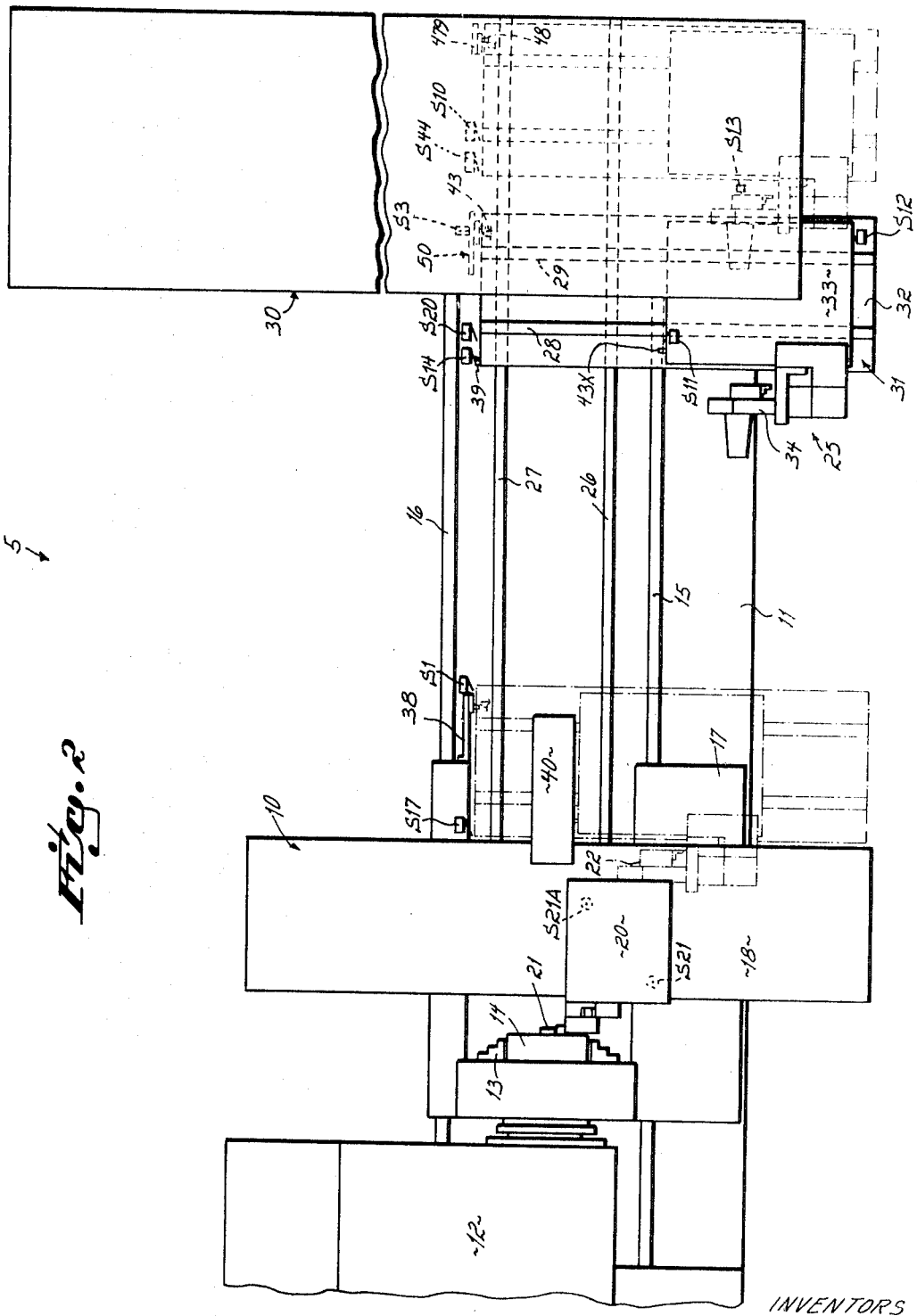

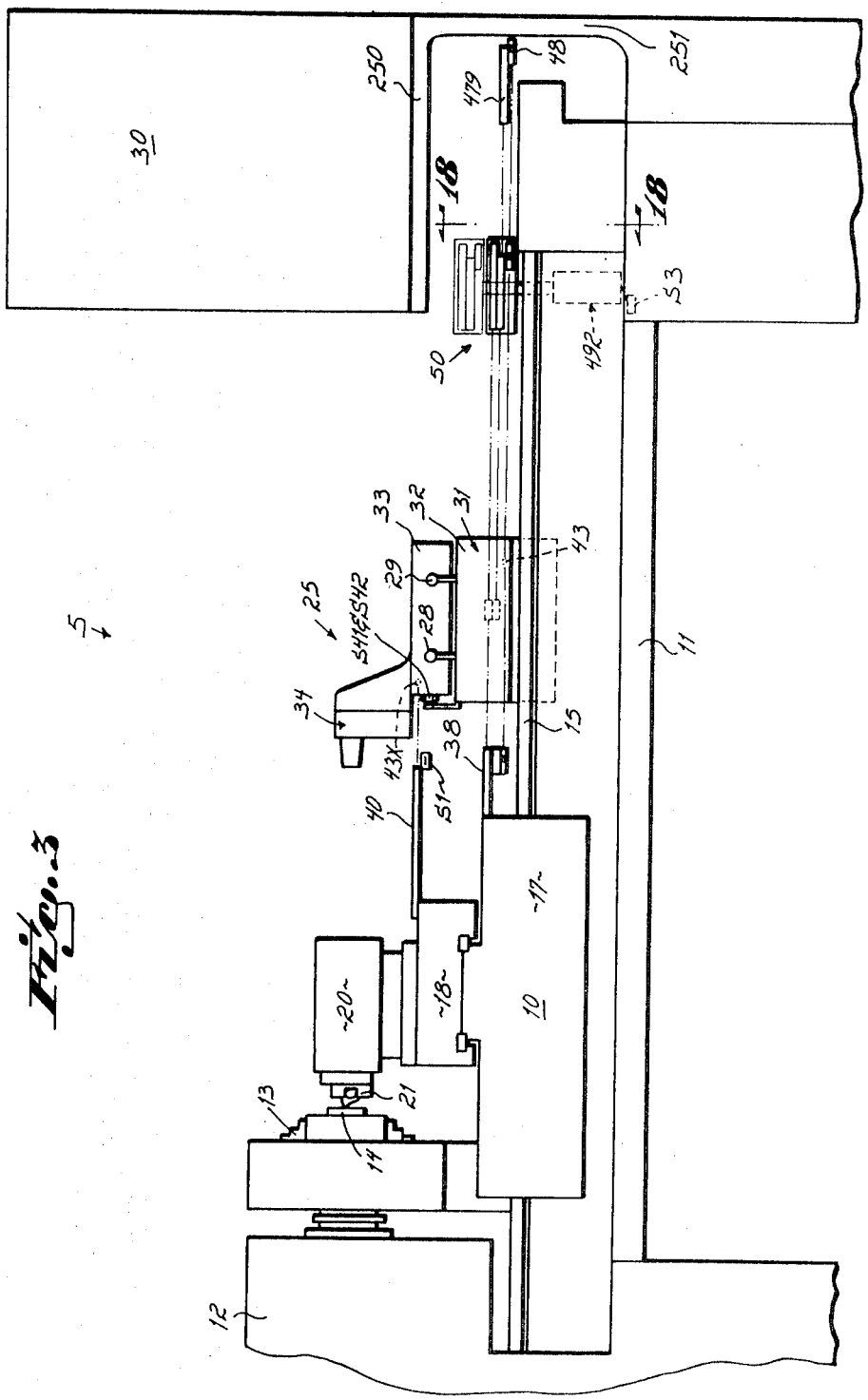

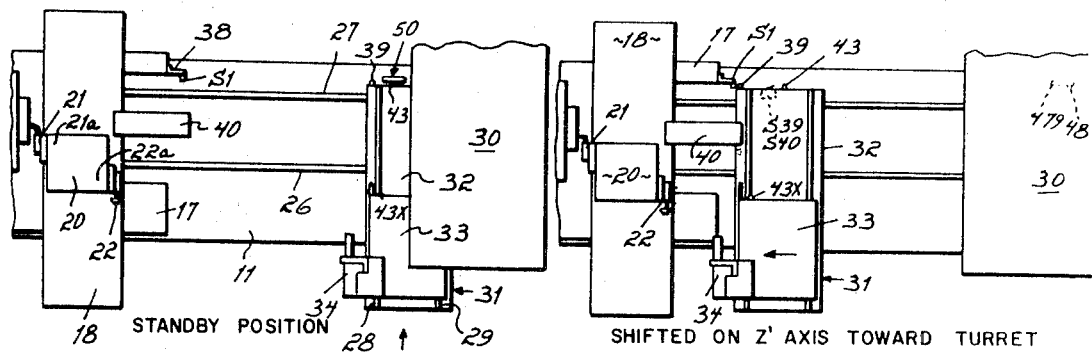
Fig. 4 STANDBY POSITION
Fig. 5 SHIFTED ON Z' AXIS TOWARD TURRET
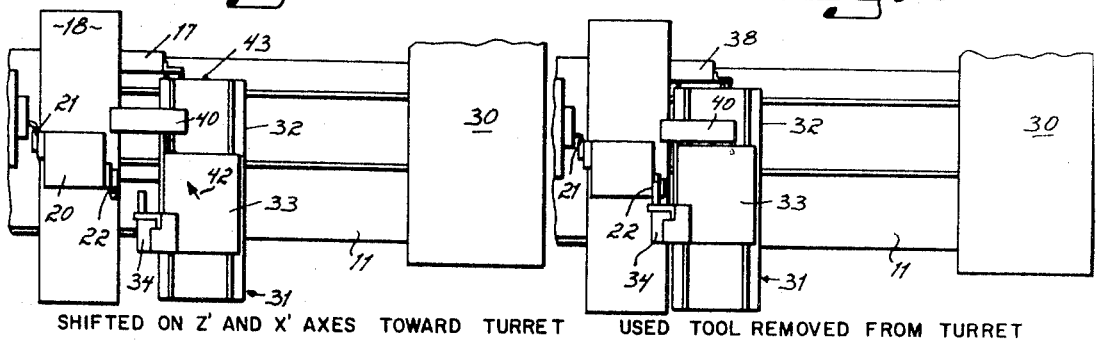
Fig. 6 SHIFTED ON Z' AND X' AXES TOWARD TURRET
Fig. 7 USED TOOL REMOVED FROM TURRET
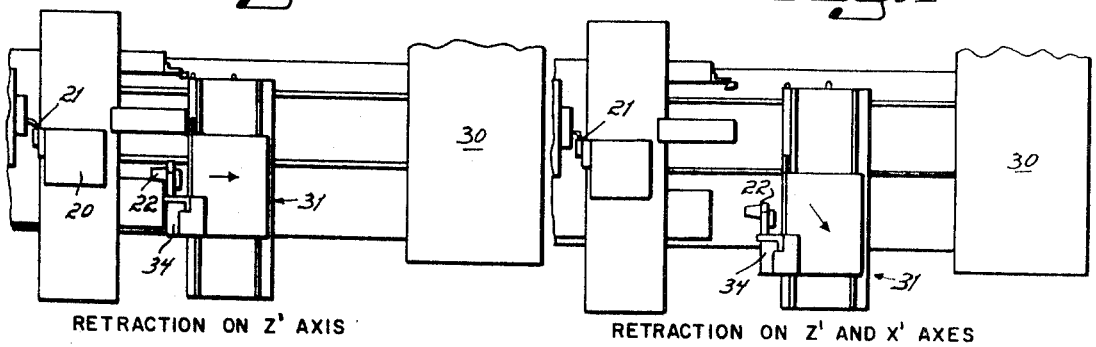
Fig. 8 RETRACTION ON Z' AXIS
Fig. 9 RETRACTION ON Z' AND X' AXES
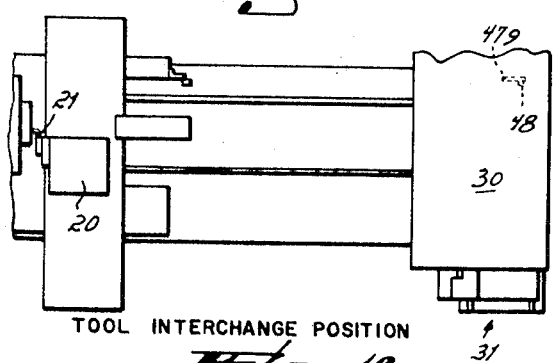
Fig. 10 TOOL INTERCHANGE POSITION
INVENTORS
Robert K. Burroughs
Timothy A. Wakefield
ATTORNEYS

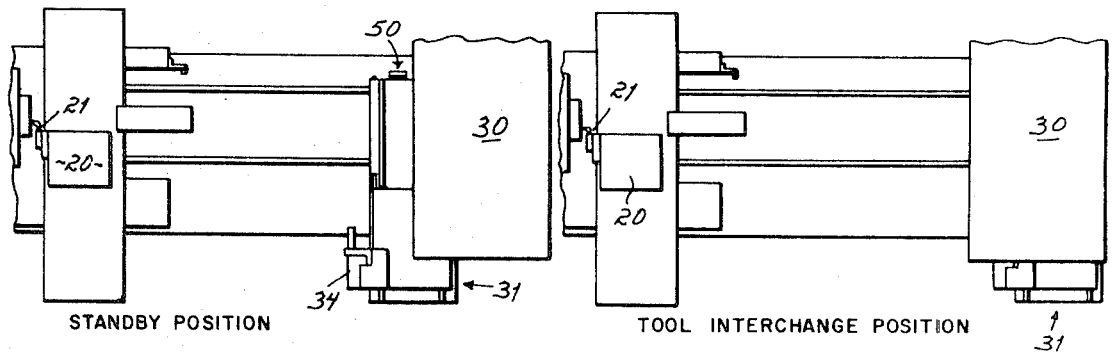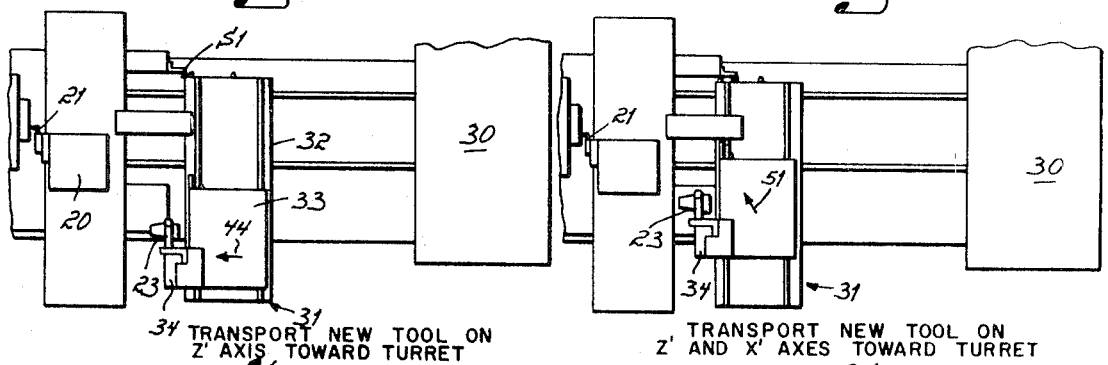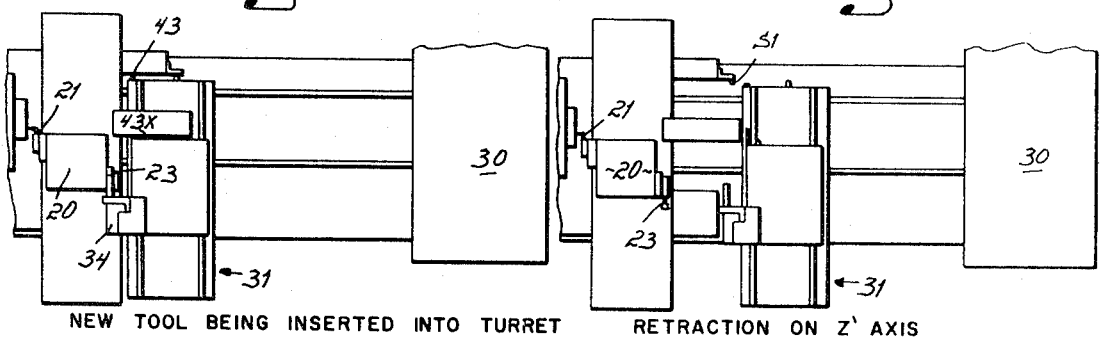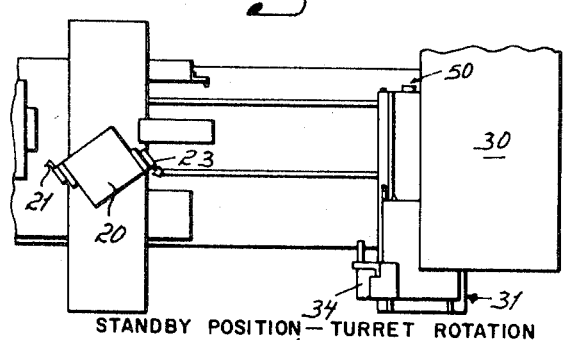

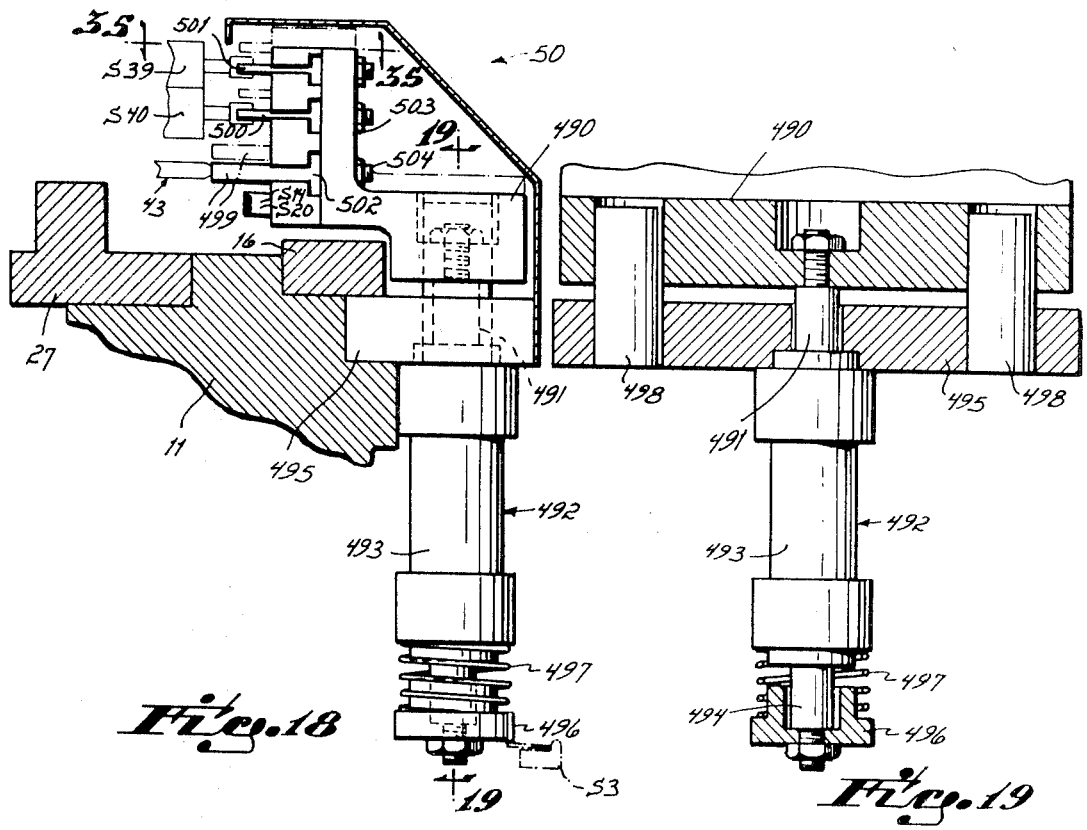

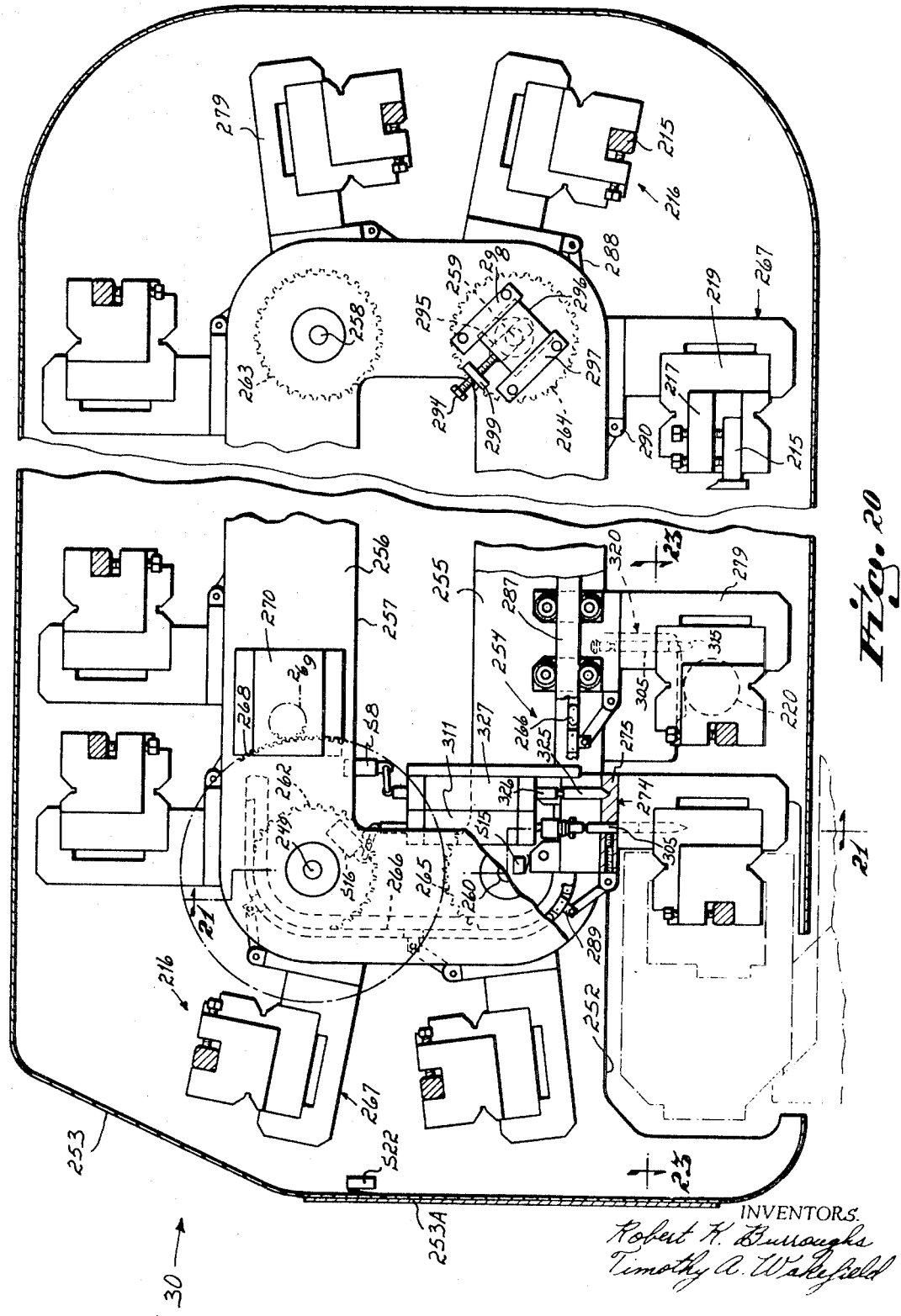

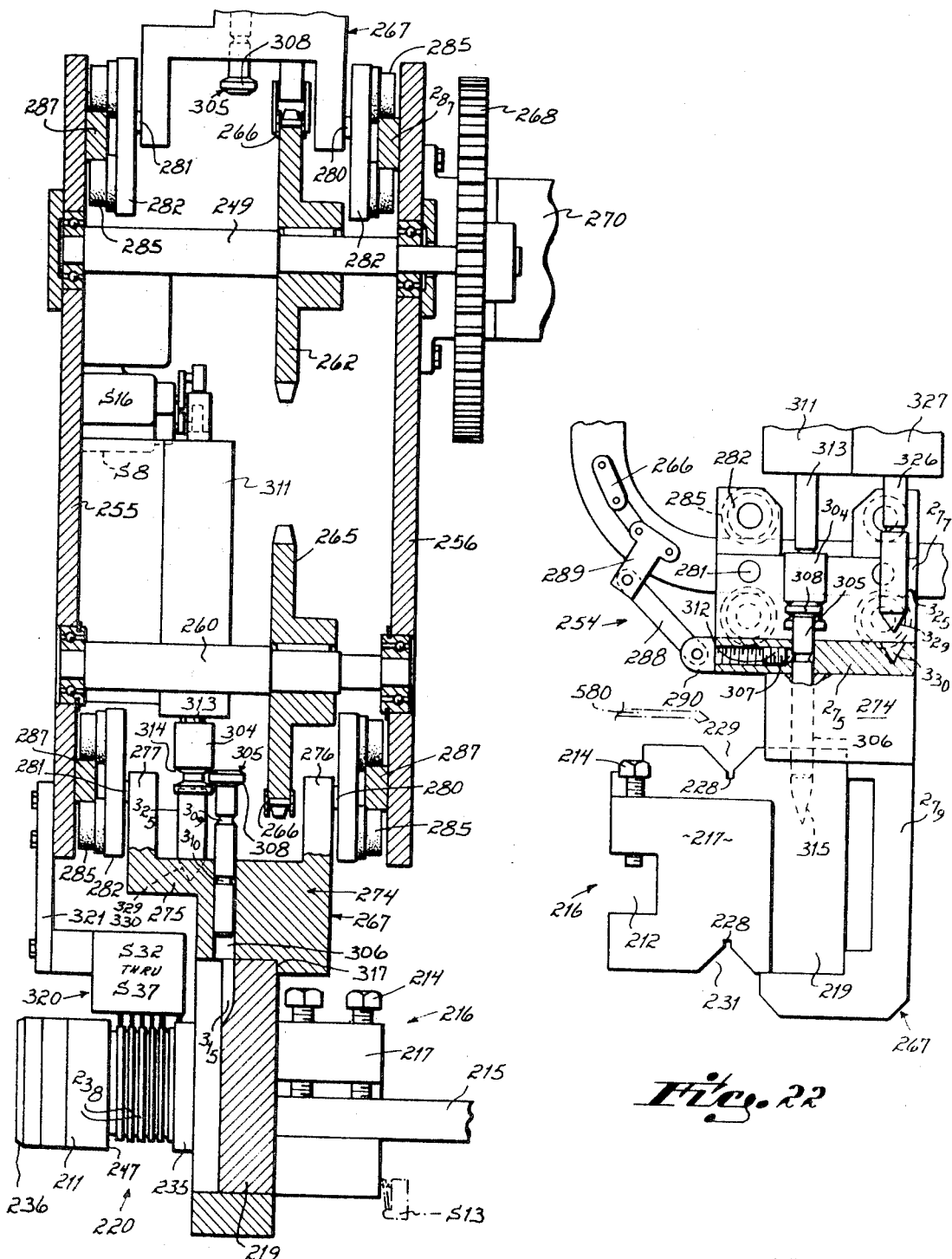

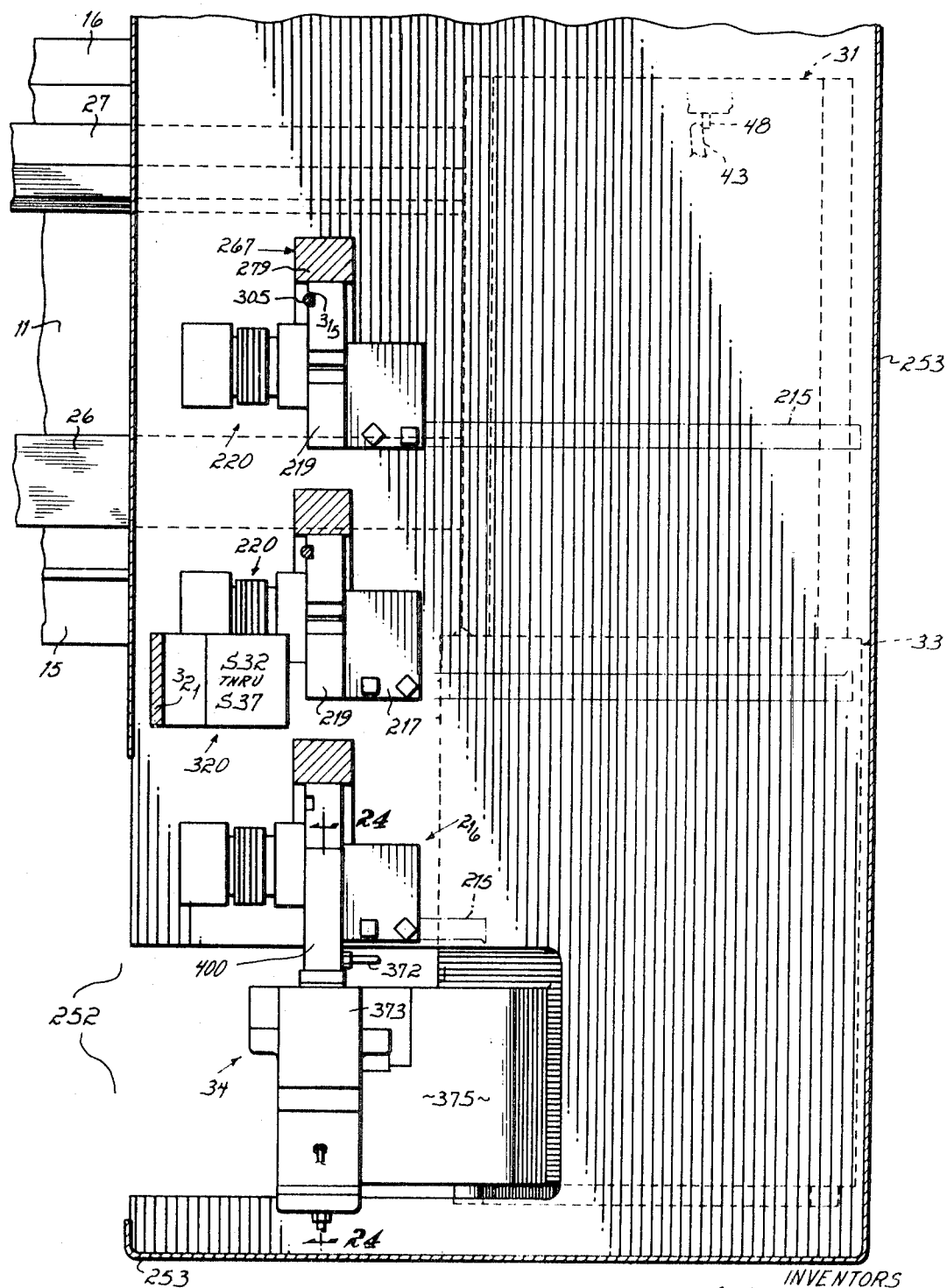

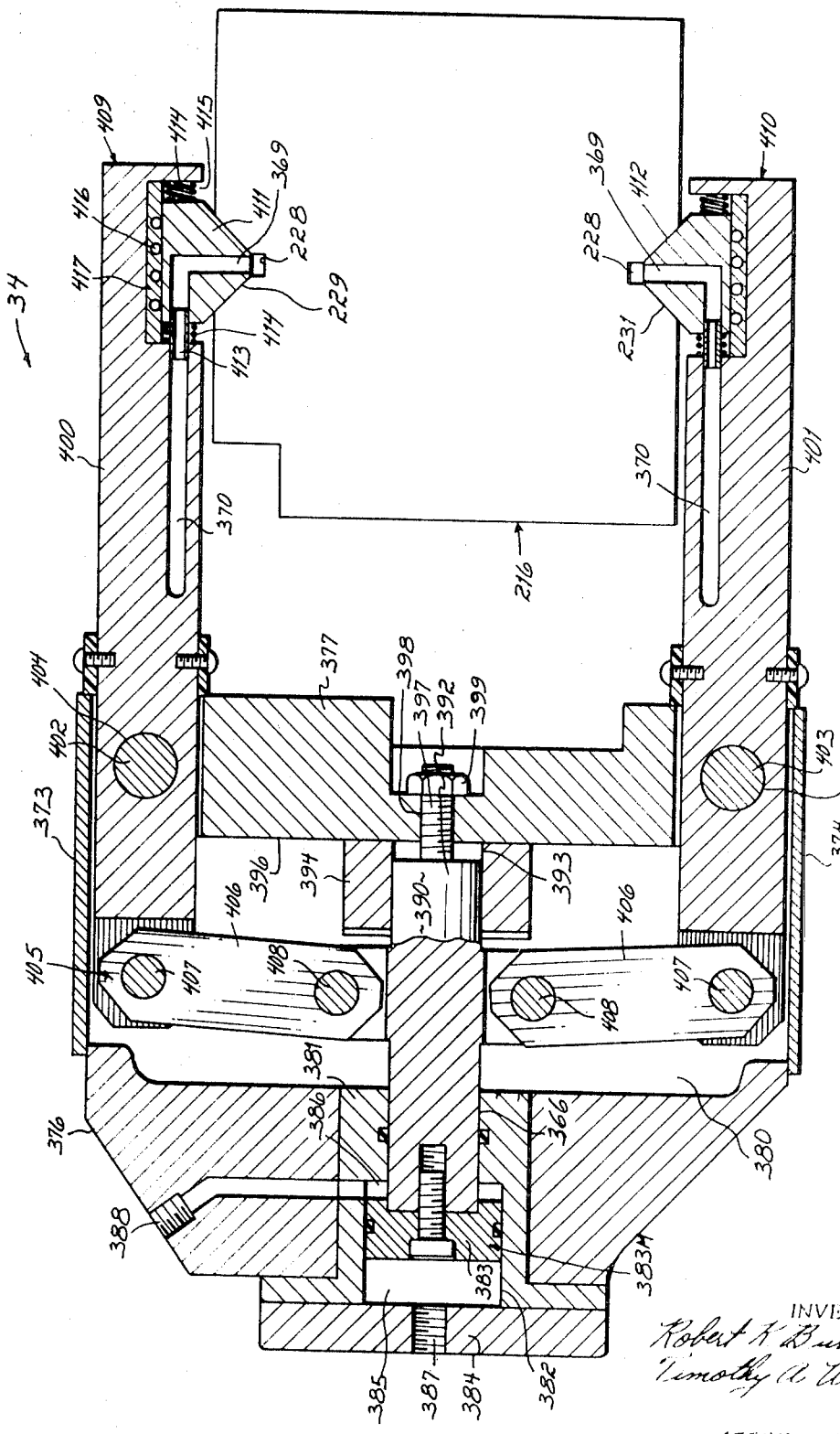

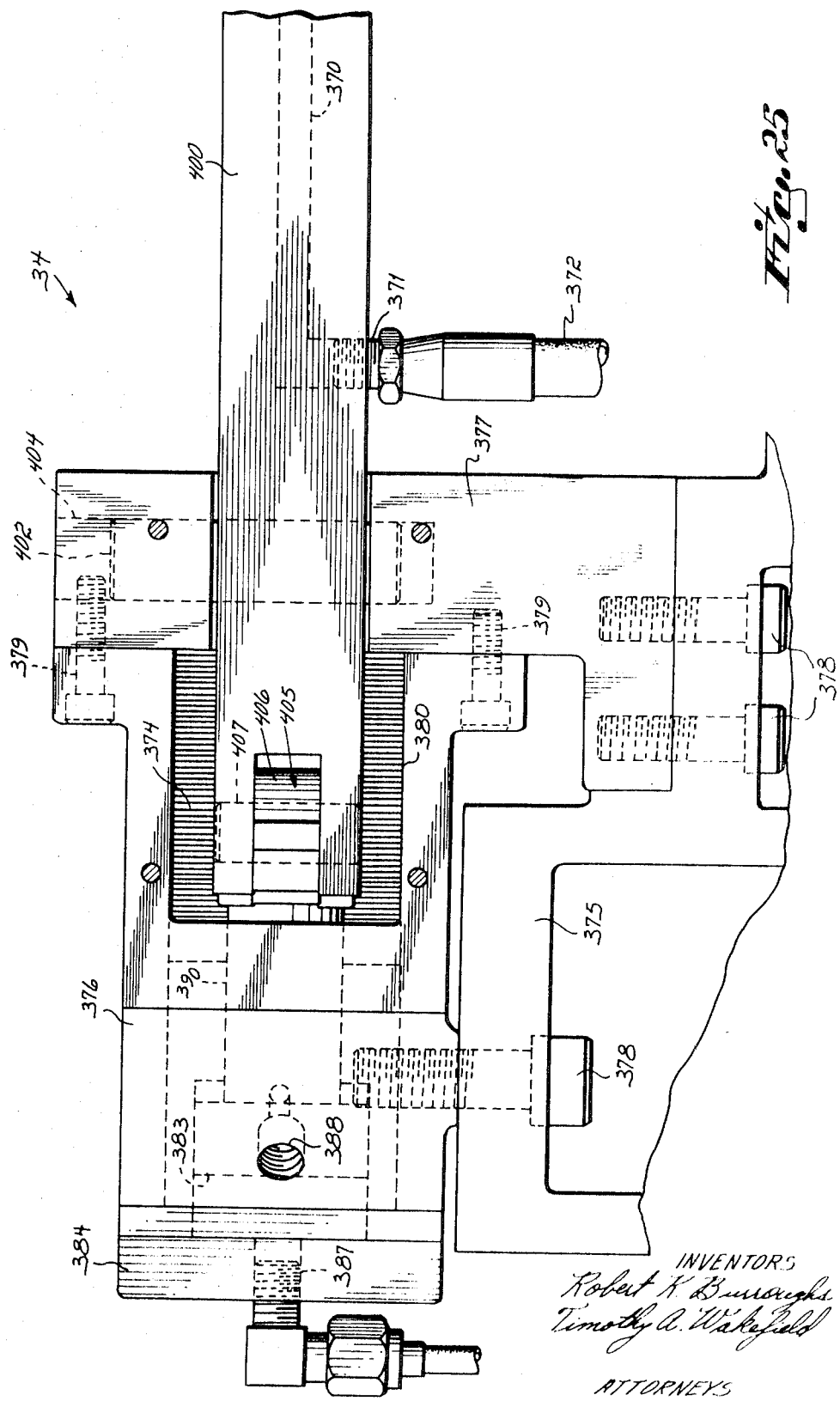

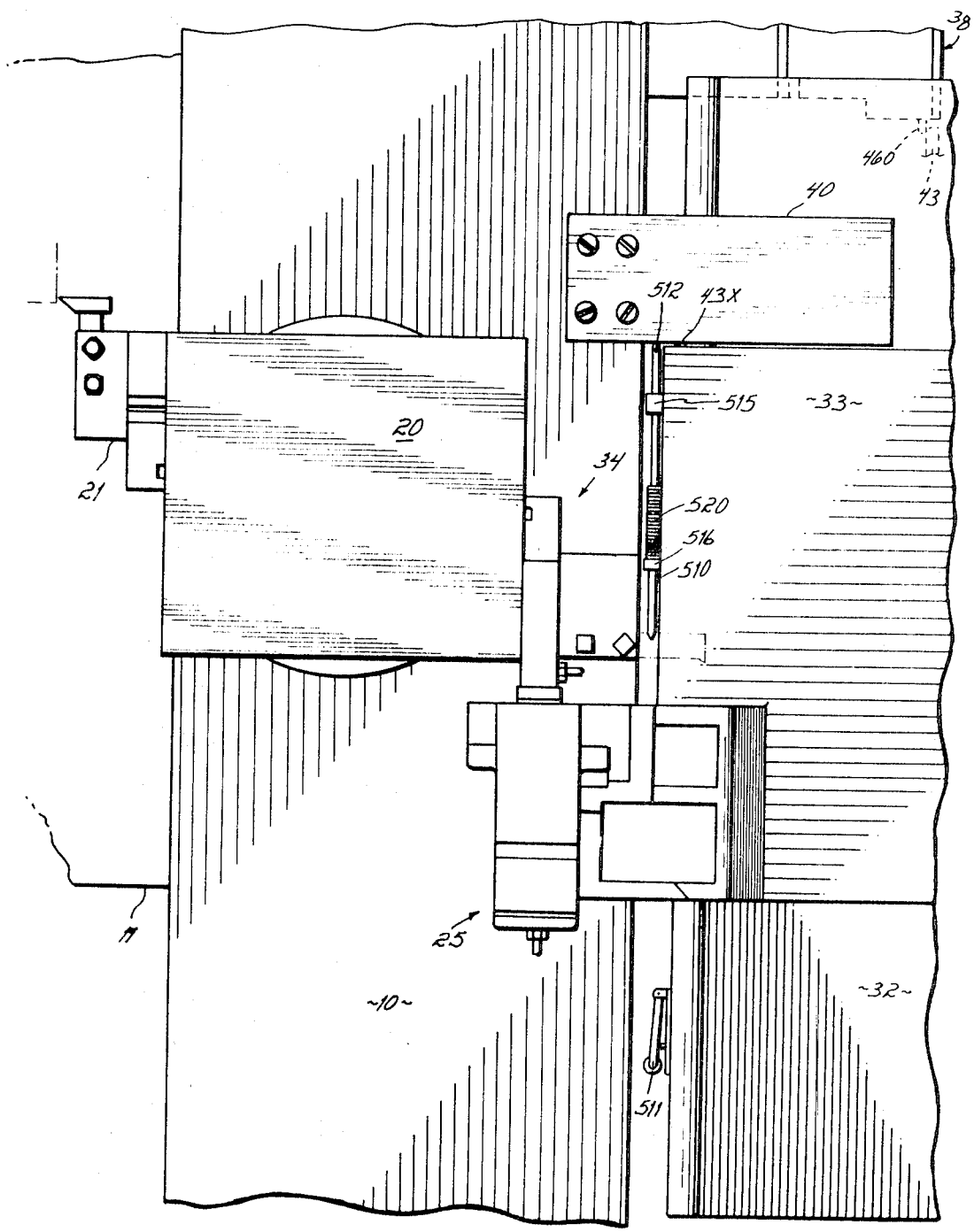

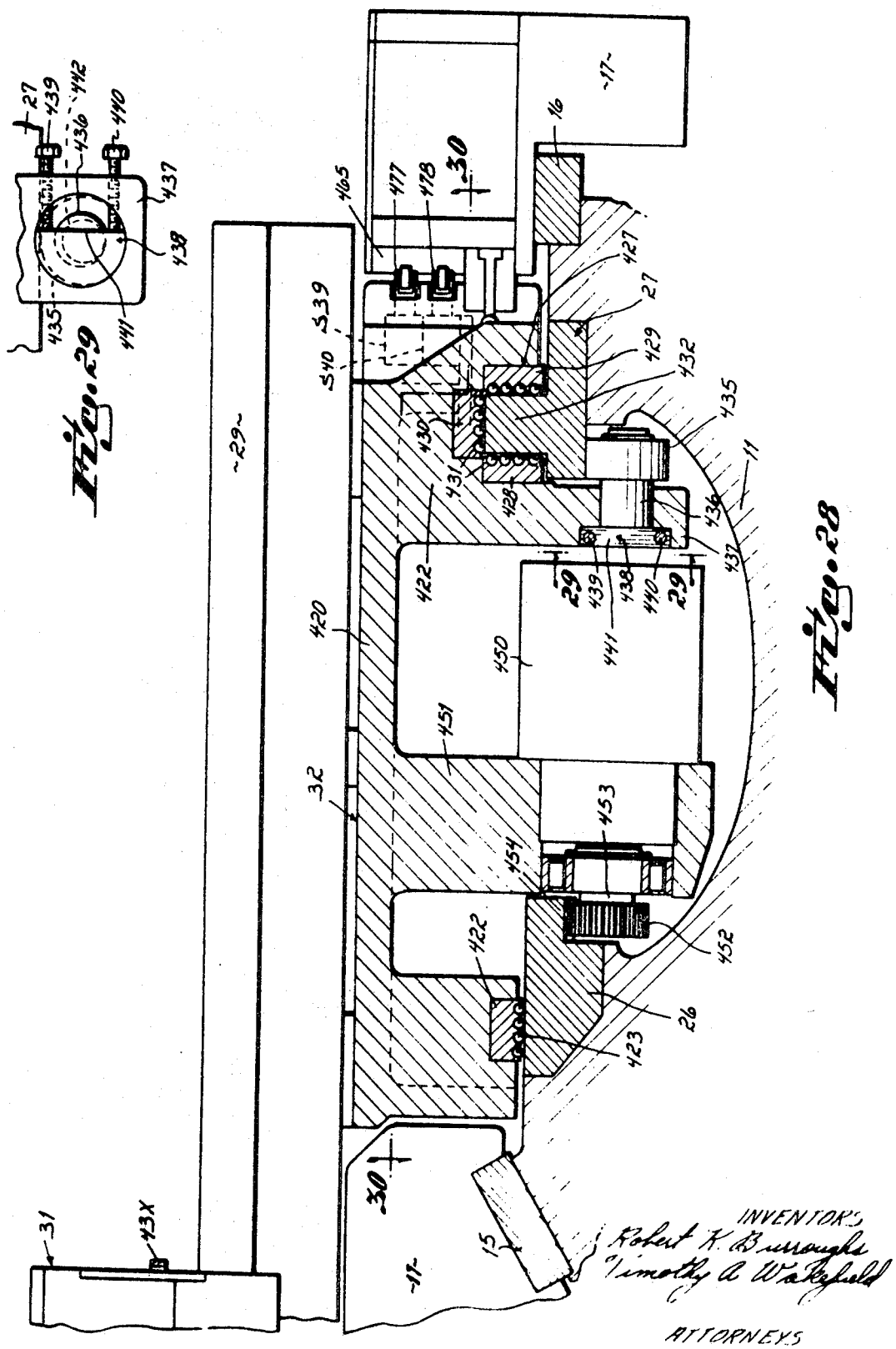

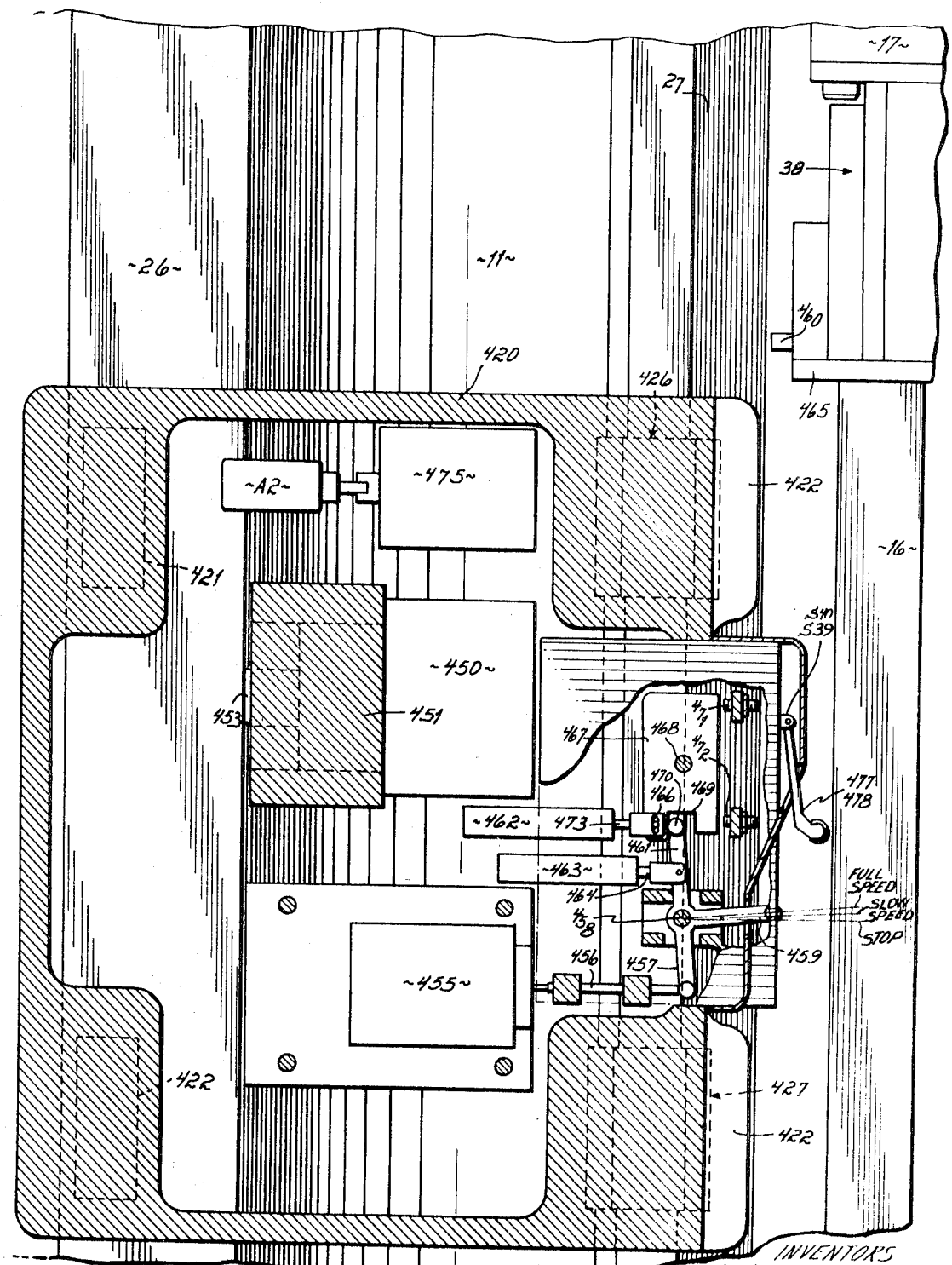

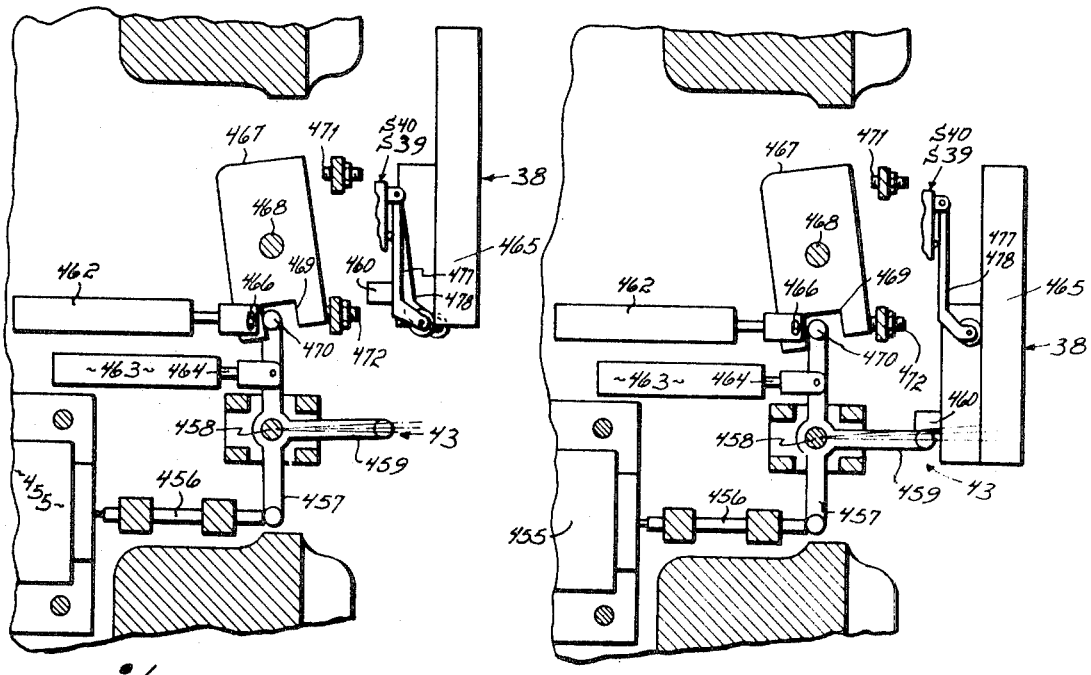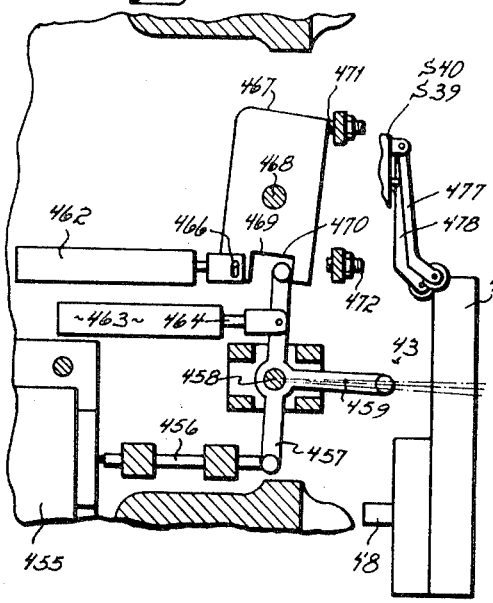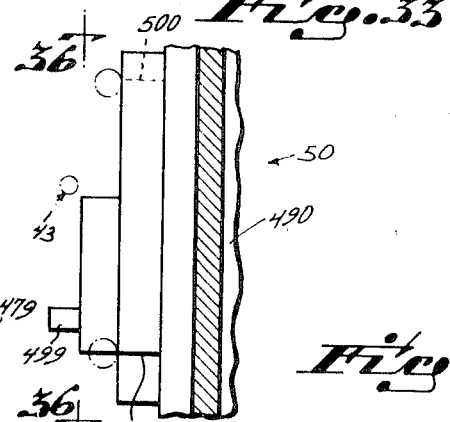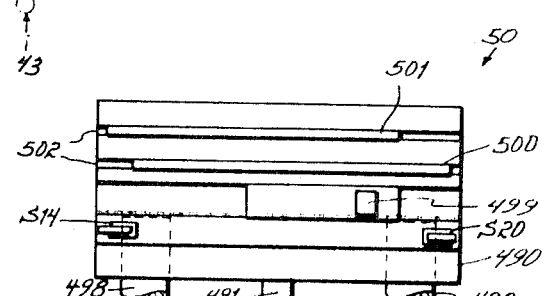

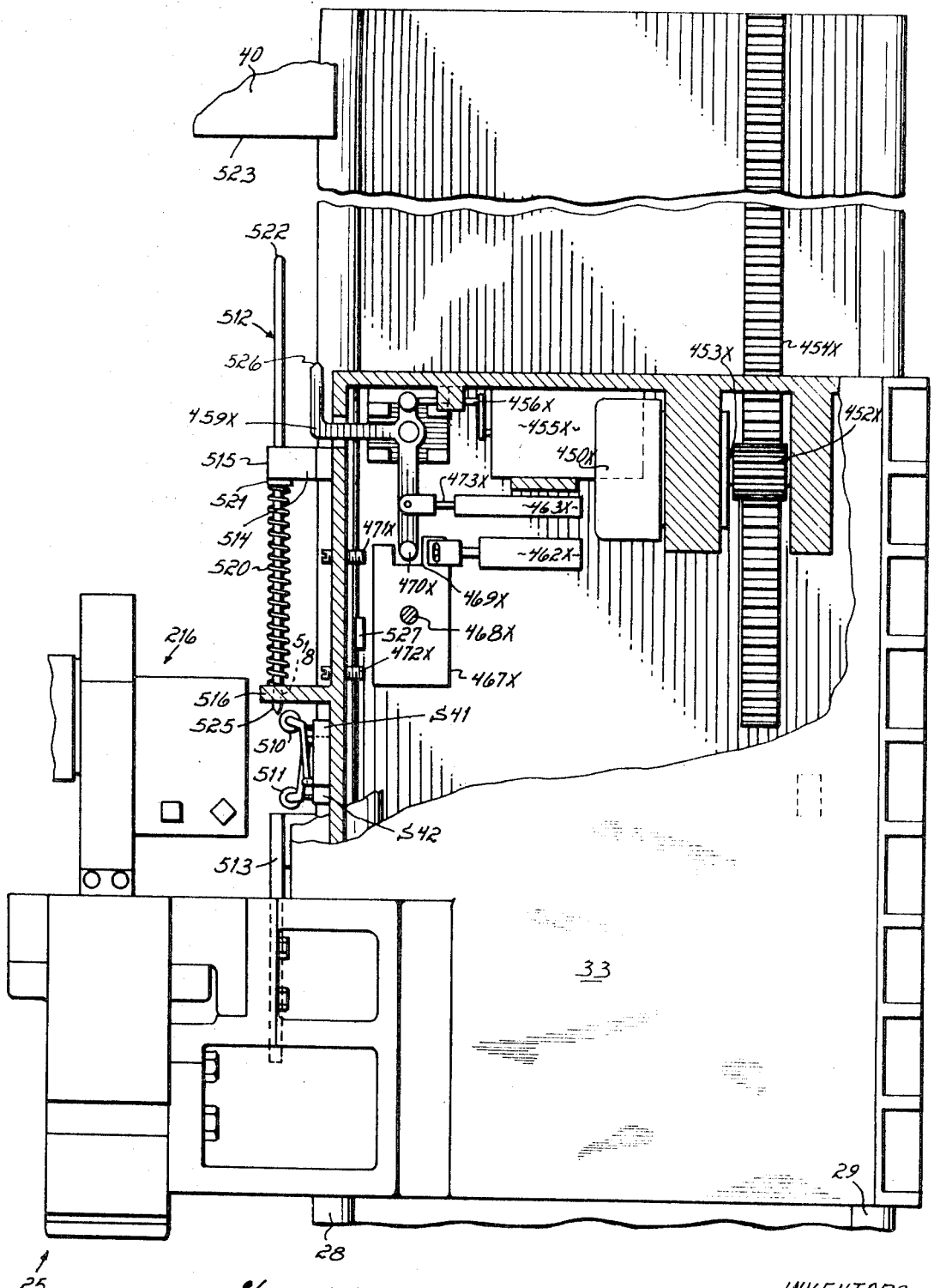

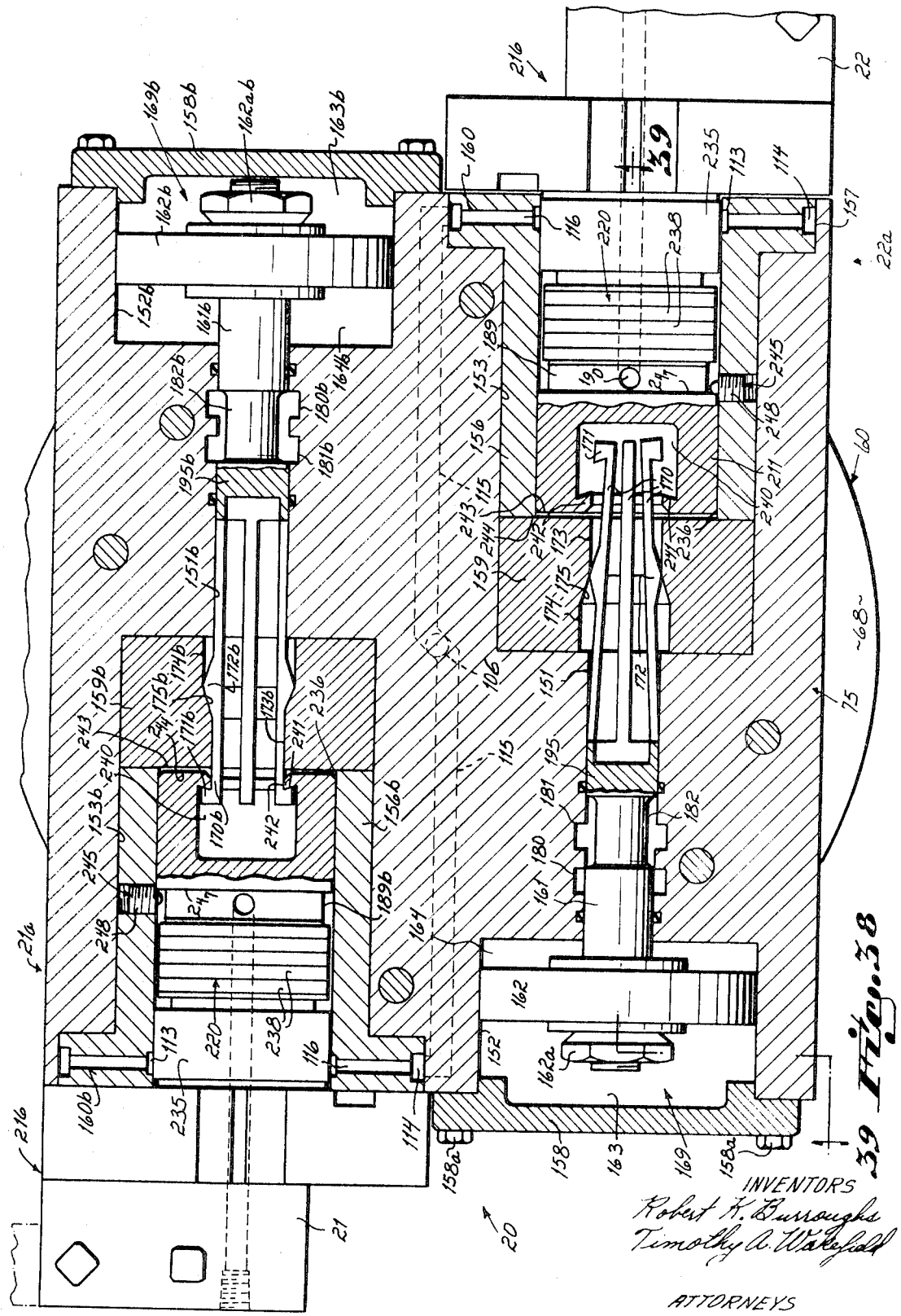

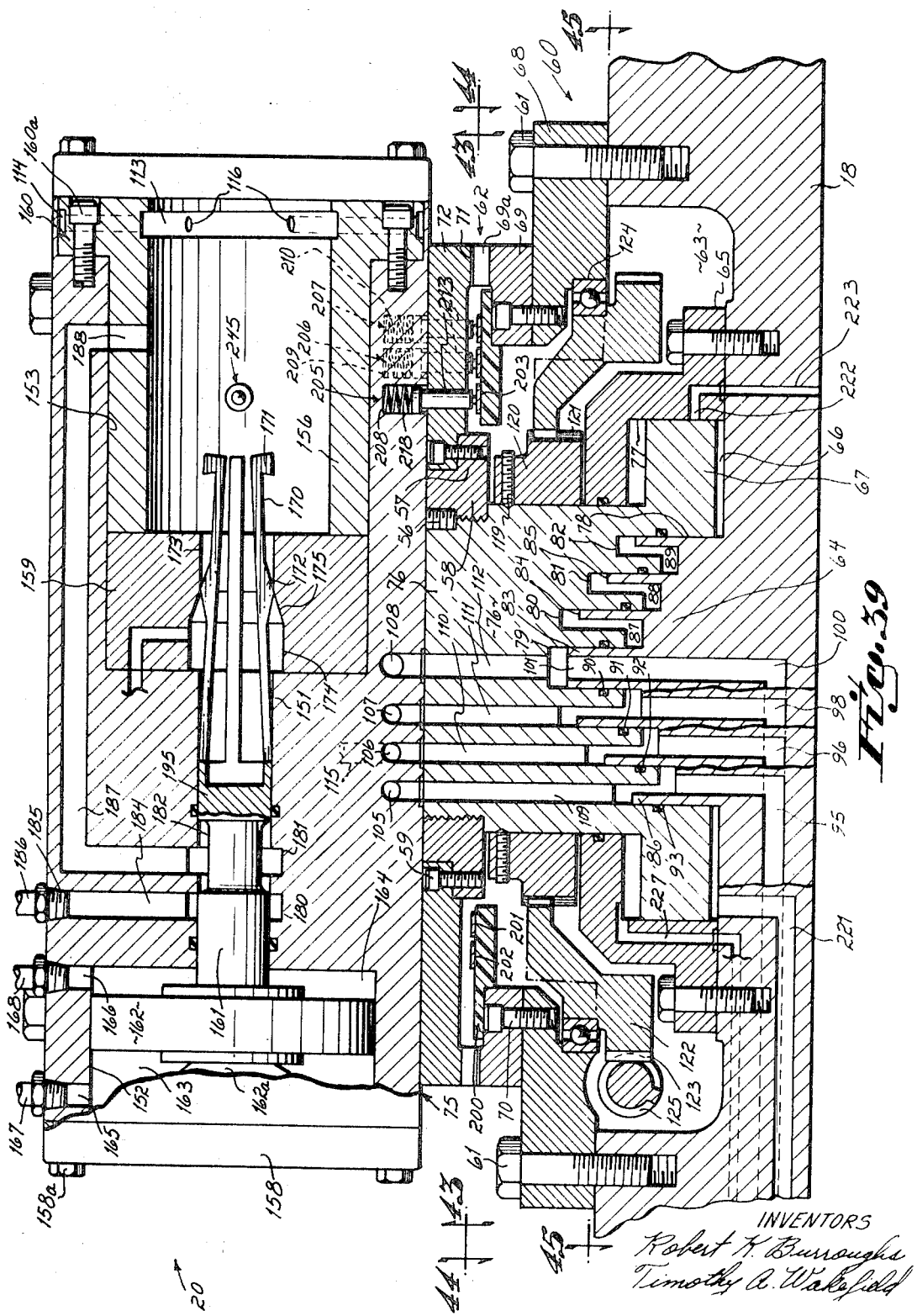

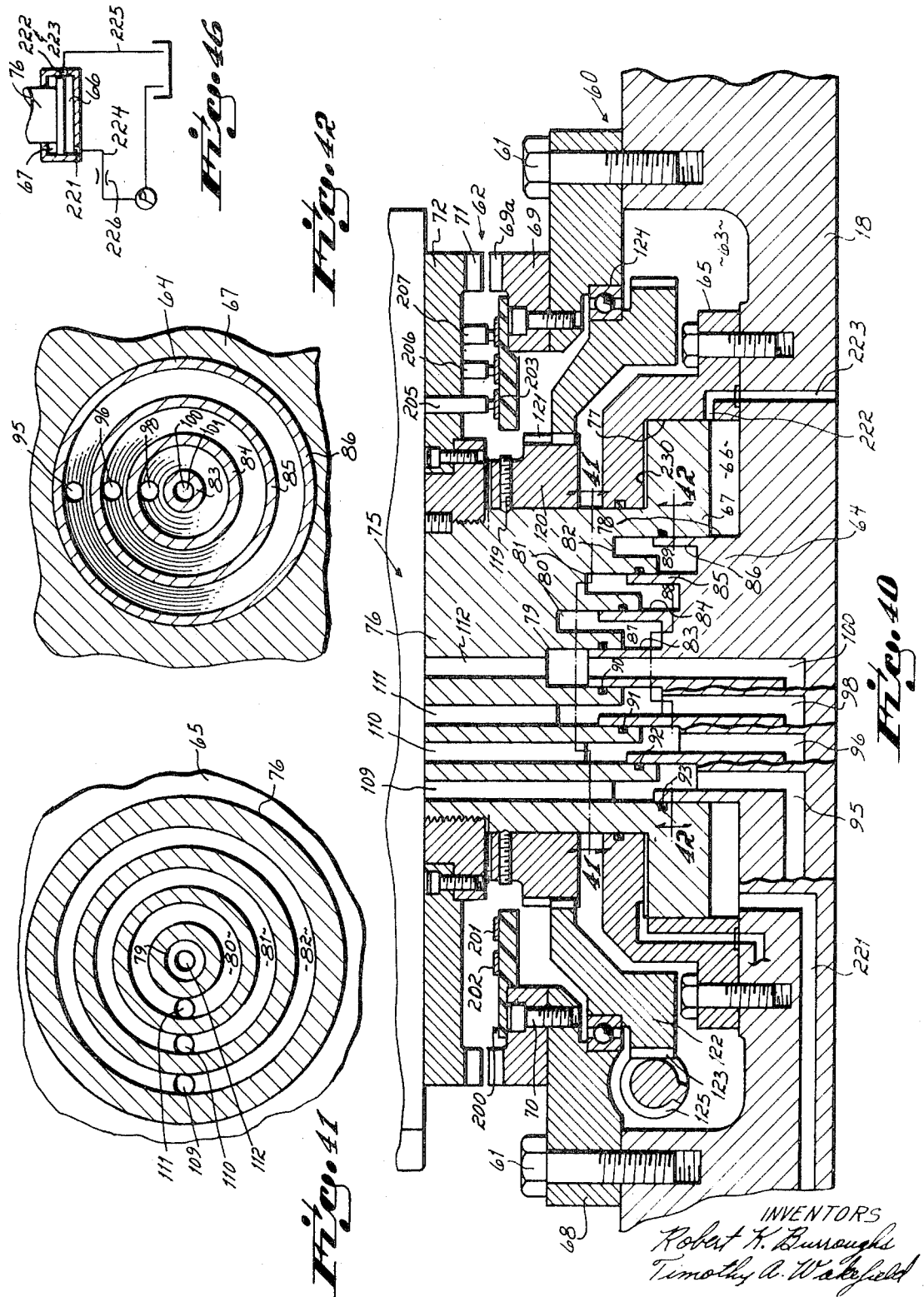

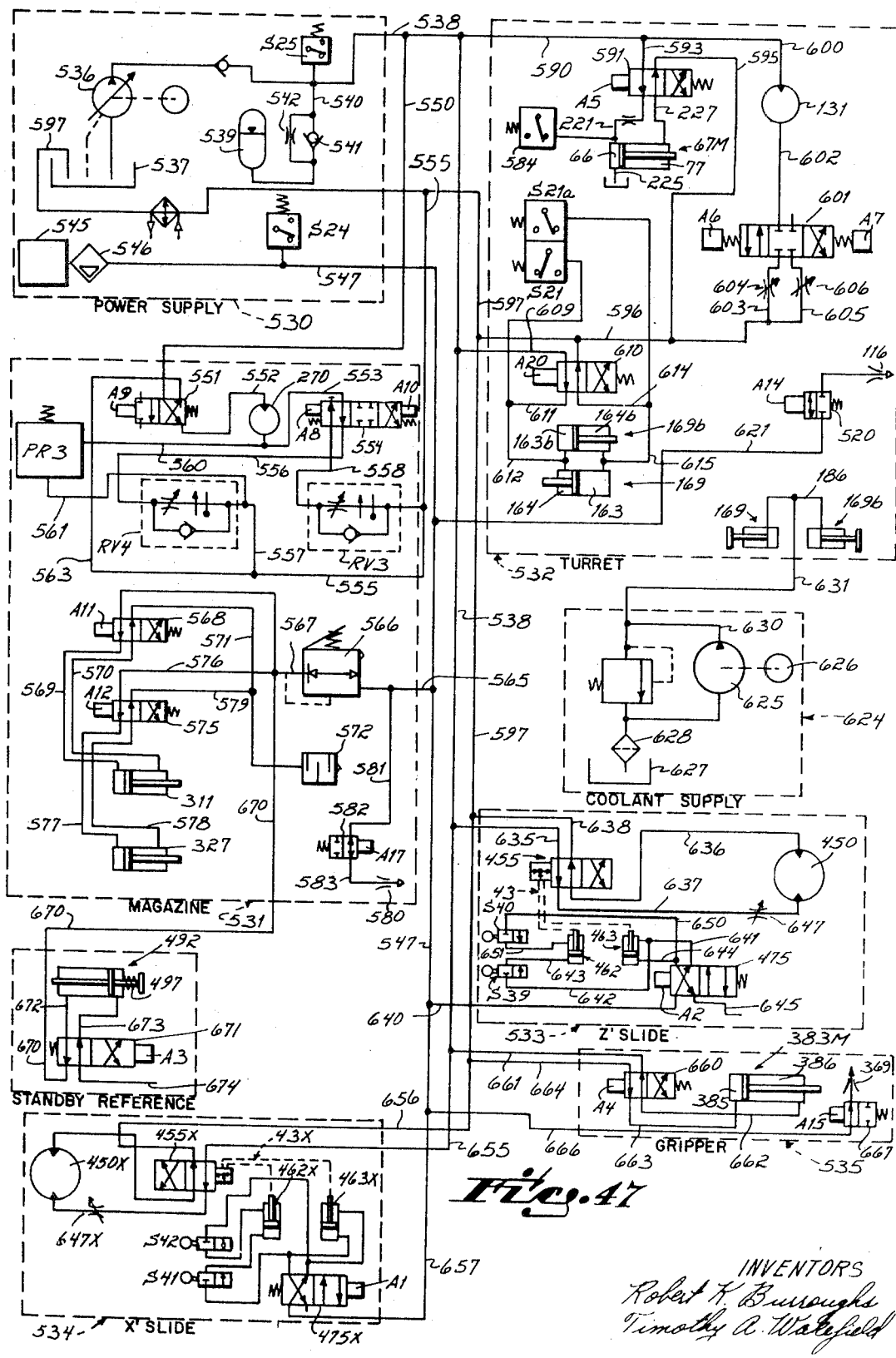

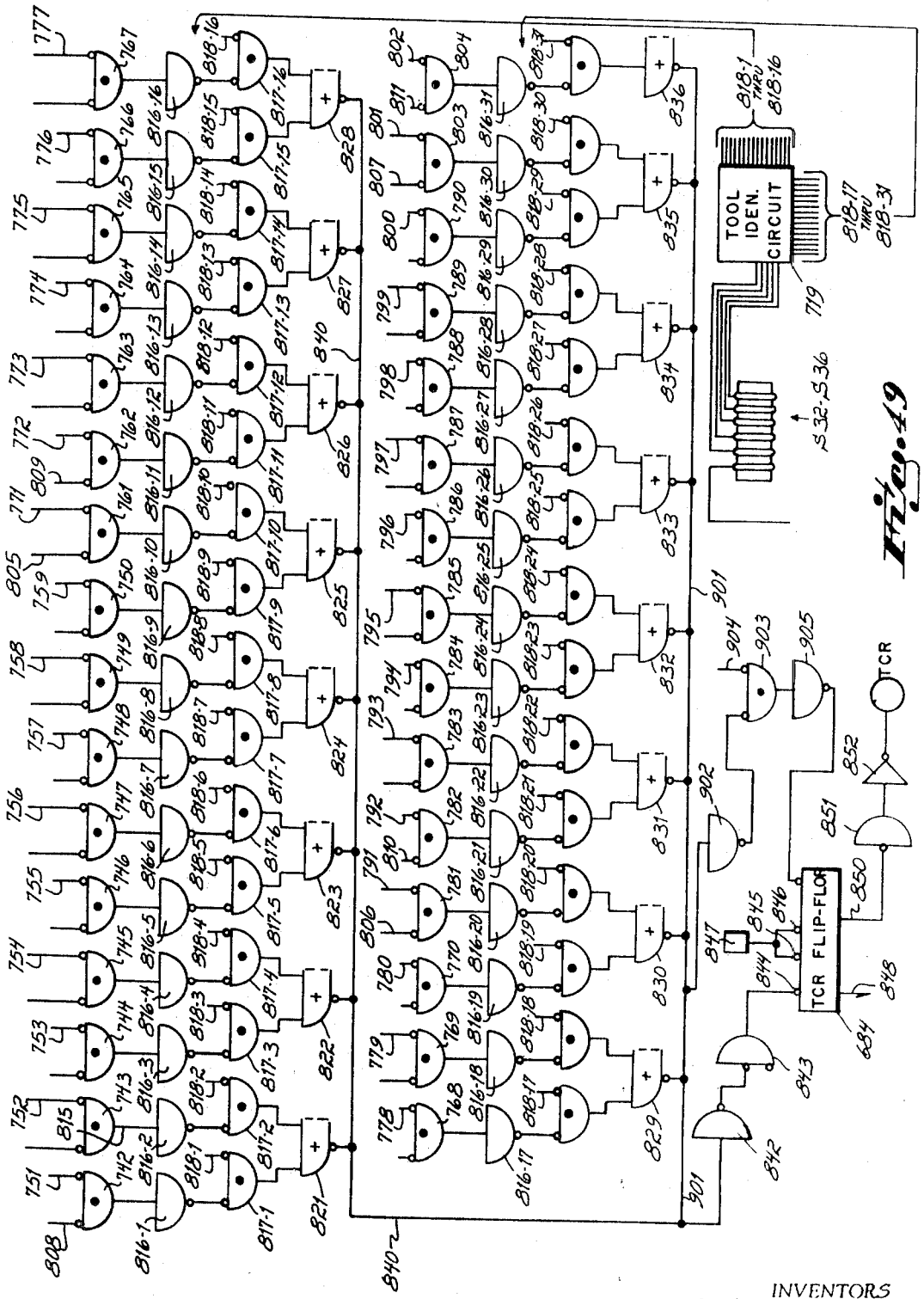

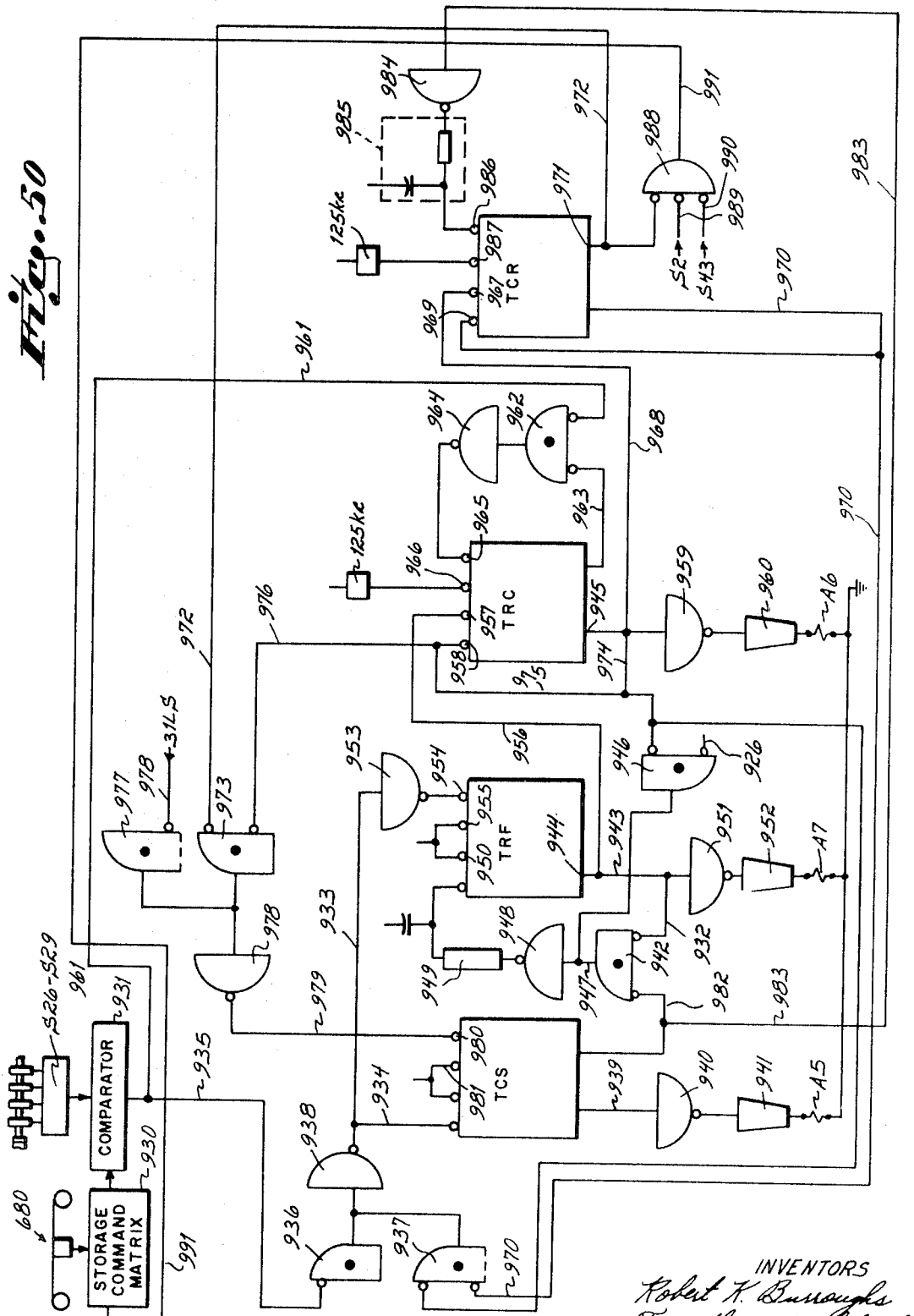

TOOL CHANGING METHOD

This application is a Division of application Ser. No. 632,055, filed Apr. 19, 1967 for "Tool Changing Apparatus" now U.S. Pat. No. 3,443,310 granted May 13, 1969, and assigned to the assignee of this application.

Tool changers have long been known and commercially available for use in conjunction with automatically programmed machine tools. One of the basic advantages of a machine equipped with an automatic tool changer over one which requires manual replacement of the tools is the savings which the tool changer effects in "down time" of the machine. Because the multiple tools of an automatic tool changer type of machine are stored in a magazine which is completely independent of the machine operation, tools may be removed from the magazine, replaced, sharpened, reset, etc., without stopping the machine. In this way, the machine's idle or down time for these functions is minimized.

While prior art tool changers have sharply reduced machine set up and tool replacement time, they have not eliminated the idle time required for the changer to replace tools in the tool holder. All of the prior tool changers and tool changing methods of which we are aware require that the machine cutting cycle be completely stopped for whatever time is required to remove a tool from the tool holder and replace it with a new one. Furthermore, all of these prior tool changers or methods require the tool holder to be moved away from the workpiece to a tool changing station and moved back to the workpiece after the tool is replaced. Since time taken for changing tools is time taken away from cutting or productive machining time, it is preferable to reduce or even eliminate it.

It has, therefore, been a primary objective of this invention to provide a tool changing method which substantially reduces, and in most machining cycles, completely eliminates machine down time for tool changes. In other words, it has been an objective of this invention to provide a tool changing method which is noninterruptive of the machine cycle or machine cutting time.

The tool changing method of this invention is illustrated and described as applied to a lathe although it should be appreciated that this invention is equally applicable to other machine tools and particularly to those having nonrotatable cutting tools movable along two perpendicular axes for cutting a contoured workpiece.

The lathe to which this invention is applied is a turret type machine having at least two tool posts or stations for mounting cutting tools. In the preferred embodiment, there are two diametrically opposed tool stations in the turret. While a tool on one side of the turret is machining a workpiece, the tool on the other side of the turret is idle and accessible for replacement.

Basically, the tool changer comprises a tool storage magazine or matrix and a transfer slide operative to transport tools between the turret and magazine. A tool gripper mounted upon the transfer slide is cooperable with a portion of each tool to releasably clamp the tool for movement with the slide.

Changing of the tools is accomplished automatically in accordance with a predetermined program or schedule derived from a tape reader or any other conventional source of programmed data. The scheduling of a tool change is such that the changing of one tool in the turret is initiated while the other tool is engaged with a workpiece.

To replace a tool in the turret, the tool transfer carriage or slide is first moved to a servo tracking or "lock one" position relative to the turret at which the movement of the carriage is locked into synchronization with the movement of the turret. While the movements are synchronized, the tool gripper of the transfer carriage is actuated to engage and grip the idle tool in the turret. At this time interval in the tool change cycle, both the turret and transfer slide are usually in motion since the tool of the turret which is not in the process of being changed is continuing its machining operation. The transfer carriage is then moved relative to the turret in a direction to extract the idle tool from the turret. Thereafter, the transfer carriage transports the tool to the tool storage magazine, places it in the magazine, and picks up a new tool from the magazine. The new tool is then conveyed by the transfer slide back to the "lock on" or synchronized position in which the new tool is inserted into the turret while the turret continues to move relative to a workpiece and while another tool in the turret continues to machine the workpiece. The transfer slide is then withdrawn to a standby position while the turret continues its machining cycle. When the machining cycle is complete, the new tool is clamped in the turret and the turret is indexed so as to present the new tool to the workpiece. Thus, no machine time is lost as a consequence of the tool changing operation.

One advantage of the tool changer which practices the invention of this application is its ability to locate or find the tool slide or turret irrespective of where it is or in which direction it is moving along either of the two axes along which it is movable. Even if the tool is not changed while the machining operation is in progress, this ability of the tool transfer slide to find the tool turret enables machine time to be saved since a tool may be changed without the tool slide having to be moved away from the workpiece to a "home" or tool change position along one or both of the axes and then moved back to the workpiece after the tool change.

Another advantage of the tool changer practicing the invention of this application is its ability to transfer tools between the tool holder and magazine with a minimum of tool movements. Reduction in the number of movements reduces the complexity of the equipment required to effect the movements and consequently the cost of the equipment. This tool changer substantially reduces tool movements between the tool holder and magazine by using a single nonrotatable tool gripper to transfer the tools while maintaining tool orientation relative to both the magazine and the holder.

These and other objects and advantages of the present invention will be more readily apparent from a consideration of the following detailed description of the drawings in which:

FIG. 1 is a perspective view of a lathe provided with the tool changing apparatus of the present invention.

FIG. 2 is a semidiagrammatic top elevational view of the lathe.

FIG. 3 is a semidiagrammatic front elevational view.

FIG. 4 is a diagrammatic top plan view showing the tool transfer carriage in its standby position.

FIG. 5 is a diagrammatic top plan view showing the tool transfer carriage being shifted along the Z' axis toward the tool turret.

FIG. 6 is a diagrammatic top plan view showing the tool transfer carriage as it continues to move toward the tool turret along the Z' axis and showing the tool transfer cross-slide being shifted toward the turret along the X' axis.

FIG. 7 is a diagrammatic top plan view showing a previously used tool being removed from the turret by the tool changer.

FIG. 8 is a diagrammatic top plan view showing the tool transfer carriage being retracted along the Z' axis.

FIG. 9 is a diagrammatic top plan view showing the continued movement of the tool transfer carriage along the Z' axis and movement of the tool transfer slide along the X' axis.

FIG. 10 is a diagrammatic top plan view showing the tool transfer carriage in its tool interchange position in which the previously used tool is being deposited in a module of a magazine.

FIG. 11 is a diagrammatic top plan view showing the tool transfer carriage returned to the standby position.

FIG. 12 is a diagrammatic top plan view showing the tool transfer carriage returned to its tool interchange position in which it is picking up a new tool from another module of the magazine.

FIG. 13 is a diagrammatic top plan view showing the tool transfer carriage transporting a new tool along the Z' axis toward the tool turret.

FIG. 14 is a diagrammatic top plan view showing continued movement of the tool transfer carriage along the Z' and X' axes toward the tool turret.

FIG. 15 is a diagrammatic top plan view showing a new tool being inserted into the tool turret.

FIG. 16 is a diagrammatic top plan view showing the tool transfer carriage being retracted along the Z' axis toward its standby position.

FIG. 17 is a diagrammatic top plan view showing a tool turret being rotated to present the new tool to the workpiece with the tool transfer carriage returned to its standby position.

FIG. 18 is a cross-sectional view of the standby control switch actuators taken along line 18–18 of FIG. 3.

FIG. 19 is a cross-sectional view of a portion of the standby control switch actuator taken along line 19–19 of FIG. 18.

FIG. 20 is a cross-sectional view through the tool storage magazine taken along line 20–20 of FIG. 1.

FIG. 21 is a cross-sectional view through the tool storage magazine taken along line 21–21 of FIG. 20.

FIG. 22 is an enlarged cross-sectional view of the tool transfer station portion of the tool storage magazine of FIG. 20, particularly illustrating the conveyor structure and the mechanism for locking a tool in a module of the magazine.

FIG. 23 is a cross-sectional view through a portion of the magazine taken along line 23–23 of FIG. 20, and particularly illustrating the gripper of the tool transfer carriage in the tool interchange position.

FIG. 24 is a cross-sectional view of the gripper of the tool transfer carriage, taken along line 24–24 of FIG. 23.

FIG. 25 is a top plan view of the tool gripper portion of the tool transfer carriage with the top cover plate removed.

FIG. 27 is a top plan view of the tool transfer carriage and turret as the tool is inserted into the turret.

FIG. 28 is a cross-sectional view of the tool transfer Z' slide taken along line 28–28 of FIG. 26.

FIG. 29 is a side elevational view of the Z' slide clearance takeup mechanism taken along line 29–29 of FIG. 28.

FIG. 31 is a cross-sectional view similar to FIG. 30 illustrating the Z' slide intermediate the standby position and the turret.

FIG. 32 is a cross-sectional view of a portion of the Z' slide deceleration and synchronized movement control system of FIG. 29, illustrating the control in the deceleration mode while traveling toward the turret.

FIG. 33 is a view similar to FIG. 32 illustrating the Z' slide control system in the synchronized movement mode of control.

FIG. 34 is a view similar to FIG. 30 but illustrating the Z' slide control system in its deceleration mode while traveling away from the turret toward the tool interchange position.

FIG. 35 is a cross-sectional view of the Z' standby position control cams, taken along line 35–35 of FIG. 18.

FIG. 36 is a side elevational view of the standby position control cams, taken along line 36–36 of FIG. 35.

FIG. 37 is a top plan view, partially broken away, of the X' slide of the tool transfer carriage illustrating the X' deceleration and synchronized movement control system in its maximum rate of travel position.

FIG. 38 is a cross-sectional view through the tool turret taken along line 38–38 of FIG. 1.

FIG. 39 is a cross-sectional view through the tool turret taken along line 39–39 of FIG. 38.

FIG. 40 is a cross-sectional view of the base portion of the tool turret of FIG. 39 illustrating the turret in a raised or unclamped position relative to the turret base.

FIG. 41 is a cross-sectional view through the tool turret port block, taken along line 41–41 of FIG. 40.

FIG. 42 is a cross-sectional view through the turret base port plate, taken along line 42–42 of FIG. 40.

FIG. 46 is a diagrammatic view of a hydraulic circuit for controlling raising and lowering of the tool turret.

FIG. 47 is a pneumatic-hydraulic diagram of the control circuit for the tool changer.

FIGS. 48 through 51C are circuit diagrams of the electrical control circuit for the tool changer.

Figure 26:
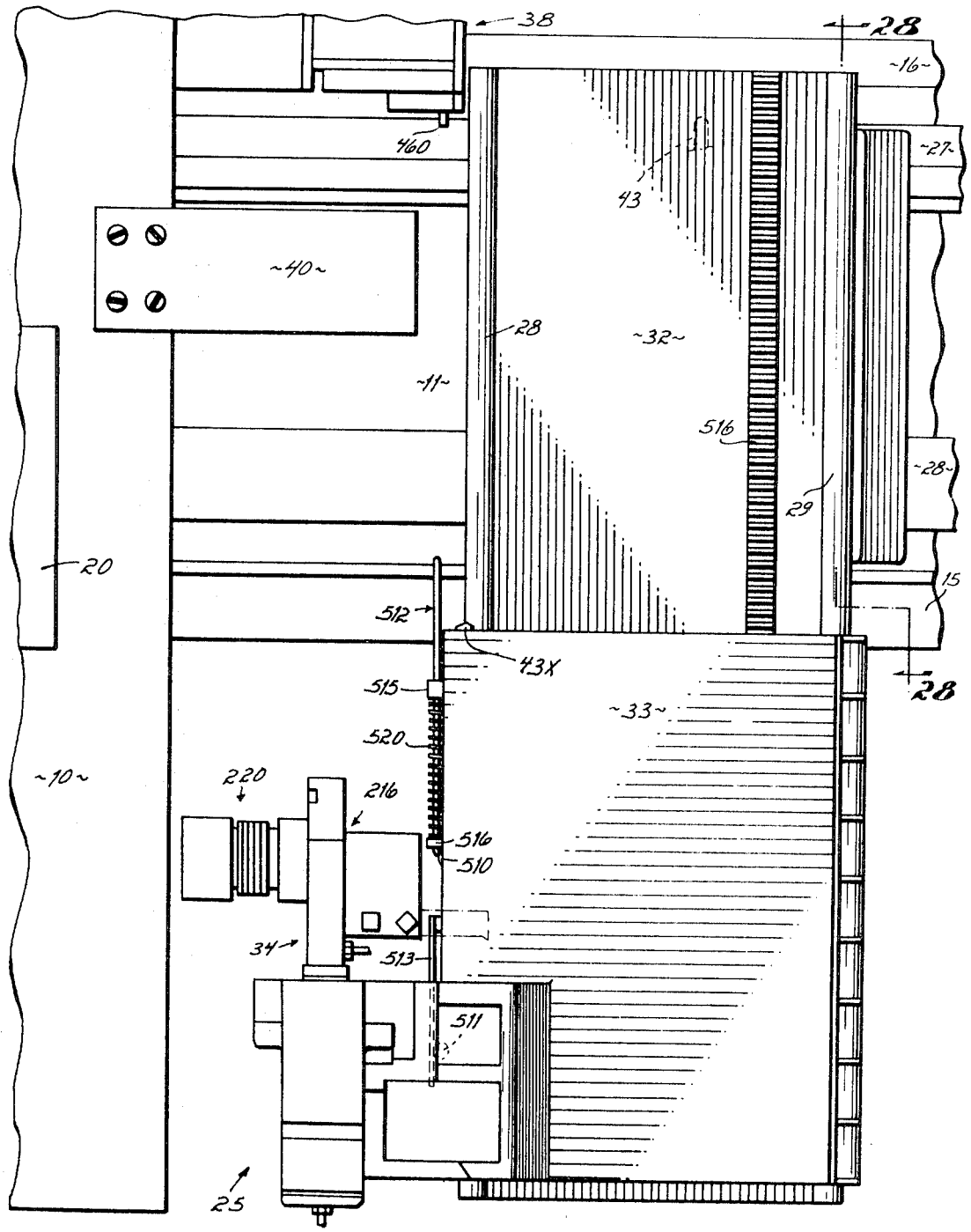
FIG. 26 is a top plan view of the tool transfer carriage during transfer of a tool between the magazine and the tool turret.
Figure 30:
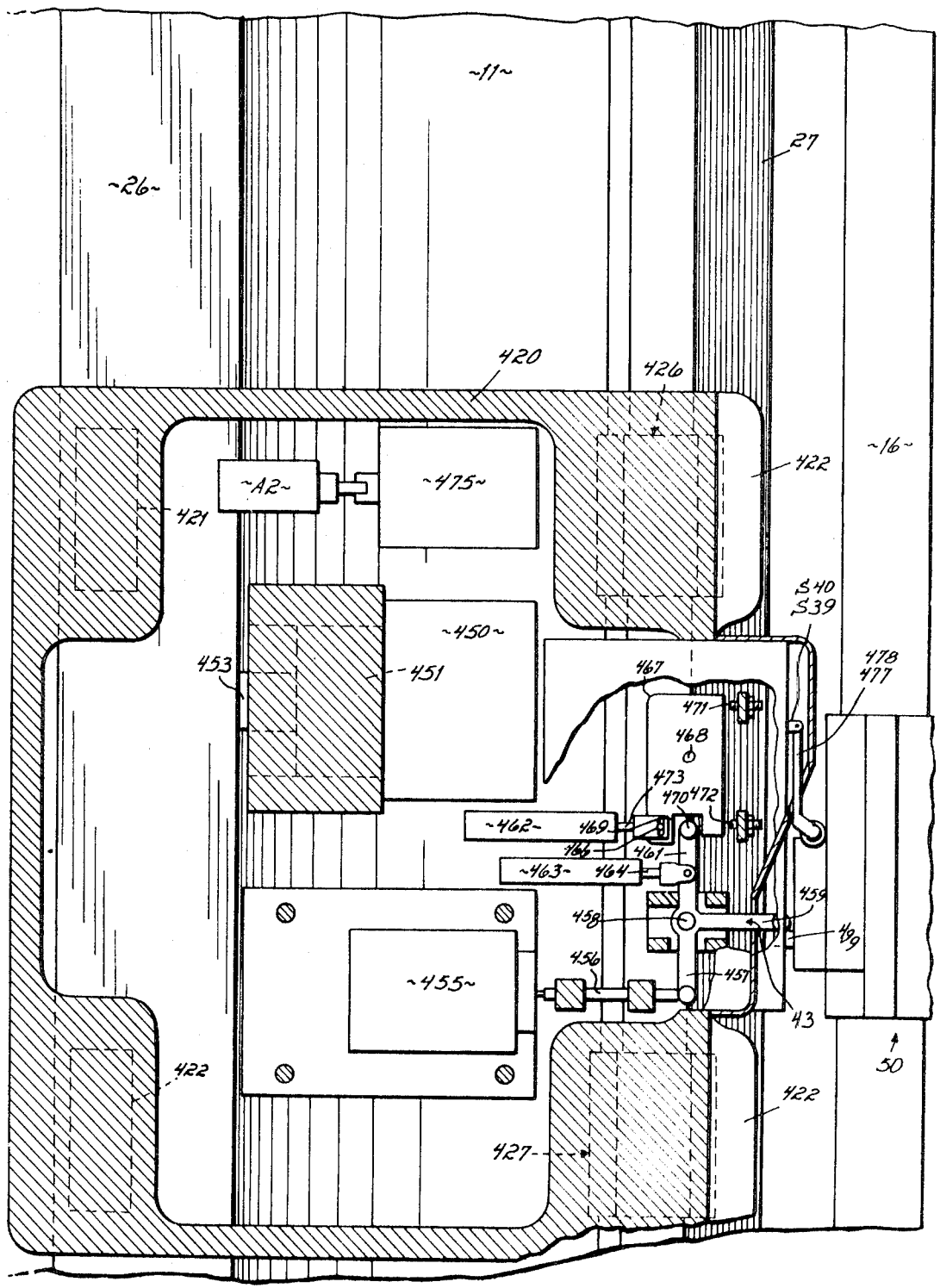
FIG. 30 is a cross-sectional view of the tool transfer Z' slide, taken along line 30–30 of FIG. 28, and particularly illustrating the Z' slide deceleration and synchronized movement control system located on the turret side of the standby position.
Figure 43:
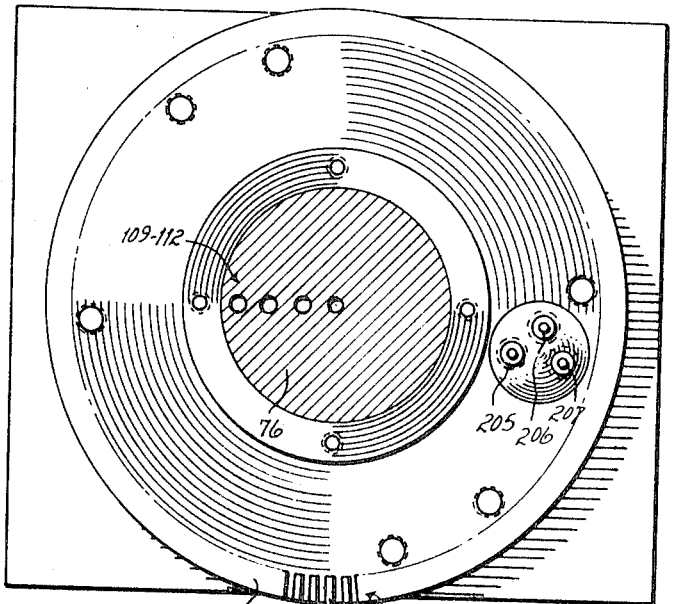
FIG. 43 is a cross-sectional view of the bottom of the tool turret, taken along line 43–43 of FIG. 39.
Figure 44:
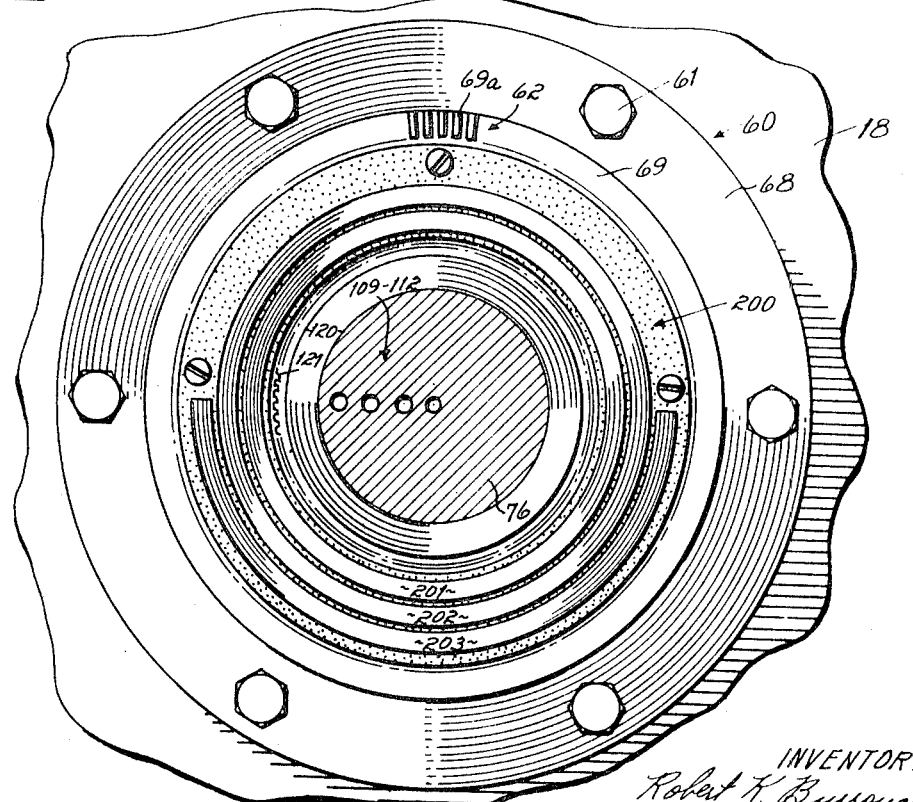
FIG. 44 is a cross-sectional view of the top of the tool turret base, taken along line 44–44 of FIG. 39.

Referring to FIGS. 1, 2 and 3, there is illustrated a lathe 5 upon which is mounted the inventive tool changer of this application. This lathe 5 comprises a tool carriage 10 and headstock 12 mounted upon a bed 11. The headstock 12 is a conventional geared transmission operable to drive a spindle (not shown) on the end of which is mounted a chuck 13 for rotatably supporting a workpiece 14. Ways 15, 16 on the top of the bed 11 slideably support a Z axis slide 17 of the carriage 10 for movement longitudinally of the bed along the Z axis of the machine. A saddle or X axis cross-slide 18 is slideably supported upon ways (not shown) of the Z axis slide 17 for movement laterally of the bed or along the X axis of the machine. A tool turret 20 is mounted upon the cross-slide 18 and supports a pair of tools 21, 22 which may be alternately moved into engagement with the rotating workpiece to effect the desired machining operation of the workpiece. For purposes of this description and illustrating a preferred embodiment of this invention, the cutting operation is illustrated as a facing cut on the workpiece 14.

Except for the tool turret 20, the structure heretofore described is that of a conventional lathe which forms no part of this invention, and, therefore, has not been illustrated or described in detail.

The tool changer 25 comprises a tool storage magazine 30 mounted on the rear of the machine bed and a tool transfer carriage 31 for transporting tools between the magazine and the turret. The transfer carriage 31 includes a Z' axis slide 32 movable along the Z' axis of the machine over ways 26, 27 mounted upon the bed 11. A tool carriage cross-slide 33 or X' slide is laterally movable over ways 28, 29 fixed to the Z' slide 32 of the tool transfer carriage 31 and supports a tool gripper 34 which is operable to grasp and support a tool during transfer between the turret and magazine.

For purposes of clarifying this description, the Z axis of the machine has been labeled the Z' axis when referring to the axis of movement of the tool transfer carriage 31 and the X axis has been labeled the X' axis when referring to the axis of movement of the cross-slide 33 of the tool transfer carriage 31.

Before describing the details of the individual component sections of the tool changer, and to facilitate an understanding of these components and their function in the system, the general organization and operation of the tool changer 25 will first be explained.

GENERAL OPERATION

The tool changer of this invention is usually programmed to change the idle tool 22 in the turret 20 while the other tool 21 continues its cutting operation and the turret 20 continues to move along both the X and Z axes. As may be seen most clearly in FIGS. 1 and 4, while the tool 21 is engaged with the workpiece 14, the other tool 22 on the opposite side of the turret 20 is idle and is accessible for a tool change.

Referring now to FIGS. 4 through 17, there is illustrated an operational tool changing sequence in which the tool transfer carriage 31 is illustrated in FIG. 4 in the standby or parked position. In this position of the carriage 31, the Z' axis transfer slide 32 is parked near the rearward extent of its movement along the Z' axis and the X' tool transfer cross-slide 33 is located at the outer limit of its travel along the X' axis (at the bottom of the X' axis as viewed in FIG. 4).

Upon initiation of a transfer cycle and as depicted in FIG. 5, the tool transfer carriage 31 is first moved toward the turret 20 along the Z' axis at its maximum or high speed rate of travel until the Z' slide 32 is a preset distance from the Z axis slide 17 and the turret 20. When this position is reached travel of the tool transfer cross-slide or X' axis slide 33 is initiated at high speed toward the turret while simultaneously, the high speed travel of the tool transfer carriage 31 continues along the Z' axis. Thus, as indicated by the arrow 42 of FIG. 6, the tool gripper 34 of the tool transfer carriage is then moving at high speed along both the Z' and X' axes toward the tool turret.

While the tool gripper 34 is simultaneously moving along both the X' and Z' axes, the speed of the X' slide 33 is slowed as the tool gripper approaches the tool turret and subsequently the speed of the Z' slide 32 is slowed. A stylus 43X attached to the X' slide 33 then engages an X' reference wing 40 attached to the cross-slide 18. This stops relative movement between the wing 40 and the cross-slide 33 and causes the tool transfer cross-slide 33 to thereafter move in synchronization along the X' axis with the wing 40 and thus with the turret cross-slide 18.

After the movement of the cross-slide 33 has been synchronized with the movement of the turret cross-slide 18, the Z' slide 32 continues to move toward the turret until a stylus 43 on the slide 32 engages a Z' reference stop or wing 38 attached to the Z axis slide 17. Thereafter, the stylus 43 controls all movement of the tool transfer carriage 32 along the Z' axis and maintains the tool transfer carriage 31 synchronized with movement of the turret carriage 17.

The relative speeds of the X' slide 33 and Z' slide 32 of the tool transfer carriage 31 are such that the stylus 43X of the X' slide always engages the X' reference wing 40 before the stylus 43 of the Z' slide engages the Z' reference wing 38. As a consequence, the movement of the X' slide is always synchronized with the movement of the tool turret along the X axis prior to synchronization of the Z' slide along the Z axis. This insures that the last increment of movement of the Z' slide 32 along the Z axis always occurs while there is no relative movement between the tool gripper 34 and the tool turret 20 along the X axis. Thus, the gripper 34 is always moved over the tool or a tool contained in the gripper 34 is always moved into the empty station of the turret at a time when the only relative movement between the tool gripper 34 and the turret 20 is along the Z' axis as shown in FIG. 7.

Final movement of the tool gripper 34 along the Z' axis locates tool grasping arms of the tool gripper 34 over the idle tool 22 contained in the station 22a of the tool turret so that the arms may then be closed to securely clamp the tool 22 in the gripper.

After the tool 22 is clamped by the gripper, it is taken out of the turret 20 by the movement of the tool transfer Z' slide 32 away from the tool turret 20 along the Z' axis while the X' slide remains synchronized with the X slide as shown in FIG. 8. Thus, at this time, there is no relative movement between the tool gripper 34 and the turret 20 along the X' axis.

After complete extraction of the tool 22 from the turret 20, the tool gripper is moved simultaneously along both the X' and Z' axes (as depicted in FIG. 9) toward the tool transfer standby position. Because of the relative speeds, the X' slide reaches its standby position or outer limit of travel and stops moving along the X' axis before the Z' slide reaches its standby position which is located near the magazine 30.

As the tool transfer carriage continues to move rearwardly along the Z' axis with the tool cross-slide 33 at its extreme limit of movement, in its standby position, the tool transfer carriage 31 is programmed to pass beyond a movable standby position stop 50.

When the carriage 31 reaches a predetermined position spaced forwardly from the magazine, movement of the Z' slide is slowed or decelerated to a slow rate of travel until the stylus 43 on the Z' slide 32 engages an abutment 48 on the bed 11 of the machine and stops all movement of the carriage along the Z' axis. During the slow rearward movement of the tool carriage 31 along the Z' axis, the tool 22 in the carriage gripper 34 is inserted into an empty module or tool holder of the magazine 30.

After the tool 22 is deposited in the magazine, as depicted in FIG. 10, the gripper arms open, and the carriage is moved forward at first a slow speed as the gripper moves away from the tool 22 along the Z' axis and then at a fast speed as the tool carriage moves to the standby position illustrated in FIG. 11.

Just prior to the arrival of the carriage 31 at the Z' standby position, the forward movement of the carriage 31 is slowed and subsequently the stylus 43 engages an abutment on the standby position stop 50 and stops all movement of the tool transfer carriage 31.

While the tool transfer carriage 31 is in the standby position of FIG. 11, a conveyor within the magazine 30 is actuated so as to move a new preselected tool to the tool interchange station of the magazine. That tool which is moved to the interchange station is controlled by the tape reader or by the program which controls scheduling of the machine.

As soon as the new tool is located in the interchange station of the magazine, rearward movement of the tool carriage 31 is initiated at a fast rate of movement. Just prior to arrival of the gripper head 34 at the interchange station, the rearward movement of the Z' slide is slowed. The carriage 31 then continues to move rearwardly at a slow rate of movement until the Z' slide stylus 43 engages the abutment 48 and stops rearward movement of the carriage. At this time, the gripper head is located in the magazine, as shown in FIG. 12, and the movable arms of the gripper 34 are located over the new preselected tool. The gripper arms are then closed to clamp the new tool and forward movement of the carriage 31 is initiated along the Z' axis as depicted by the arrow 44 in FIG. 13.

When the carriage 31 reaches the Z' standby position in its forward travel toward the turret with the new tool 23, it passes through the standby position at a high rate of speed.

The carriage 31 continues its high speed forward travel along the Z' axis until it is a preset distance from the turret. At this preset distance, high speed movement of the X' slide is initiated toward the turret. Thus, at this time, the tool carriage 33 is moving simultaneously along both the X' and Z' axes as indicated by the arrow 51 of FIG. 14.

As was described above, the relative rate of travel of the Z' and X' slides is such that the X' slide always slows and then stops its movement prior to the synchronization of the Z' slide with the Z axis slide 17 so that the last increment of relative movement of the tool gripper toward the turret 20 is along the Z' axis. As the X' slide moves toward the turret, the X' slide is slowed or decelerated. It then continues to move toward the turret at the slow rate of travel until the stylus 43X of the cross-slide 33 engages the X' reference wing 40 and stops relative movement between the turret cross-slide 18 and the X' slide 33. Thereafter, the X' cross-slide 33 moves along the X' axis in synchronization with movement of the turret cross-slide 18 under the control of the stylus 43X. It should be appreciated that the tool 21 located in the station 21a of the tool turret 20 is at this time continuing its machining operation and, therefore, is in motion relative to the workpiece and may be moving along the X axis.

After all relative movement of the tool transfer X' axis slide 33 has been terminated, or while it is moving toward the turret at a slow speed, the tool transfer Z' axis slide 32 is slowed and continues to move forward at this slow speed until the stylus 43 engages the reference abutment on wing 38. Thereafter, the tool transfer carriage 31 and the turret carriage 17 continue to move in synchronization along the Z' axis under the control of the stylus 43 while the tool 21 in the station 21a of the turret continues to move relative to the workpiece. During the slow forward movement of the carriage 31 along the Z' axis, after all relative movement of the X' slide 33 along the X' axis and the turret has been terminated, the new tool 23 held by the movable arms of the gripper 34 is inserted into the empty station 22a of the turret 20 as shown in FIG. 15. After the tool has been fully inserted into the turret, the arms of the gripper 34 are opened to release the tool.

As depicted in FIG. 16, the tool carriage 31 is then moved rearwardly along the Z' axis while the X' tool transfer crossslide 33 remains synchronized with the movement of the X slide 17 until the gripper 34 has completely disengaged the tool 23 and moved clear of a possible interference position between the tool 23 and the gripper. Thereafter, the X' slide is moved toward its outermost or standby position while the tool transfer Z' slide 32 continues to move rearwardly as shown in FIG. 16. This simultaneous movement of the X' and Z' slides continues until the tool transfer cross-slide or X' slide 33 reaches its outer or standby position. Thereafter, the tool transfer Z' slide 32 continues to move at a high speed toward its standby position until it nears the standby position and is slowed and upon reaching the standby position is stopped.

When the tool transfer carriage 31 reaches its standby position (FIG. 17), the turret is free to be rotated or indexed so as to present the new tool 23 to the workpiece. Upon indexing of the turret, the new tool 23 is automatically clamped in the turret and the old tool 21 unclamped. Thereafter, the machine is conditioned for removal and replacement of the tool 21 at the station 21a of the turret 20 by following exactly the same procedure described hereinabove.

THE TURRET

The turret 20 is shown in detail in FIGS. 38—45. It comprises a rotatable tool block 75 and a stationary turret base 60. The base 60 is fixedly secured to the turret cross-slide 18 and in the illustrated embodiment, supports the tool block 75 in 12 different angulated positions which are 30° apart. Indexing of the tool block 75 requires that the turret 20 be lifted vertically relative to the base 60 to disengage a curvic coupling 62. This coupling 62 serves the dual function of locking the turret against rotational movement and accurately locating the tool block 75 in a predetermined angulated condition in each index position.

Figure 45:
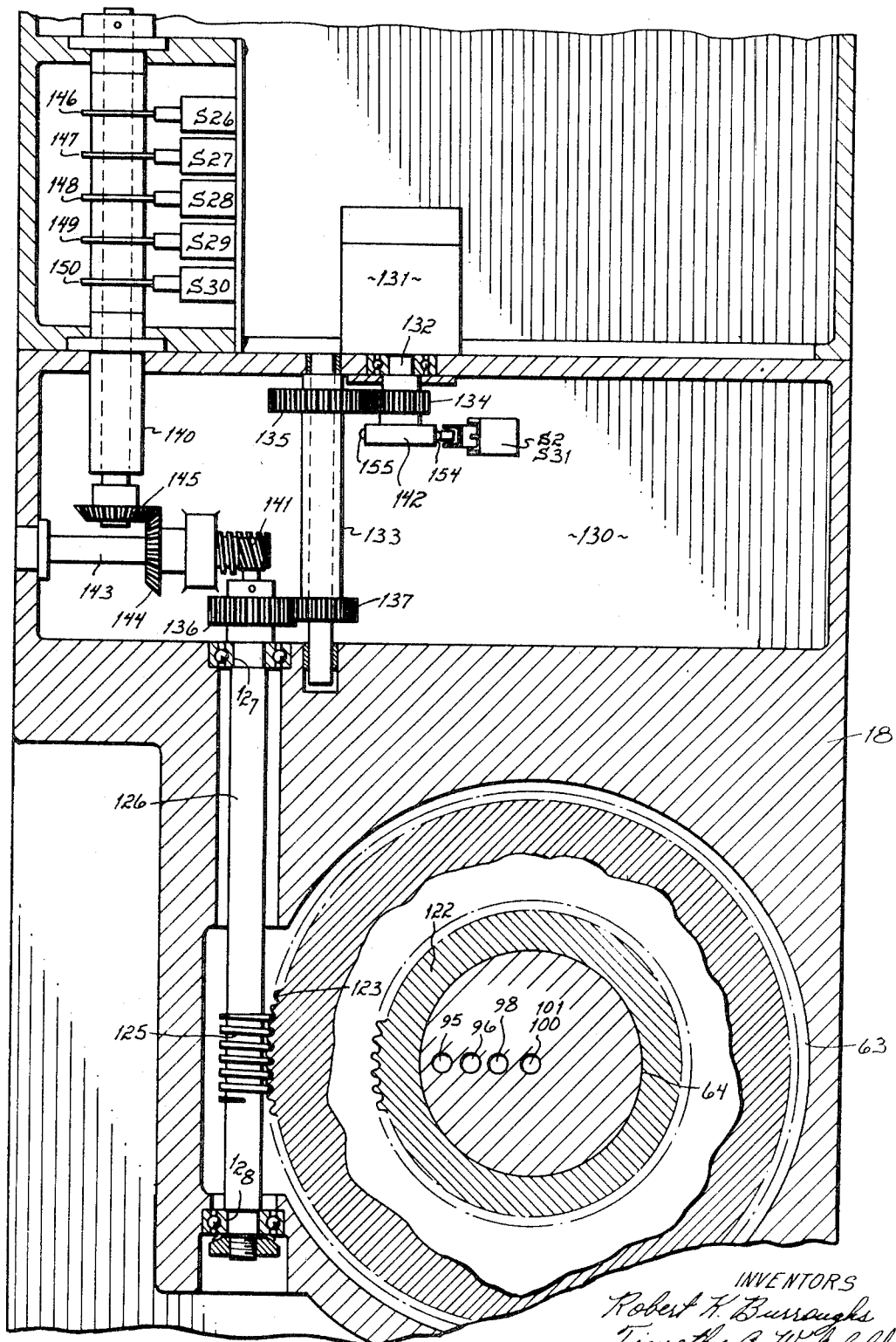
FIG. 45 is a cross-sectional view of the tool turret base, particularly illustrating the turret rotational drive system and taken along line 45–45 of FIG. 39.

The turret base 60 fits over a cylindrical post or protrusion 64 of the cross-slide 18 which is generally centered within a recess 63 of the slide 18 (see FIG. 45). An annular ring 65 is bolted to the cross-slide 18 in the bottom of the recess 63 and is spaced outwardly from the cylindrical post 64 so as to define a fluid chamber 66 within which a depending piston 67 of a fluid motor 67M is fixed to the tool turret 20 for axial movement. A second annular ring 68 circumscribes the top of the recess 63 and is secured to the turret slide 18 by bolts 61. This ring 68 supports the bottom gear 69 of the curvic coupling which is secured to the top surface of the ring 68 by bolts 70. The top of the gear 69 has teeth 69a which extend upwardly and mesh with depending gear teeth 71 of a gear 72. The upper gear 72 of the coupling 62 is secured to an annular flange 57 of a ring 58 by bolts 59. The ring 58 in turn is threaded onto a shaft 76 and locked thereto by a setscrew 56 positioned in a tapped hole that resides half in the shaft 76 and half in the ring 58. With the gear 72 secured to the shaft 76, it is vertically and rotatably movable with the turret tool block 75.

The shaft 76 depends from the tool block 75 of the turret 20 and functions as a piston rod for the fluid motor 67M during raising and lowering of the turret 20. Piston 67 is a flange on the shaft 76 and is slideable within the chamber 66 defined between the interior surface 77 of the ring 65 and the exterior surface 78 of the cylindrical post 64.

The bottom of the shaft 76 has a central vertical bore 79 surrounded by three annular channels or grooves 80, 81 and 82. A central protrusion 83 of the post 64 extends upwardly into the bore 79 and three annular rings 84, 85 and 86 of the post 64 extend into the three annular grooves 80, 81 and 82, respectively. The width of each of the annular rings 84, 85 and 86 is less than the width of the grooves 80, 81 and 82 so that there are open annular channels or flow paths 87, 88 and 89 in all of the grooves 80, 81 and 82. An O-ring 90 is mounted in an annular groove on the interior of the bore 79 and is operable to form a seal between the protrusion 83 and the aperture 79. Similarly, three O-rings 91, 92 and 93 are located in annular recesses of the channels 80, 81 and 82 and are engageable with the annular rings 84, 85 and 86, respectively, so as to form seals between the annular channels.

A conduit 95 in the cross-slide 18 connects the annular flow path 89 with a hydraulic exhaust tank. Another conduit 96 in the cross-slide 18 connects the flow path 88 with a source of air pressure and another conduit 98 connects the flow path 87 with a source of coolant under pressure. A fourth conduit 100 in the slide connects a central aperture 101 in the protrusion 83 with a source of fluid pressure. Each of the three annular flow paths 87, 88, 89 and the central aperture 101 is connected to channels 105, 106, 107 and 108 in the tool block 75 by channels 109, 110, 111 and 112 in the shaft 76.

Both of the turret conduits 105 and 108 are interconnected through a control valve 610 to fluid lines or conduits 167, 168 which supply fluid flow to two hydraulic motors 169 and 169b in the turret. These motors control the clamping and unclamping of tools in the tool stations 21a, 22a of the turret as is explained more fully hereinafter.

The conduit 107 of the turret is connected to a tool coolant supply line 186 which supplies coolant to the cutter bits of the tools as is explained more fully hereinafter.

The turret conduit 106 is interconnected to the tool holder sockets of the turret through a pair of conduits 115 in the tool block 75. These conduits 115 are connected to an annular channel 114 which is, in turn, connected to four radial conduits 116. These latter conduits 116 are equidistantly spaced about the interior of the tool sockets and have end orifices which open into an annular recess 113 of the tool receiving sockets of the tool block. Air at a pressure above that of the atmosphere is supplied to the conduit 96 and subsequently to the orifices of conduits 116 according to a programmed scheduling such that the air is emitted as an airstream against the peripheral surface of a tool shank as the tool is inserted into the tool holder sockets of the turret. In this way, all dirt and debris which might otherwise interfere with proper location of the tool in the turret is blown clear of the shank while the tool is being inserted into the turret. Additionally, the airstream being emitted from the tool receiving sockets of the tool block as the tool is inserted, acts as a hydrostatic bearing to guide the tool into the socket, thereby avoiding metal-to-metal contact if the tool is slightly misaligned with the socket.

As may be seen most clearly in FIG. 39, the air orifices 116 are all aimed radially of the tool shank or, otherwise expressed, at the longitudinal axis of the tool shank. It has been found that this direction of the airstream is critical to proper cleansing of the tool shank. If directed tangentially of the shank, the airstreams tend to create a vortex and pull or suck dirt and debris into the tool socket of the turret rather than blowing debris away from it.

Rotation is imparted to the tool block 75 through the tool post 76 and an attached spur gear 120 which is mounted over the periphery of the post and is secured thereto by a series of set screws 119. The peripheral teeth 121 of this spur gear 120 are coupled to an internally splined gear 122, the periphery of which has worm gear teeth 123 machined thereon. This worm gear is supported for rotation by a ball bearing race 124 which is in turn supported from the annular ring 68. A helical worm 125 of a wormshaft 126 is drivingly engaged with the worm gear 122. As may be seen most clearly in FIGS. 39 and 45, the worm wheel shaft 126 is supported for rotation in the turret cross-slide 18 by a pair of ball bearings 127 and 128. A recess 130 in the top surface of the cross-slide accommodates the drive mechanism to the wormshaft 126.

This drive mechanism comprises a rotary hydraulic motor 131, the output shaft 132 of which is drivingly connected to an intermediate shaft 133 through a pair of spur gears 134, 135. The shaft 133 is in turn drivingly connected to a spur gear 136 on the shaft 126 through another spur gear 137 such that rotation of the motor 131 effects rotation of the wormshaft 126 and thus of the gear 122. Rotation of the gear 122 then causes rotation of the turret 20 through the splined connection between the wheel 122 and the gear 120 attached to the post 76.

Also drivingly connected to the wormshaft 126 is a camshaft 140 which is rotatably supported in the turret cross-slide 18. The camshaft 140 is driven from a helical gear 141 attached to one end of the wormshaft 126 through an idler shaft 143 and a pair of bevel gears 144 and 145. Thus, rotation of the wormshaft 126 and of the turret 20 results in synchronized rotation of the camshaft 140. Five cams 146, 147, 148, 149 and 150 on the camshaft 140 control actuation of five switches S26 through S30 which operate to control the rough positioning of the turret 20 at one of 12 different index positions.

Two additional cam-controlled switches S2 and S31 control final accurate positioning of the tool block as is explained more fully hereinafter. These last two switches S2, S31 are controlled by lobes 154 and 155 of a cam 142 which is mounted on the end of the output shaft 132 of the motor 131.

As may be seen most clearly in FIGS. 38 and 39, the tool block 75 contains two tool stations 21a, 22a, each one of which has a hydraulic motor 169, 169b operable to secure a tool therein. Since the stations are identical, only one, station 22a, will be described in detail although it should be appreciated that another identical tool station and tool clamp is located on the opposite side of the turret. For purposes of identification, the components of the tool station 21a have been given identical numerals to the corresponding components of the station 22a except that the numerals designating the parts of the turret at the station 21a are followed by the suffix b.

Referring to FIG. 38, it will be seen that the tool block 75 has a longitudinal aperture 151 extending therethrough at each of the tool stations 21a, 22a. This aperture is counterbored to provide an enlarged diameter section 152 and 153 at each end, and the counterbored section 153 at one end is enlarged still further by a counterbored recess 157. A cap 158 is secured to the tool block 75 by bolts 158a so as to enclose the counterbored recess 152 of the aperture 151. The opposite counterbored end 153 of the aperture has a cam ring 159 mounted therein which is held in place by the sleeve 156. A flange 160 of the sleeve 156 is seated within the largest diameter section 157 of the aperture 151 and is secured to the tool block by several bolts 160a (FIG. 39).

A tool clamping rod 161 of the hydraulic motor 169 is slidably mounted within the smallest diameter section of the aperture 151 and is attached by a bolt 162a to a piston 162 which is slidable within the counterbored section 152 of the aperture 151. The counterbored recess 152 of the aperture defines the chamber of a hydraulic cylinder, the opposite end chambers 163 and 164 of which are connected to ports 165 and 166 in the tool block 75. Both of these ports 165, 166 are connected by the conduits 167 and 168, respectively, to a valve, to be described, which controls the pressure of the fluid in the chambers 163, 164 of the cylinder and thus the movement of the piston 162 within the cylinder.

At the end opposite the piston 162, four laterally movable fingers 170 are machined in the end of the rod 161. Each finger 170 has a radially extending hook 171 on its outer end and a generally triangular-shaped lobe 172 intermediate the ends. The lobes 172 are movable between a small internal diameter portion 173 of the cam ring 159 and a larger internal diameter portion 174. A sloping internal surface 175 of the cam ring 159 interconnects these two different diameter portions 173 and 174 of the cam ring and acts as a cam surface upon the lobes 172 of the fingers. When the piston 162 is moved away from the tool, the cam surface 175 permits the lobes 172 to move apart and the fingers to spread to the position illustrated in the upper one 21a of the two tool holder stations shown in FIG. 38. When the piston 162 is moved toward the tool, the cam surface 175 forces the fingers 170 together into the position shown at station 22a in FIG. 38.

A pair of longitudinally spaced, annular grooves 180, 181 extend radially from the bore 151 in the tool block. These grooves are cooperable with an annular channel 182 in the surface of the rod 161 so as to form a valve, operable to control the flow of coolant to a tool held in the tool holders. As may be seen most clearly in FIG. 39, one of these annular grooves or channels 180 is connected by a conduit 184 through the tool block to a port 185. Coolant is supplied to this port and subsequently to the valve through the hose 186 connected to the port. The other channel or groove 181 is connected by a conduit 187 in the tool block 75 to a radial conduit 188 in the tool holder sleeve 156. The conduit 188 opens into an annular groove 189 (see FIG. 38) in the periphery of a tool shank so as to supply coolant through the channels 187, 188 to the annular groove 189 and from the groove 189 through the channel 190 of the tool shank to a cutter bit of the tool which is then in use. As may be seen in the upper half of FIG. 38, the annular groove or channel 182b of the rod 161b interconnects the two annular grooves 180, 181 so as to permit the flow of fluid therebetween when the piston 162b is moved to its tool clamping position. When the piston 162b is moved to unclamp a tool, the rod 161 completely blocks the annular channel 180 and precludes the flow of fluid between the two channels 180, 181.

Referring now to FIGS. 39, 40, 43 and 44, it will be seen that a control ring 200 made from plastic or other electrically insulative material is attached to the stationary gear 69 of the curvic coupling 62. Two spaced annular contacts 201, 202 of electrically conductive material are mounted on the top surface of the ring 200 as well as a semicircular contact 203 of electrically conductive material. The semicircular contact 203 and the two annular contacts 201, 202 are spaced from each other so as to preclude electrical interconnection between the three contacts.

Three vertically slidable pins or brushes 205, 206 and 207 are mounted within three recesses 208, 209, 210 of the tool block and extend through apertures 213 in the upper gear 72 of the curvic coupling 62. These brushes 205, 206 and 207 are all biased downwardly into engagement with the contacts 201, 202 and 203, respectively, by springs 218 located within each of the recesses 208, 209, 210. Each of the brushes is connected to an electrical lead and similarly, each of the contacts is connected to another electrical lead so that the brushes and contacts cooperate to complete a circuit from the stationary base into the vertically movable and rotatable tool holder portion of the turret, as more fully explained hereinafter.

In operation, fluid is supplied to the lower chamber 66 of the turret lifting motor 67M through a channel 221 in the cross-slide 18, causing the piston and turret 20 to rise until a port 222 in the cylinder ring 65 is opened (FIG. 40). The upper chamber 77 of the motor 67M is connected by a fluid line 227 to the turret lifting motor control valve, as is completely described hereinafter. As may be seen more clearly in FIG. 46 (which is a diagrammatic illustration of the turret hydraulic control system), the piston 67 continues to rise and lift the turret 20 until the flow of fluid through the channel 221 into the chamber 66 is balanced by the out flow through the port 222 to an exhaust conduit 223 of the cross-slide 18. The channel 221 is connected to a conduit 224 which contains an adjustable flow control valve 226. The exhaust conduit 223 is connected to an exhaust conduit 225. The valve 226 is adjusted and balanced so that the flow into the chamber 66 balances the flow out of the chamber through the port 222 when the piston 67 is raised sufficiently to clear the gear teeth 69a of the curvic gear 69 with the gear teeth 71 of the gear 72.

The advantage of this hydraulic circuit and control system is that it utilizes the hydraulic motor, including the piston 67 and cylinder 65, as a thrust bearing to support variable weight loads at a predetermined height or elevation. In other words, there is no metal-to-metal contact between the top surface of the piston 67 and the end surface 230 of the cylinder 65 when the tool turret 20 is rotated. Thus, friction is minimized and the very small hydraulic motor 131 may be used to effect rotation of the tool turret 20 after the curvic coupling 62 is disconnected.

When the tool holder has been raised to its full elevation so as to disengage the gear teeth of the curvic coupling 62, a switch is actuated so as to initiate rotation of the hydraulic motor 131 through an appropriate control circuit (explained more fully hereinafter). Actuation of this motor 131 effects rotation of the tool holder 20 through the geared coupling between the motor and the gear 122. When the gear 122 is rotated, it causes the mating gear 120 and attached turret post 76 to be rotated through the splined gear connection 121. The motor continues to rotate and index the turret until the preselected turret position is located at the machining position. When the turret rotation is stopped, the fluid chamber 66 is connected to exhaust so that the piston 67 and attached tool holder are lowered to again couple the gears 69 and 71 of the curvic coupling 62, and pressure is introduced to chamber 77 to firmly clamp together the gears 69 and 72 of the coupling.

TOOLS

Throughout this application, the term "tool" is used generically to designate a tool adapter 216 having a cutter bit 215 mounted therein. The cutter bits may be in the nature of facing tools, drills, boring tools, turning tools or any other shaped or configurated machining or forming tool.

Each tool adapter 216 comprises a rearwardly extending cutter clamping block 217, a central flange section 219, a forwardly extending code carrying section 220, and an adapter clamping section 211. The cutter clamping block 217 is generally rectangular and has a longitudinal recess 212 on one side adapted to receive the cutter bit 215. To clamp a cutter bit 215 in the recess, a pair of locking screws 214 are threaded through the top of the block into engagement with the top of the cutter 215.

As may be seen most clearly in FIGS. 21 and 22, the top of the flange section 219 of the tool adapter is provided with a longitudinally extending V-shaped notch 229. Another V-shaped notch 231 extends longitudinally along the bottom of the flange 219 and the bottom of the cutter clamping block 217 of the adapter. These notches 229, 231 in the flange 219 serve as clamping surfaces for the tool gripper 34. The notch in the bottom of the cutter clamping block 217 is provided to enable an arm of the gripper to pass through the notch prior to the pickup of a tool by the gripper 34 or immediately after unclamping of the tool by the gripper 34.

A circular cross section locating ring 235 extends forwardly from the flange 219 of the adapter to locate and support the adapter in the sleeve 156 of the turret tool block 75. The coding section 220 of the adapter extends forwardly from the locating section 235 and is smaller in diameter than the locating section. It is generally cylindrical in shape and is provided with seats for five split rings 238. The presence or absence of rings in each of these five sites serves as binary coding on the tools to enable 31 different tools to be distinguished by an appropriate control circuit of the machine as is explained more fully hereinafter in connection with the description of the electrical control circuit.

The adapter clamping section 211 of the adapter extends forwardly from the coding section 220 and is of the same outside diameter as the locating ring 235. This diameter is slightly smaller than the internal diameter of the sleeve 156 so that these surfaces accurately locate the adapter in the sleeve 156 of the turret. To facilitate insertion of the tools into the tool socket of the sleeve 156, the forward end of the clamping section of each adapter is chamfered, as indicated by the numeral 236.

As best seen in FIG. 38, an undercut recess 240 extends rearwardly from the front end of the adapter clamping section 211. The forward wall 241 of the recess is undercut to provide a forwardly sloping surface on an inwardly extending flange 242. The hooked end portions 171 of the tool clamping fingers 170 cooperate with this sloping surface 241 to engage the adapter and pull it forwardly until the radial surface on the front of the adapter flange 216 engages the gage surface of the locating sleeve 160. Clearance exists between radial surfaces 234 and 244.

To hold the tool adapter 216 in the turret sleeve 156 until it is clamped and after it is released by the gripper of the tool transfer slide, a spring-biased detent pin 245 is mounted in the sleeve 156 in a position to engage a radial face 247 of the adapter. This detent pin 245 is held in place in the sleeve by a setscrew 248.

TOOL STORAGE MAGAZINE

As may be seen most clearly in FIGS. 1 and 3, the tool storage magazine 30 is mounted on the top of a platform 250 which is supported from a vertical extension 251 of the machine pedestal 246. The platform 250 is located above and is spaced from the horizontal plane of the Z' ways 26, 27 so that the tool transfer carriage 31 may be moved beneath the platform 250 and magazine 30 to the tool interchange position. As the carriage 31 is moved beneath the magazine, the tool gripper 34 on the top of the carriage 31 passes into the magazine through an opening 252 in the bottom and front of a magazine housing 253.

The tools in the magazine are located in a conveyor 254 which is supported by a pair of transverse frame support plates 255, 256. For purposes of clarity of the drawings, the remainder of the magazine framework, all of which is supported from the platform 250, has been omitted from the drawings.

As may be seen most clearly in FIGS. 20 and 21, the plates 255 and 256 are mounted in spaced relationship and are of a generally rectangular configuration. To minimize the weight of these plates, the center portion is preferably cut out to provide a central rectangular aperture 257.

At each of the four corners of the plates, four parallel shafts 249, 258, 259 and 260 extend between the plates and are rotatably journaled therein. These shafts 249, 258, 259 and 260 support and drive sprockets of the chain conveyor 254 which transports a plurality of tool modules 267 around the rectangular path of travel of the conveyor. This conveyor 254 consists of an endless chain 266 and four sprockets 262, 263, 264 and 265, each one of which is keyed to one of the shafts 249, 258, 259, 260, respectively.

As may be seen most clearly in FIGS. 20 and 21, the shaft 249 extends through the frame plate 256 and has a large spur gear 268 mounted on its outer end. This gear is driven by a smaller spur gear 269 which is mounted on the output shaft of a small rotary hydraulic motor 270. Rotation of the shaft 249 is operative to drive the sprocket 262 and thus the chain 266 and tool modules 267 connected thereto.

Each of the modules 267 has a generally C-shaped base section 274. As may be seen most clearly in FIGS. 21 and 22, this base section 274 comprises a transversely extending web portion 275 and a pair of upstanding vertical legs 276, 277 located on opposite sides of the web. A generally C-shaped tool receiving socket 279 extends outwardly and downwardly from the web portion 275 of the base of each module and is adapted to receive and support a tool in the magazine. Each of the legs 276, 277 carries a pair of outwardly extending shafts 280, 281 having roller support blocks 282 pivotally mounted on their outer ends. EAch block 282 rotatably supports two guide rollers 285. These rollers 285 are rotatable over guide rails 287 mounted upon the inside surface of the frame support plates 255, 256 so that the guide rails 287 carry the weight of the module and tools. The interconnection between the modules 267 and the conveyor 266 chain comprises links 288 having one end pivotally attached to lugs 289 of the chain and the opposite end pivotally attached to protrusions 290 of the module base section 274. As viewed in FIG. 20, the chain and sprocket drive 254 is operative to effect clockwise rotation of the module about the generally rectangular path defined by the rails 287 such that the links 288 always pull the modules over the guide rails. The pivot connection between the support blocks or carriers 282 and the modules 267 enables the modules to pass around the relatively small radius corners of the magazine conveyor travel path.

To control slack in the chain 266, the shaft 259 is slidably mounted in diagonal slots 295 of the plates 255 and 256. The ends of the shaft are supported in blocks 296 which are slidable within guide rails 297 and 298 bolted to the outside of the frame plates 255 and 256. Abutment screws 294 are threaded through upstanding lugs 299 attached to the plates 255 and 256 such that rotation of the screws 294 effects movement of the slides 296 within the guide rails 297, 298 and consequently, movement of the sprocket 264 to tighten or loosen the chain 266.

Also mounted within the magazine are two fluid motors, one 327 for locking and accurately locating the modules at the tool interchange station, and the other 311 for locking and unlocking the tool adapter 216 in the modules at the interchange station. Locking of the tools in the modules 267 is effected by pins 305 which are slidably mounted within an aperture 306 of each of the modules 267. As may be seen in FIGS. 21 and 22, each of these pins 305 has an enlarged head section 308 on its inner end and is provided with two longitudinally spaced annular recesses 309, 310. The recesses are engageable by a spring biased detent 307 (FIG. 22) which is held in place by a setscrew 312 mounted in the web portion 275 of the module.

The pins 305 reside in the upper position, illustrated in FIG. 21, out of engagement with the tools when the modules 267 are empty at the interchange station. Whenever a tool is inserted into a module, the pin 305 of that module is lowered into the position illustrated in FIG. 22 to lock the tool therein. Thereafter, the pin 305 remains in this lowered position throughout the travel of the module 267 on the conveyor until such time as the module is again stopped at the interchange station. The pin 305 is then raised so that the tool is free and may be removed by the gripper, as is explained more fully hereinafter.

The mechanism for raising or lowering the pins 305 comprises the fluid motor 311 mounted on the inside of the plate 255. An enlarged head 304 on the lower end of the piston rod 313 of the fluid motor 311 is provided with a horizontal recess 314 engageable with the headed end 308 of each of the pins 305. When the head 308 of a pin 305 is vertically aligned with the recess 314 of the head 304 of piston rod 313, the motor 311 may be actuated so as to move the pin 305 downwardly into locked engagement with a tool in the module 267 at the interchange station or the motor 311 may be raised to disengage the pin 305 from the tool 22 so that the tool may be removed from the module 267.

As may be seen most clearly in FIGS. 21 and 22, the lower ends of the module pins 305 are slideable into milled slots 315 on the forward side of each of the flanges 219 of the tool adapters 216. When the pins 305 are in the lowered position, engaged with the slots 315, the tools are locked against all movement in the module. Movement in the rearward direction is then limited by engagement of the flange 219 of the tool with a vertical surface 317 of the module and forward as well as lateral movement is then precluded by the pin 153.

Reading of the coding of the tools within the magazine is effected by a readout head 320 attached to the bottom of the plate 255 by a bracket 321. This head 320 is mounted immediately in front of the pickup station in the path of movement of the tools in the magazine as may be seen most clearly in FIG. 20. Six depending switch actuators of switches S32 through S37 extend downwardly from the head 320 and are engageable with the five coding rings 238 and with the shoulder 235. The actuators of switches S32, S36 are engageable with the snaprings 238 located in one of the five coding sites of each adapter so that these switches detect the presence or absence of rings at these sites and are operable through associated control circuitry, as is explained more fully hereinafter, to detect which of 31 tools is engaged with the switches. The sixth switch S37 is a verification switch engageable with the should 235 of the tool adapter to verify that the tool is properly seated in the module and is not cocked or misaligned with the switches.

In operation, the rotary hydraulic motor 270 is operative to drive the conveyor 254 at a high rate of speed until the readout head 320 detects the presence of a preselected tool or an empty module at the readout station. Upon detection of the tool or empty module at this station, a control circuit is operative to actuate a valve so as to slow the speed of the conveyor to a slow rate of movement until the next tool, which is the preselected tool or module, is detected at the interchange station by a switch S15 (FIG. 20). Actuation of the switch S15 causes the motor 270 and thus the module conveyor 254 to stop with the selected tool or empty module at the magazine interchange station. Thereafter, a module locating and locking pin 325 attached to the lower end of a piston rod 326 of the fluid motor 327 is moved downwardly until its tapered lower end 329 is located in a tapered recess 330 in the top surface of the web portion 275 of the module 267. Movement of the tapered end 329 of the locating pin into the tapered recess effects accurate positioning of the module at the interchange station as well as locking of the module at the station. When the module locking pin 325 is located within a module recess, a verifier switch S8 located immediately above the top of the fluid motor 327 is actuated.

Simultaneously, with the arrival of the preselected tool at the interchange station and the actuation of the fluid motor 327 to lower the module locking pin 325, the fluid motor 311 is actuated through an appropriate control circuit to lift the tool locking pin 305 of the module 267 at the interchange station out of engagement with the tool contained in that module. A switch S16 located above the motor 311 and engageable by the upper end of the piston rod of the motor, verifies that the pin 305 has been lifted. Thereafter, the gripper and tool slide may be operated so as to engage the selected tool and remove it from the magazine, or if the selected module is empty, to place a tool in the empty module. After a tool is inserted into the module, the motor 311 is actuated to lower the tool locking pin 305 and the motor 327 is actuated to release the module for movement on the conveyor. These operations are controlled by the electrical control circuit as is explained more fully hereinafter.

TOOL TRANSFER SLIDE GRIPPER HEAD

As may be seen in FIGS. 1, 24, and 25, the gripper 34 is attached to a vertically upstanding support bracket 375 of the tool transfer cross-slide 33. The gripper head has a hollow body or casing 376 and a face plate 377 secured to the upstanding bracket 375 by machine screws 378. The face plate 377 is bolted to one end of the body 376 by screws 379 such that it encloses one end of a central cavity 380 of the gripper casing 376. Closure of this cavity is completed by top and bottom cover plates 373, 374.

A hydraulic motor is located within the body 376 and comprises a cylinder defining sleeve 381 and a piston 383. The bore 382 of the cylinder 381 is enclosed by a cap 384 secured on a flanged end of the sleeve 381 by bolts (not shown). Fluid is supplied to the end chambers 385, 386 of the cylinder through ports 387 and 388. A piston rod 390 is bolted to the piston 383 and extends toward the face plate through a rod bore 366 in the sleeve 381. The free end 392 of the piston rod 390 is slideably supported within a bore 393 of a support block 394 which is attached to the inner face 396 of face plate 377. To limit movement of the piston rod 390 toward the face plate 377, a stop bolt 397 is adjustably threaded into the face plate 377 so as to be engaged by the piston rod 390. A locknut 399 is threaded onto the end of the bolt to secure the bolt in an adjustable position.

The gripper 34 also includes a pair of gripper arms 400, 401 which are pivotally supported upon the face plate by pivot pins 402, 403. Both of these pins 402, 403 extend through the arms and are supported at their ends in apertures 404 of the face plate 377.

Movement of the arms 400, 401, is controlled by a toggle linkage 405 which includes links 406 pivotally connected at one end 407 to the arms 400, 401 and at the opposite end 408 to the piston rod 390. Thus, movement of the piston 383 controls movement of the links 406 and of the arms 400, 401. When the piston is moved inwardly, the piston rod 390 carries the links to a vertically extended position so as to cause the inner ends 409 and 410 of the arms 400, 401 to be moved together (illustrated in FIG. 24). When the piston 383 is moved outwardly, it causes the links 406 to be moved to an angulated condition in which the ends 409, 410 of the arms 400, 401 are moved apart to unclamp the adapter.

When the arms 400, 401 are moved together, clamping fingers 411, 412 on the ends 409, 410 of the arms 400, 401 move into engagement with the recesses 229, 231 of the tool adapters 216 so as to securely clamp the tool. In the preferred embodiment, the fingers 411, 412 clamp the tool with a pressure of approximately 1,000 pounds so that there is no chance of the tool moving relative to the grippers upon acceleration or deceleration of the gripper during transfer between the magazine and the turret.

Referring now to FIG. 24, it will be seen that the fingers 411, 412 of the gripper 34 are mounted for sliding movement on the arms 400, 401 so as to accommodate slight movement of the fingers along the X' axis. To this end, each of the fingers is slideably mounted upon a hollow pin 413 which is supported in the arms 400, 401. Springs 414 hold the fingers 411, 412 in place relative to a recess 415 of the arms and prevent the fingers from moving laterally off of the pins 413.

Preferably, roller bearings 416 retained in a rubber base 417 are located between the fingers 411, 412 and the arms 400, 401, respectively, so as to transfer clamping pressure between the fingers 411, 412 and the arms while still permitting some lateral or transverse movement of the fingers 411, 412 along the X' axis. This transverse movement of the fingers along the X' axis accommodates some lateral movement of the tool when the clamping section 211 of the tool is inserted into the tool receiving socket of the turret 20.

In the preferred embodiment, there is only 0.0002 of an inch of clearance between the tool holder socket of the turret and the clamping section of the tool shank. To avoid having to always locate the tool gripper relative to the turret with an accuracy of 0.0002 inch, the forward ends of all of the adapters are beveled or chamfered as indicated at 236 in FIG. 21. This bevel 236 renders the tools self-centering upon entry into the tool receiving socket of the turret. The lateral movement of the gripper fingers 411, 412 relative to the arms along the X' axis accommodates this self-centering of the tools within the tool receiving sockets of the turret so that the slight misalignment of the tools relative to the sockets does not result in interference between the tools and the turret.

As may be seen most clearly in FIG. 24, both of the arms 400, 401 are provided with a conduit 370 which is connected at one end to a port 371 and air hose 372 and at the opposite end with a conduit 369 in the gripping fingers 411, 412. The conduits 369 are open at the apex of the generally triangular-shaped fingers 411, 412 such that an air stream emitted from the conduits 369 is operative to blow dust and debris out of the recesses 229, 231 of the tools to enable the arms 400, 401 to better and more accurately grip and hold the tools during transfer between the magazine and turret.

TOOL CHANGER SLIDE DECELERATION AND SYNCHRONIZATION CONTROL

Referring now to FIGS. 28 through 31, it will be seen that the Z' slide 32 has a depending generally hollow rectangular base section 420. A pair of spaced ball retainer plates 421, 422 are mounted beneath one side of the base 420 and support balls 423 which ride over a horizontal surface of the Z' rail 26 mounted in the bed 11 of the machine. The opposite side of the base 420 supports a pair of ball retainer assemblies 426, 427. Each assembly 426, 427 comprises a pair of vertical plates 428, 429 and a horizontal plate 430 which surround and support preloaded balls 431 rollable over a vertical extension 432 of the Z' guide rail 27 mounted in the bed 11 of the machine.

To maintain the balls 431 in the preloaded condition, a roller 435 is engageable with the bottom surface of the rail beneath each of the assemblies 426, 427. As best seen in FIG. 29, each roller 435 is mounted upon an eccentric portion of a support shaft 436 which is in turn rotatably mounted within a depending section 437 of the base 420. On its inner end, the shaft 436 has a generally semicylindrical section 438 mounted for rotation under the control of a pair of setscrews, 439, 440, the ends of which abut against a flat surface 441 of the semicylindrical section of the shaft 436. By tightening one of the two setscrews 439, 440 and loosening the other, the shaft 436 may be rotated so as to move the eccentric portion 442 and the roller mounted thereon, toward or away from the bottom surface of the rail 27.

Movement of the Z' slide 32 along the Z' axes or rails 26 and 27 is effected by a rotary hydraulic motor 450. This motor is mounted on a depending post 451 of the base 420 of the Z' slide and is operative to drive a spur gear 452 mounted on the end of the output shaft 453 of the motor 450. The gear 452 engages the teeth of a stationary rack 454 on the bottom of the rail 26 such that rotation of the gear 452 effects movement of the motor and thus the attached slide 32 relative to the stationary rack.

The flow of fluid to the hydraulic motor 450 is controlled by a hydraulic servo valve 455. Since this is a conventional commercially available hydraulic valve, it will not be described in detail. One such valve which has been found to be suitable for this application is a two stage servo valve manufactured by Easton Controls, Inc. of Manchester, New Hampshire. The flow of fluid through this valve is controlled by the positioning of a valve control arm 456 which is normally biased outwardly from the servo valve housing into a position in which the end of the valve control arm 456 abuts against one arm 457 of the valve control stylus 43. This stylus is generally T-shaped and is mounted for pivotal movement about the intersection of the T upon a stationary pivot post 458. An arm 459 of the stylus extends outwardly through the base 420 of the Z' slide 32 and is engageable with three different Z' stop abutments; a Z' stop abutment 460 mounted upon the reference wing 38 of the turret Z axis slide 17, a stop abutment 499 on the reference bar 50 at the Z' standby position, and the abutment 48 on the bed of the machine near the magazine. When the stylus 43 is engaged with the abutment 460, the machine is in a synchronized mode of control in which the stylus arm remains in engagement with the abutment 460 and the Z' slide follows the movement of the Z axis slide 17, as is explained more fully hereinafter.

A third arm 461 of the stylus 43 is operatively connected to a pair of pneumatic motors 462 and 463. The motor 463 is a conventional two-way pneumatic motor which has a piston rod 464 pivotally connected to the stylus arm 461. This motor 463 is operative to bias the stylus 43 in a direction opposite to that in which the abutments bias it, when engaged with the stylus, as is explained more fully hereinafter.

The piston rod of the other pneumatic motor 462 is connected by a pin and slot connection 466 to a pivoted plate 467 mounted upon a stationary pivot post 468 of the Z' slide base 420. This plate 467 has a rectangular recess 469 mounted over a vertical extension 470 of the stylus arm 461 and is engageable with the extension 470 under some operating conditions, as is explained hereinafter. A pair of adjustable stops 471, 472 limit pivotal movement of the plate 467 upon the post 468.

Air flow to the cylinders of the two air motors 462, 463 is controlled by a solenoid A2 which actuated a four-way valve 475, and by a pair of air switches or valves S39 and S40 mounted upon the Z' slide so as to be movable with the slide. Pivotally mounted actuating arms 477, 478 control actuation of the switches S39, S40, respectively. Arm 477 is engageable with a ramp down cam 465 on the reference wing 38 of the Z axis slide 17 at the synchronization position of the Z' slide. Arms 478, 477 are engageable with cams 500 and 501, respectively, at the standby position, and arm 478 is engageable with a cam 479 at the magazine so as to control opening and closing of the switches S39, S40. When the Z' slide is moving toward the turret, the actuating arm 477 and switch S39 cooperate with the valve 475 to control displacement of the motor 462. When the Z' slide is moving away from the turret, the arm 478 (FIG. 32) and switch S40 control the motor 462.

In operation, movement of the Z' slide toward the turret is initiated by moving the Z' slide stylus 43 from the null or centered position (FIG. 30) in a counterclockwise direction to that position shown in FIG. 31 in which the arm 459 of the stylus is angled toward the turret. This movement is effected by moving the piston 464 of the bias motor 463 into the cylinder of the motor until the stylus arm 459 abuts against the stylus supporting block. When the stylus 43 is in this position, the Z' slide moves at a high speed toward the turret until the deceleration control switch S39 is actuated by engagement of the switch actuating arm 477 with the ramp down control cam 465 attached to the movable wing 38 of the turret Z slide 17. Actuation of this switch S39 causes the piston 473 of the speed control motor 462 to be moved outwardly, as is explained more fully hereinafter in conjunction with the pneumatic circuit of FIG. 47. Outward movement of the piston 473 results in counterclockwise rotation of the stylus control plate 467 until the plate abuts against the stop 472, as illustrated in FIG. 32. During rotation of the plate 467 in a counterclockwise direction, a side edge of the recess 469 of the plate engages the stylus arm extension 470 and moves the stylus 43 in a clockwise direction against the bias of the motor 463 to the intermediate or slow speed position illustrated in FIG. 32. In this position of the stylus 43, the servo valve 455 reduces the flow of fluid to the rotary motor 450 so as to slow or decelerate the Z' slide. The Z' slide then continues to move toward the turret at a slow speed until the stylus arm 459 of the stylus 43 abuts against the stop 460 of the Z' reference wing 38 of the turret carriage. Upon abutment of the stylus arm 459 with the stop 460, the stylus is rotated in a clockwise direction against the bias of the motor 463 until the stylus arm reaches a null or centered position as illustrated in FIG. 33. In this position of the stylus, all forward movement of the Z' slide is stopped relative to the turret Z slide. Thereafter, the Z' slide 32 follows the movements of the Z axis slide 17 so long as the stylus 43 is held in engagement with the abutment 460 by the biasing motor 463.

To initiate movement of the Z' slide toward the magazine or away from the turret, the stylus 43 is rotated in the clockwise direction by moving the piston 464 outwardly relative to the cylinder of the biasing motor 463. This movement of the piston 464 is effected by a pneumatic circuit which is completely explained hereinafter. With the stylus 43 in the position to which it is moved by the biasing motor 463 and out of engagement with the deceleration control plate 467, the slide moves at high speed toward the magazine until the deceleration control arm 478 of the switch S40 engages either a ramp down cam 500 of the vertically movable abutment 50 or a ramp down cam 479 (FIG. 34) at the rear of the machine (depending upon whether the slide 31 is to be stopped at the Z' standby position or at the magazine).

As may be seen most clearly in FIGS. 18 and 19, the movable abutment 50 comprises a vertically movable bracket 490 attached to the upper end 491 of a piston rod 494 of fluid motor 492. The cylinder 493 of this motor 492 is attached to the underside of a stationary support plate 495 which is in turn mounted upon the bed 11 of the machine. Guide pins 498 extend upwardly from the plate into apertures of the bracket 490. A washer 496 is bolted to the lower end of the piston rod 494 beneath the cylinder 493. A compression spring 497 located between the cylinder and the washer 496 biases the piston rod 494 downwardly.

Three vertically spaced abutments 499, 500, 501 extend laterally from the bracket 490. These abutments are slidably mounted within the T-shaped grooves 502 of the bracket and are clamped in adjusted positions on the bracket 490 by nuts 503 threaded onto studs 504 of the abutments 499, 500, and 501.

When the Z' slide is to be stopped at the standby position, the bracket 490 is lowered by the fluid motor 492 to the solid line position of FIG. 18. In this position, the cams 500 and 501 are located in the path of movement of the actuating arms 478 and 477, respectively, of the Z' deceleration control switches S39 and S40 and the stop 499 is in the path of stylus arm 459. If the Z' slide is to move past the Z' standby position, the motor 492 is actuated by the pneumatic circuit of FIG. 47 so as to raise the bracket 490 into the phantom position illustrated in FIG. 19 in which the abutments 499, 500, 501 are out of vertical alignment with the switch control arms 477, 478 and stylus 459.

If the Z' slide is to be stopped in the standby position, the reference bar 50 is lowered into the position illustrated in FIG. 18. Assuming the Z' slide to be moving toward the magazine, the switch actuating arms 477, 478 engage the cams 500, 501 of the reference bar and actuate the switches S39, S40 when the Z' slide nears the standby position.

When these switches are actuated, the pneumatic control circuit of FIG. 47 causes piston rod 473 of the deceleration control motor 462 to be pulled into the cylinder of the motor so as to rotate the deceleration circuit control plate 467 in the clockwise direction as is explained more fully hereinafter in connection with the description of the pneumatic, hydraulic circuit. If the Z' slide is moving into the magazine rather than stopping at the Z' reference station, the deceleration switch control actuators 477, 478 move past the Z' reference bar 50 and the Z' slide continues its rearward movement until the actuator 478 of the switch S40 engages the ramp down cam 479 and actuates switch S40. This also results in inward movement of the piston rod 473 of the motor 462 and clockwise rotation of the deceleration control plate 467 (as viewed in FIG. 34) until the plate 467 abuts against the stop 471. As the plate 467 is rotated by the motor 462 in the clockwise direction, the edge of the recess 469 of the plate engages the extension 470 of the stylus arm and causes the stylus 43 to move in a counterclockwise direction against the bias of the piston or motor 463. This movement of the stylus 43 causes the servo valve 455 to supply a reduced flow of fluid to the motor 450 so that the motor is decelerated and then rotates slowly to move the Z' slide rearwardly at a slow rate of travel. This slow rearward travel of the Z' slide continues until the stylus arm 459 engages the stop 499 of the movable abutment 50 or the stop 48 at the magazine (depending upon whether the slide is programmed to stop at the standby position or at the magazine). Upon rearward movement of the Z' slide 32 with the stylus arm 459 engaged with the stop 499 or stop 48, the stylus arm is caused to rotate in a counterclockwise direction (as viewed in FIG. 34) until the stylus reaches a null position in which there is no fluid flowing through the servo valve 455 to the motor 450. At this time, the Z' slide stops all movement until the control system again initiates a new movement.

X' SLIDE DRIVE AND DECELERATION CONTROL

The X' slide drive motor and control system is generally similar to that of the Z' slide. Therefore, similar components of the two drive systems have been given identical numerals except that the corresponding components of the X' slide drive system are distinguished by the suffix X following the numerical designation of the component.

As may be seen in FIG. 37, the X' drive motor 450X is operative to drive a pinion 452X mounted upon its output shaft 453X. This pinion is in driving engagement with a rack 454X attached to the top of the Z' slide 32 so that rotation of the motor effects movement of the X' slide relative to the Z' slide.

The two drive systems are distinguishable in that X' slide deceleration control switches S41 and S42 (which correspond functionally with the Z' deceleration control switches S39 and S40) are actuated by pivotally mounted arms 510 and 511 attached to the forward edge of the X' slide. As may be seen most clearly in FIGS. 3 and 37, the actuating arms 510 and 511 are located in different vertical planes, the arm 510 being engageable by an actuating pin 512 slideably mounted upon the X' slide and the arm 511 being actuatable by a ramp down cam 513 fixedly attached to the front side of the Z' slide 32.

Referring now to FIG. 37, it will be seen that the deceleration control pin 512 is slideably mounted within a pair of brackets 514, 516 attached to the front side of the X' slide 33. This rod or pin 512 extends through apertures 515, 518 of the forwardly extending brackets 514 and 516. A compression spring 520 is located between one bracket 516 and a flange 521 attached to the pin 512 so as to bias the pin 512 toward the reference wing 40 and the flange 521 into engagement with the bracket 514.

When the X' slide is moved toward the turret or reference wing, the inner end 522 of the pin 512 engages the vertical edge 523 of the reference wing 40 attached to the cross-slide 18. Upon continued movement of the X' slide toward the turret, the pin 512 moves outwardly against the bias of the spring 520 and the outer end 525 of the pin 512 engages the actuating arm 510 which then opens the switch S41. Upon movement of the X' slide away from the reference wing 40, the pin 512 moves inwardly until the flange 521 of the pin engages the bracket 514 and disengages the actuating arm 510 of the switch S41.

The actuating arm 511 is engageable with the ramp down cam 513 of the Z' slide. When the X' approaches the outer end of its travel on the Z' slide, the actuating arm 511 engages the ramp down cam 513, causing the arm to be moved inwardly to open the switch S42.

Inward movement of the X' slide toward the turret is terminated when the inner end 526 of the stylus arm 459X engages the vertical surface 523 of the reference wing 40. This results in the stylus 43X being moved to a centered or null position. When the stylus is moved away from the turret, the stylus arm 459X engages an upstanding arm or pin 527 attached to the top of the Z' slide 32. Upon engagement of the stylus 43X with the arm 527, it is moved to a centered or null position and movement of he the X' slide is thereby terminated.

The operation of the X' slide drive and deceleration control system is generally identical to that previously described in connection with the drive and deceleration control system of the Z' slide. Specifically, movement of the X' slide away or from the standby position is initiated by moving the piston rod 473X of the biasing motor 463X outwardly so as to move the stylus 43X in a clockwise direction as viewed in FIG. 37. In this condition of the control system, the control rod 456X of the servo valve 455X is moved inwardly to a position in which it causes the motor 450X to be rotated at high speed in a direction to move the X' slide inwardly at its maximum rate of travel. This high speed movement continues until the end 522 of the pin 512 engages the vertical surface 523 of he X' reference wing 40. Engagement of the pin with the wing 40 causes the pin 512 to be moved outwardly relative to the X' slide against the bias of the spring 520. During this outward movement of the pin 512, its outer end 525 engages in the actuating arm 510 and moves it rearwardly so as to open the switch S41. Actuation of the switch S41 is operable through an appropriate control circuit (as is explained more fully hereinafter) to move the piston 464X of the deceleration control motor 462X into the cylinder of the motor, thereby causing the deceleration control plate 467X to rotate in a clockwise direction about pivot 468X until the plate engages the abutment 472X. During this clockwise rotation of the deceleration control plate 467X, an edge of the recess 469X engages the extension 470X of the stylus 43X and pulls the stylus in a counterclockwise direction to an intermediate or slow speed position. In this position of the stylus 43X, the control rod 456X of the servo valve 455X is moved to a position in which the motor 450X is driven at a slow speed in a direction to move the X' slide inwardly toward the turret.

Slow speed movement of the X' slide toward the turret continues until the end 526 of the stylus arm 459X engages the vertical surface 523 of the X' reference wing 40. This results in the stylus being moved to a nearby centered tracking position in which fluid flow to the motor 450X is controlled so that the X' slide continues to follow the movement of the X' reference wing 40 and the turret 20. The stylus arm 459X then remains in engagement with the reference wing 40, held in this position by the biasing motor 463X.

Outward movement of the X' slide 33 away from the turret is initiated by moving the piston rod 473X of the biasing motor 463X inwardly so as to move the stylus 43X in a counterclockwise direction as viewed in FIG. 37. This position of the stylus results in high speed movement of the X' slide away from the turret until the actuating arm 511 of the switch S42 engages the ramp down cam 513. Actuation of the switch S42 results in outward movement of the piston rod 464X of the deceleration control motor 462X and consequent counterclockwise rotation of the deceleration control plate 467X until the plate engages the stop abutment 471X. During this counterclockwise rotation of the deceleration control plate 467X, a vertical surface of the recess 469X in the plate engages the vertical extension 470X of the stylus 43X and pushes the stylus 43X to an intermediate or slow speed position of the servo valve control rod 456X. The X' slide then continues to move at a slow speed away from the turret until the upstanding post 527 engages the arm 459X and rotates it in a clockwise direction to the centered or null position of the stylus. In this position of the stylus 43X, the control rod 456X is located in a centered position so that there is no fluid flow through the servo valve 455X and consequently no movement of the motor 450X.

HYDRAULIC-PNEUMATIC CONTROL CIRCUIT

Referring now to FIG. 47, there is illustrated the pneumatic-hydraulic control circuit for controlling and effecting the movements of the tool changer which has been heretofore described. This circuit comprises a power supply or source 530 of hydraulic and pneumatic power to a magazine control circuit 531, a turret control circuit 532, a Z' slide control circuit 533, an X' slide control circuit 534, and a gripper control circuit 535. For purposes of clarifying the drawings, each of these individual control circuits is enclosed by a dashed box to which the aforementioned numerical designation is applied.

The hydraulic-pneumatic power supply 530 comprises a variable displacement, constant pressure pump 536 for pumping fluid from a tank 537 to a main pressure line 538. To maintain a constant pressure in the line 538 at all times and thus avoid pressure drops each time a valve is opened, a pressure accumulator 539 is connected to the main pressure line 538 by a fluid conduit 540. The conduit 540 also includes a surge damping check valve 541 and restrictor 542.

A pressure-operated safety switch S25 is connected into the main pressure line 538. This switch is closed only so long as the operating pressure is maintained in the line 538. If the pressure in line 538 drops below a safe operating level, this switch opens, and through the electrical control circuit which is explained fully hereinafter, shuts down the machine.

Air pressure is supplied to the tool changer circuit from a source of shop air pressure 545 via a combination filter-dryer 546 through an air pressure supply line 547. A pressure-operated safety switch S24 is connected to the air pressure supply line 547 and is cooperable with the electrical circuit in the same manner as the switch S25 to shut down the machine in the event that the air pressure falls below a safe operating level.

Fluid pressure is supplied from the main pressure line 538 to the main drive motor 270 of the magazine conveyor 254 via a fluid flow line 550 and a four-way two-position solenoid valve 551. So long as the solenoid A9 of this valve 551 is energized, fluid is supplied from the line 550, through the valve 551 and a line 552, to the pressure intake side of the motor 270. Fluid is exhausted from the motor 270 through a conduit 553 and a four-way three-position solenoid-operated valve 554. When this valve 554 is in its centered position in which neither solenoid A8 nor A10 is energized, it is operative to block all fluid flow therethrough. Energization of the solenoid A8 of the valve connects the exhaust side of the motor 270 to a fluid return line 555 through the valve 554, a conduit 556, a flow control valve RV4, and a conduit 557. When the other solenoid A10 of the valve 554 is energized, the exhaust side of the motor 270 is connected through the line 553, the valve 554, a line 558 and a flow control valve RV3 to the fluid return line 555. The flow control valves RV4 and RV3 are conventional adjustable flow control valves for limiting the flow therethrough. The valve RV4 is set so that its flow rate is much higher than that of the valve RV3. So long as the solenoid A8 of the valve 554 is energized, the motor 270 operates at high speed to drive the magazine conveyor 254 at a high rate of speed. When the solenoid A10 of the valve 554 is energized, the speed of the motor is reduced by reducing the flow through the exhaust side of the motor.

Dynamic braking of the magazine drive motor 270 occurs when both solenoids A8 and A10 of a valve 554 are deenergized together with the solenoid A9 of the valve 551. When this occurs, the inertia of the magazine causes the motor 270 to continue to rotate and act as a pump forcing fluid through a fluid line 560 and a pressure relief valve PR3 to the return line 555 via line 561 and line 557. To prevent cavitation of the intake side of the motor 270 when it is acting as a pump and being dynamically braked, fluid is supplied to the line 552 from the fluid return line 555 via a fluid line 563 and the deenergized solenoid valve 551.

The motor 311 which controls locking and unlocking of tools in the module at the interchange station and the motor 327 which controls locking of a module at the interchange station of the magazine are both air-operated motors. Air pressure is supplied from the main air pressure supply line 547 to these motors through an air pressure line 565 and a pressure regulator 566. From the regulator 566 air pressure is supplied to the motor 311 via an air line 567 and a four-way solenoid valve 568. When the solenoid A11 of this valve is energized, air pressure is supplied through the valve and a line 569 to the upper end of the motor 311, causing the motor to move the tool locking pin 305 (FIG. 22) downwardly into the module. Simultaneously, air is exhausted from the motor 311 via an air line 570, the valve 568, an air line 571, and a muffler 572, to the atmosphere. When the solenoid A11 of the valve 568 is deenergized, high-pressure air is supplied to the lower side of the motor 311 from the air line 567, through the valve 568, and the air line 570. In this condition of the valve 568, air is exhausted from the upper side of the motor 311 through the line 569, the valve 568, air line 571, and the muffler 572 to exhaust, thereby causing the motor to move upwardly and lifting the locking pin 305 from the module.

Actuation of the module locking motor 327 of the magazine is controlled by a four-way solenoid actuated valve 575. When the solenoid A12 of this valve is energized, air pressure is supplied to the upper end of the motor 327 from the pressure regulator 566, through a line 567, and a line 576, through the valve 575, and through an air line 577. In this condition of the valve 575, fluid is exhausted through an air line 578, the valve 575, exhaust line 579, line 571 and the muffler 572 to the atmosphere. Actuation of the solenoid valve 575 thus causes the piston of the motor 327 to move downwardly, thereby moving the magazine locking pin 325 downwardly into the recess 330 of a tool module to lock the tool module against movement. Alternatively, when the solenoid A12 of the valve 575 is deenergized, the pressure line 567 is connected by line 576, valve 575, and line 578 to the lower side of motor 327 and the upper end of the motor 327 is connected by line 577, valve 575, lines 579 and 571 to exhaust so that the motor is biased upwardly to a position in which the locking pin 325 is out of engagement with the module.

The magazine also contains a nozzle 580 (illustrated diagrammatically in FIG. 22) through which an airstream may be directed at the tool module located at the tool interchange station of the magazine. Air is supplied to this nozzle from the air pressure supply line 547 via lines 565, 581, and a two-way solenoid valve 582. This valve when deenergized blocks the flow of air to the nozzle 580. When the solenoid A17 of the valve 591 is energized, fluid under pressure is supplied from the line 590 via lines 593 and 221, to the lower chamber 66 of the motor 67M. When the valve 591 is in this condition, the upper chamber 77 of the motor 67M is connected to exhaust via line 227, the valve 591, and fluid lines 595, 596, and 597. This latter line empties into the tank 537.

When the solenoid A5 of the valve is deenergized, the fluid pressure line 538 is connected to the upper chamber 77 of the turret lifting motor 67M through conduits 590, 593 and 227. At the same time, the lower chamber 66 of the motor 67M is connected to exhaust by conduits 221, 595, 596 and 597.

Turret rotation is controlled by the rotary hydraulic motor 131. The intake port of this motor 131 is always connected to the high pressure line 538 via lines 590 and 600. Operation of this motor 131 is controlled by a double solenoid actuated valve 601 in the exhaust line 602 of the motor 131. When both solenoids A6 and A7 of the valve 601 are deenergized, the valve is centered so that it completely blocks all flow through the exhaust line 602 and holds the motor against rotation. When the solenoid A7 of the valve 601 is energized, the motor 131 is connected by the valve to the return exhaust line 597 via the exhaust line 602, an adjustable needle valve 606, a return line 605 and the line 596. The needle valve 606 is adjusted to a position in which it allows a relatively high volume of fluid to pass through the line 605 so that connection of the exhaust line 605 to the exhaust side of the motor allows the motor to rotate at a high speed and thus to index the turret at a high speed.

When the other solenoid A6 of the valve 601 is energized, the exhaust line 602 of the motor 131 is connected to the fluid return line 597 through another exhaust line 603 and a needle valve 604. The needle valve 604 is more restrictive than the needle valve 606 so that upon energization of the solenoid A6, the motor 131 is operated at a slow rate of speed and the turret is rotated slowly.

In the normal sequence of turret rotation, the solenoid A7 is first energized to enable the turret to rotate at first a high rate of speed until it approaches its final position. At this time, the other solenoid A6 is energized and remains energized until the turret is located in its final position. Then both solenoids are deenergized and the turret rotation is terminated.

Actuation of the two tool clamping motors 169 and 169B of the turret is controlled by a four-way solenoid operated valve 610. When the solenoid A20 of this valve 610 is energized, high-pressure fluid is supplied from the line 538 via line 609 and lines 611, 612 to the tool clamping side 164 of the motor 169 and to the unclamping side 163b of the motor 169b. This results in clamping of the tool in the station 22a of the turret and unclamping of the tool at the station 22a of the turret and unclamping of the tool at the station 21a. Deenergization of the solenoid A20 results in connecting the tool unclamping side 163 of the motor 169 to the pressure line 609 via the valve 610, lines 614 and line 615. At this time, the clamping side 164 of the motor 169 and the unclamping side 163b of the motor 169b are connected to the fluid return line 597 via lines 612, 611, the valve 610, and line 596. Thus, one of the motors 169, 169b, is always clamped and the other unclamped, depending upon the condition of the solenoid valve 610.

A pair of pressure-actuated switches S21 and S21A are connected to the lines 612 and 615, respectively, so as to monitor the pressure in these lines. When the line 612 is connected to the pressure line 538, the normally open pressure switch S21 is closed, and alternatively, when this line 612 is connected to the return line 597, the switch S21 is opened. Similarly, the switch S21A is closed when high-pressure fluid is supplied from the pressure line 538 to the line 615, and the switch S21A is opened when this line 615 is connected to the fluid return line 597. These switches cooperate with the electrical control circuit to insure that that tool of the turret which is located in the workpiece cutting station is properly clamped, as is explained more fully hereinafter in connection with the description of the electrical control circuit.

The flow of air from the air supply line 547 to the orifices 116 of the tool sockets in the turret is controlled by a two-way solenoid actuated valve 520. When the solenoid A14 of this valve is energized, it connects the air supply line 547 to the turret orifices 116 via line 621. Deenergization of the solenoid A14 blocks the flow of air to the nozzle orifices 116. It will be noted that all of the orifices 116 of both stations of the turret are connected to the air pressure line simultaneously. However, air escapes from only those orifices 116 of an empty station. If one station has a tool in it, the orifices 116 of that station are blocked by the tool.

Coolant to the tools of the turret is supplied from a coolant supply source, indicated generally by the numeral 624. This source comprises a positive displacement gear pump 625 driven by an electric motor 626. Programming of the motor 626 is controlled by the tape reader in response to commands programmed onto the tape or other programming source which controls the operation of the complete lathe.

The pump 625 is operative to supply fluid from a tank 627 through a filter 628 and lines 630, 631 to the coolant supply line 186 of the tool block 75 of the turret. The line 186 is, in turn, connected to the valve formed by the channels 180, 181, and the piston rod 161 of the tool clamping motors 169, 169b. These valves automatically block off the flow of fluid to an unclamped tool so that when coolant is supplied to the turret, it is channeled to only that tool which is clamped in the turret. Thus, coolant can never be supplied to an open tool socket of the turret.

Referring now to the Z' slide control circuit 533, operation of the rotary hydraulic motor 450 which effects movement of the Z' slide along the Z' axis is controlled by the servo valve 455. As was explained heretofore in connection with the description of the Z' slide deceleration control mechanism of FIG. 29 thru 34, the direction in which the motor 450 rotates is controlled by the servo valve 455 and the bias motor 463, and the speed at which the motor rotates is controlled by the deceleration control motor 462 and by engagement of the servomotor control stylus 43 with abutments attached to the bed or the carriage of the machine.

High-pressure fluid is supplied via line 635 to the intake port of the servo valve 455 from the high-pressure line 538. Depending upon the position of the stylus 43 of the valve (indicated by a dashed line in FIG. 47) the servo valve 455 is operative to connect either line 636 or line 637 to the high-pressure line 635 and the opposite line to an exhaust line 638. This latter line or conduit 638 is connected to the fluid return line 597 which in turn returns the fluid to the tank 537.

When the line 637 is connected to the high-pressure line 635 thru the valve 455, it causes motor 450 to rotate in a direction to drive the Z' slide toward the turret, and when the line 636 is connected to the high-pressure line 635, the Z' slide is driven away from the turret by the motor 450.

The direction in which the stylus 43 is biased by the bias control air motor 463, is controlled by a direction control valve 475. This valve is a conventional four-way solenoid air valve to which high-pressure air is supplied from the air supply line 547 via a line 640. When the solenoid A2 of this valve 475 is energized, the high-pressure line 640 is connected by the valve 475 and a line 641 to that side of the piston 463 which causes it to move to the position in which it biases the stylus 43 in a direction to cause movement of the Z' slide toward the turret. The line 641 is also connected by a line 642 to the pressure-operated air switch S39. This switch S39 is normally closed air valve which, upon engagement of the actuator 477 of the switch, open so as to connect the high-pressure line 642 to one side of the deceleration control motor 462 via a line 643. When air pressure is supplied to this side of the motor 462, it causes the piston of the motor to move outwardly to the position depicted in FIG. 32 in which the stylus 43 is in an intermediate position and reduces the flow of fluid to the motor 450 to slow the speed of the Z' slide toward the turret. The Z' slide then continues to move toward the turret until the stylus 43 engages the abutment 460 and is moved to a centered or null position in which all fluid flow is blocked to the servo valve 455.

When the Z' slide is to be moved away from the turret, the solenoid A2 of the valve 475 is deenergized, thereby connecting the high-pressure air line 640 to the lower side of the motor 463 via a line 644. Simultaneously, the upper end of the motor 463 is connected to atmosphere by the line 641, valve 475, and line 645. This results in the bias motor 463 moving the stylus 43 in a clockwise direction as viewed in FIG. 34, so that the motor 450 is operated in a direction to move the Z' slide away from the turret. The Z' slide then moves at its maximum rate of speed, as determined by a needle valve 647 in line 637, until the air switch or air valve S40 is opened by engagement of the arm 478 with the ramp down cam 500 or cam 47. This results in the high-pressure line 644 being connected to the upper end of the deceleration control motor 462 via line 650, switch S40, and line 651. This in turn results in the deceleration control motor 462 moving the deceleration control plate 467 and stylus 43 to the position depicted in FIG. 34 in which the Z' slide is slowed to a slow rate of travel away from the turret. The Z' slide then continues move away from the turret until the stylus 43 engages the abutment 502 or 48 and is moved to a null or centered position in which there is no fluid flow through the servo valve 455.

The X' slide fluid and pneumatic control circuit 534 is identical to the Z' fluid and pneumatic control circuit 533. Therefore, the corresponding components of the X' control circuit 534 have been given identical numerical designations followed by the letter X to distinguish them from the same components of the Z' circuit. The only deviation from this numerical designation scheme is that the solenoid of the direction control valve 475X has been designated as A1 rather than A2. This has been done to simplify the description of the electrical control circuit. The two circuits differ in that the X' control servo valve 455X is connected to the high-pressure fluid line 538 by a fluid line 655 and the exhaust or return fluid line of the X' slide is connected to the return line 597 by an exhaust line 656. Additionally, the high-pressure intake port of the solenoid valve 475X is connected to the high-pressure air line 547 by a line 657.

Referring now to the gripper fluid and pneumatic control circuit 535 of FIG. 47, it will be seen that the gripper actuating motor 383M is controlled by a four-way solenoid valve 660. When the solenoid A4 of this valve 660 is deenergized, it results in the connection of the high-pressure fluid line 661 to the clamping slide 385 of the motor 383M via line 661, valve 660, and line 663. In this condition of the valve 660, the unclamping side 386 of the motor is connected to exhaust via line 662, valve 660, and exhaust line 664. To unclamp tool, the solenoid A4 of the valve is energized, thereby connecting the high-pressure line 661 to the unclamping side 386 of the motor 383M and connecting the clamp side 385 of the motor to the exhaust line 664 through the line 663 and the valve 660.

Air pressure is supplied to the gripper from the air pressure supply line 547 through line 666 and a two-way solenoid valve 667. Whenever the solenoid 815 of this valve 667 is energized, air is supplied under pressure through the conduit 666 to the orifices 369 of the conduit 370 in the clamping fingers of the gripper. Deenergization of the solenoid results in blocking airflow to the conduits 370 of the gripper fingers.

The standby reference bar control motor 492 is connected to the air supply line 547 via the air line 565, the pressure regulator 566, line 567, a line 670, and a four-way solenoid valve 671. When deenergized, the valve 671 connects the high-pressure line 670 to the top side of the motor 492 via a line 672. In this condition of the valve 671, the lower side of the motor 492 is connected to the atmosphere by lines 673 and 674. When the solenoid A3 is energized, it results in connection of the high-pressure air line 670 to the lower side of the motor 492 via line 673, and simultaneously, the connection of the top side of the motor 492 to the exhaust line 674 via line 672 and the valve 671. The spring 497 thus assists the high-pressure air in moving the reference bar 50 downwardly to a blocking position relative to the Z' slide whenever the solenoid A3 of the valve 671 is deenergized. When the solenoid is energized, the air pressure must overcome the spring force 497 to move the reference bar upwardly to a nonblocking position relative to the Z' slide, providing a fail-safe feature in the event of air pressure failure in the regulated circuit of the magazine.

ELECTRICAL CONTROL CIRCUIT

The electrical control circuit for initiating and maintaining the tool change control functions heretofore outlined is illustrated in FIGS. 48 through 51. This circuit comprises a solid-state tool change command circuit (FIG. 48); a solid-state tool identification and comparator circuit (FIG. 49); a solid-state turret index control circuit (FIG. 50); and a magnetic relay tool change cycle circuit (FIGS. 51A, 51B, 51C).

A tool change is initiated by programming an H or tool change block of information onto the tape which, when read by the tape reader, 680 commands a tool change. The tape reader 680 is a conventional commercially available unit which forms no part of the invention of this application and has, therefore, not been illustrated in detail. When a tool change block of information is read by the tape reader, it is routed to the tool change command section 681 of the reader and subsequently to the tool change circuitry to initiate a tool change.

The first signal read by the reader 680 indicative of a tool change command is an H signal indicating that the next block of information relates to a tool change. This signal is supplied from the tool change command section 681 of the tape reader to the control circuitry as a negative level logic signal.

In referring to the logic of signals in the control circuits, negative logic has been used in which a zero logic level signal is a+6 volt signal and a one logic level signal is a 0 voltage signal.

Upon reading an H or tool change command, the tape reader supplies an $\overline{H}$ signal from the tool change command section 681 of the tape reader to an AND gate 682. Simultaneously, a $\overline{RO}$ signal is supplied to the same AND gate 682 from the tape reader.

Connected in parallel with the AND gate 682 is a second AND gate 683 which has as its input a TCR signal from a TCR flip-flop 684 (FIG. 49). This TCR signal is a one logic level signal so long as a tool change is occuring, as is explained more fully hereinafter. When a tool change is not in process, the TCR logic is zero so that upon input of the zero level $\overline{H}$ signal, the zero level $\overline{RO}$ signal, and the zero level TCR signal, to the AND gates 682 and 683, a one logic level signal is supplied to an OR gate 687. The output of this gate 687 is then a zero logic signal which is supplied as an input to an inverter 685, the output of which is a one logic level signal to the reset side of a flip-flop H20 and a parallel connected flip-flop H10.

The reset sides of the flip-flops H10 and H20 are interconnected by a lead 686. The same zero logic signal from the OR gate 687 is supplied via a lead 688 to the reset side of a buffer storage board 690. Thus, the two flip-flops H10, H20 and the buffer storage board 690 are placed in the rest condition as a consequence of the detection of an "H" or tool change signal from the tape and the tool change control circuitry is conditioned for a tool selection cycle.

Two other conditions also reset the tool change control circuitry. One of these occurs when a manual selector switch on the machine is turned to the manual select position. When this occurs, a one logic signal is supplied via a lead 691 to the OR gate 687. This results in a zero logic signal being supplied via lead 692 to the inverter 685 and subsequently a one logic level signal to the reset sides of the flip-flops H10 and H20. The zero level signal on lead 692 is also supplied via lead 688 to the buffer storage board 690.

The other condition which initiates resetting of the flip-flops H10 and H20 and the buffer storage board 690 occurs whenever a tool change is completed. As is explained more fully hereinafter, the TCR remains at the one logic level so long as a tool change is continuing and goes to the zero logic level only after completion of a tool change. When the TCR signal goes to the zero level, it is supplied to an "H" reset flip-flop 693. This is a self-steering flip-flop which, upon receipt of the zero level TCR signal at the settrigger input pin 694, causes a one logic level signal to be transmitted to an OR gate 695 via a lead 696. The OR gate 695 is connected in parallel with the OR gate 687 so that receipt of one logic level input to the OR gate 695 results in a zero logic level signal on the lead 692 and consequently, causes the flip-flops H10 and H20 the buffer storage board 690 to be reset.

Having conditioned the control circuitry for initiation of a tool change cycle by means of the "H" signal, the tape moves from the row zero or letter recognition position to the row one position in which the first row of "H" input command is located in the readout station of the tape reader. In the first row of "H" information, three tracks are utilized to set the H10 or H20 or both H10 and H20 flip-flops. It should be remembered that throughout the reading of tool change or H block information by the tape reader, the $\overline{H}$ signal remains at the zero logic level.

When the first row of the H information of the tap is located at the read out station, row one control flip-flop (not shown) is set to a zero logic level and this signal is supplied as a zero logic level signal to AND gates 697 and 698. The AND gate 697 is connected in parallel with an AND gate 700 and the AND gate 698 is connected in parallel with AND gate 701. Both AND gates 700 and 701 have two input terminals, one of which is an H input terminal and the other of which is a track one input terminal in the case of AND gate 700, and a track two input terminal in the case of AND gate 701. If, when the first row of H level information is located at the readout station, track one of the row is punched, a zero logic level signal is supplied to the three input terminals of the parallel AND gates 697, 700. A one logic level signal is then supplied to the set terminal of flip-flop H10. Alternatively, if track two of the first row of the H information of the tape is punched, the three input terminals of the gates 698 and 701 are at zero logic level so that a one logic level output signal is supplied to the flip-flop H20. Alternatively, if both tracks one and two are punched, both flip-flops H10 and H20 are set. In the set condition of the flip-flops H10 and H20, are set output is at the one logic level and the reset output is at zero level. Similarly, when the flip-flop H20 is set, its set output is at one logic level and its reset output is at zero logic level.

The output contacts of both flip-flops H10 and H20 are connected to a decoding matrix or logic circuit 702 operable to decode which of the flip-flops H10, H20 has been set and thus encode the tens digit of the selected tool. In the logic circuit illustrated in FIG. 48, it is possible to select any one of 39 different tools (although only 32 possibilities are utilized). The decoding logic circuit 702 determines which of the zero, one, two or three tens digit has been selected and programmed on the tape.

If both the H10 and H20 flip-flops are in the reset condition, lead 703 from the set output side of the flip-flop H10 is at zero logic level and similarly, lead 704 from the set output of flip-flop H20 is at the zero logic level. In this condition of both flip-flops, both inputs to AND gate 705 are at the zero logic level so that the AND gate 705 has an output at the one logic level supplied to a double driven inverter 706. This inverter 706 then has a zero logic level output on its output lead 707.

If the tens digit of the selected tool is a one, the H10 flip-flop is in the set condition and H20 flip-flop is in a reset condition. In these conditions of the flip-flops, lead 708 which is connected to the reset side of the flip-flop H10 is at the zero logic level and lead 704, which is connected to the set output pin of flip-flop H20 is at the zero logic level so that both inputs to the AND gate 710 are at the zero logic level. SIn this condition of the AND gate 710, it has a one logic level output which is supplied to the double driven inverter 711. The output of this inverter is then a zero logic level signal on lead 712.

If the selected tool has a two in the tens digit command, the flip-flop H20 is in the set condition and the flip-flop H10 is in the reset condition. In these conditions, the lead 703 from the set side of flip-flop H10 is at the zero logic level and a lead 713 from the reset side of flip-flop H20 is at the zero level. Under these circumstances, both inputs to AND gate 714 are at the zero logic level so that AND gate 714 has a one logic level output supplied to the double driven inverter 715. The output of this inverter on lead 716 is then at a zero logic level.

If the tens digit of the selected tool is a three, both flip-flops H10 and H20 are in a set condition. In this condition, the reset outputs of both flip-flops are at the zero logic levels and the connected leads 708, 713 are at the zero logic levels. Both of these leads are connected to the inputs to an AND gate 717 which then supplies a one level output to the double driven inverter 718. The output of this inverter is then a zero logic level signal on control lead 720.

Thus, the decoding matrix 702 is operable to place only one of the leads 707, 712, 716 or 720 at the zero logic level, depending upon whether the tens digit of the selected tool is zero, one, two or three, respectively.

After the tens digit of the selected tool has been read off the tape and supplied as an input to the tool changer control circuit, the tape is advanced to the second row of H command data. This data identifies the units digit of the preselected tool When row two of the H command data is located at the read out head, the buffer storage board 690 is set upon receipt of a $\overline{R2}$ zero level logic signal at the set input pin 721 and zero logic level signals at the input track pins 722, 723, 724 and 725 of the board 690. The pin 722 is a track one pin, pin 723 is a track two pin, 724 is a track three pin, and 725 is a track four pin. Thus, since the coding system is binary, pin 722 represents two to the zero power, pin 723 represents two to the first power, 724 represents two to the second power and 725 represents two to the third power or 1, 2, 4, and 8 respectively. Combinations of these numbers make a binary coded decimal digit, as is conventional in binary coding systems.

As identified in block form the buffer storage board 690, contains four flip-flops 726, 727, 728 and 730 which represent the binary numbers 1, 2, 4 and 8 respectively. These flip-flops function in exactly the same manner as the flip-flops H10 and H20 and are set or reset depending upon the track input on the pins 722, 723, 724 and 725.

These four flip-flops 726, 727, 728 and 730 supply the logic input signals to a decoding matrix 731. This matrix is identical to the matrix 702 except that it is expanded to accommodate and distinguish ten unit signals as opposed to four tens signals in the decoding matrix 702. Thus, one of the ten output leads 732—741 of this decoding matrix is placed at the zero logic level for each digital input command 0—9 to the tool changer control circuit. The decoding matrix 731 has not been illustrated in detail since it is a conventional decoding circuit and is simply an expanded version of the decoding matrix 702. For this reason, it could readily be supplied by those skilled in the control arts.

The output signals on the tens digit identification leads 707, 712, 716, 720 and the units digit identification leads 732 to 741 are supplied as inputs to the tool identification control circuit of FIG. 49. The tens zero command signal on lead 707 is supplied to nine AND gates 742 through 750 via leads 751 through 759. The tens one digit signal on lead 712 is supplied to 10 AND gates 761 to 770 on leads 771 through 780. The tens two digit command signal on lead 716 is supplied to 10 AND gates 781 to 790 on leads 791 to 800 and the tens digit command signal on lead 720 is supplied via leads 801, 802 to two AND gates 803, 804 in the tool command identification circuit.

The zero units command signal on lead 732 is supplied by three leads 805, 806 and 807 to AND gates 761, 781, and 803 respectively of the tool command identification circuit. The units one digit command signal on lead 733 is supplied to four of the AND gates 742, 762, 782, and 804 via leads 808 to 811 respectively in the tool command identification circuit, while the two, three, four, five, six, seven, eight and nine unit command signals on the leads 734 through 741 respectively are each supplied to three of the AND gates of this circuit. Thus, the 31 AND gates 742 to 750, 761 to 770, 781 to 790, 803 and 804 represent the tool commands for each of the 31 different possible tools located in the magazine.

If for example, the tool No. 2 is requested, the tens digit number zero and the units digit No. two will be placed in a zero logic condition so that the AND gate 743 will have a one level logic output supplied via lead 815 to an inverter 816-2. The inverter 816-2 then supplies a zero logic output signal to an AND gate 817-2.

The AND gate 817-2, as well as all of the other 30 corresponding AND gates 817-1, 871-3 to 817-31, has an additional input lead 818-1 to 818-31 connected to a tool identification circuit 719. The inputs to this tool identification circuit are derived from the five different tool identification switches S32 to S36 engageable with the coding rings 238 of the tool. The five coding rings give a possible 32 different combinations, only 31 of which are used. This circuit 719 distinguishes which of the combination of rings has been actuated and thus identifies which of the 31 tools is located adjacent the tool read out head 320 of the magazine. The 31 different output leads 818-1 through 818-31 of the tool identification circuit are each individually connected to one of the inputs of one of the 31 AND gates 817-1 through 817-31. Each of these AND gates 817-1 through 817-31 is connected through an inverter in series with one of the AND gates 742 to 750, 761 to 770, 781 to 790, 803 and 804 so that the complete circuit functions to compare a commanded tool with a tool located at the read out station 320 of the magazine and, if the two signals are identical, to pass a signal through one of the AND gates 817-1 to 817-31.

The output of each pair of AND gates 817-1, 817-2 and 817-3, 817-4—817-29, 817-30 and the single gate 817-31 is supplied as an input to one of 16 OR gates 821 through 836. A single OR gate may be used with each pair of AND gates 817-1 through 817-31 since only one AND gate 817-1 through 817-31 may be actuated at a time. The logic of these OR gates 821 through 836 is such that they have a zero logic level output whenever a one level input is supplied to either of their two input leads. The only time that a one level logic signal is supplied to these OR gates is when a tool change is commanded and that tool is not located at the tool pickup station of the magazine. As an example, assume that tool No. 1 is requested so that two zero level inputs are supplied to the AND gate 742. This results in a one level output to the inverter 816-1 and a zero logic level input to one terminal of the AND gate 817-1. Assuming that tool No. 1 is not located at the pickup station, the tool identification circuit 719 will have a zero level output on lead 818-1 to AND gate 817-1. This results in a zero level output from the gate 821 to a lead 840. If tool No. 1 had been located at the tool interchange station, the signal on lead 818-1 would be at the one logic level and the signal from AND gate 817-1 would be at the zero level with the result that the output of the OR gate 821 would then be at the one level. This latter or one level signal on lead 840 would not set the control flip-flop TCR 684 as is explained more fully hereinafter, with the result that the tool change control relay. TCR would not be energized and a tool change cycle would not be initiated.

Before a tool change is initiated, there must be an empty module at the tool pickup station of the magazine ready to receive a used tool. Thus, the location of a tool at the pickup station indicates that the machine is not conditioned for automatic tool changing and, as is explained more fully hereinafter, the operation of the machine is stopped at the completion of the tool machining cycle which is then in process.

When a zero logic level signal appears on lead 840, it is supplied as an input to a count block AND gate 842. The other signal to this AND gate 842 is supplied from the programming tape and readout head indicating that all of the information for the H block or the tool change block of information has been read from the tape. When both of these conditions have been met, a one logic level signal is supplied from the AND gate 842 through an inverter 843 to the set steering input terminal 844 of the TCR flip-flop 684. The set trigger and reset trigger terminals 845,846, of this TCR flip-flop 684 are connected in parallel to a 250 cycle per second pulse source 847. When the TCR flip-flop 684 receives a zero logic level signal on the set steering terminal 844 followed by a set trigger signal, it sets the flip-flop TCR so that a one logic level signal appears on the set output lead 848 and a zero logic level signal appears on the reset output terminal lead 850. A zero logic level signal on the lead 850 is fed as an input to an inverter 851, and from the inverter 851 through an amplifier 852 to the tool change relay TCR. Energization of this relay TCR initiates a tool change cycle as is explained more fully hereinafter.

The set output signal from the TCR flip-flop 684 is then at a one logic level, which signal is supplied via the lead 848 to the AND gate 683, thereby prohibiting resetting of the flip-flops H10, H20 or the buffer storage board 690. If the tape reader should read another H before the old tool change command has been completely utilized, lead 848 being at the one logic level will preclude the input of any further information into the reset circuit.

The set output from the TCR flip-flop on line 848 is also supplied to the set trigger input 694 of "H" reset flip-flop 693. This signal goes to the one logic level and remains at this level until the tool change is completed, at which time it goes back to the zero logic level. When the signal on lead 848 goes to the zero logic level, it causes the set output of the "H" flip-flop 693 to go to the one logic level. This results in the OR gate 695 going to a zero logic level output with the result that the flip-flops H10, H20 and the buffer storage board 690 are reset.

Figure 48:
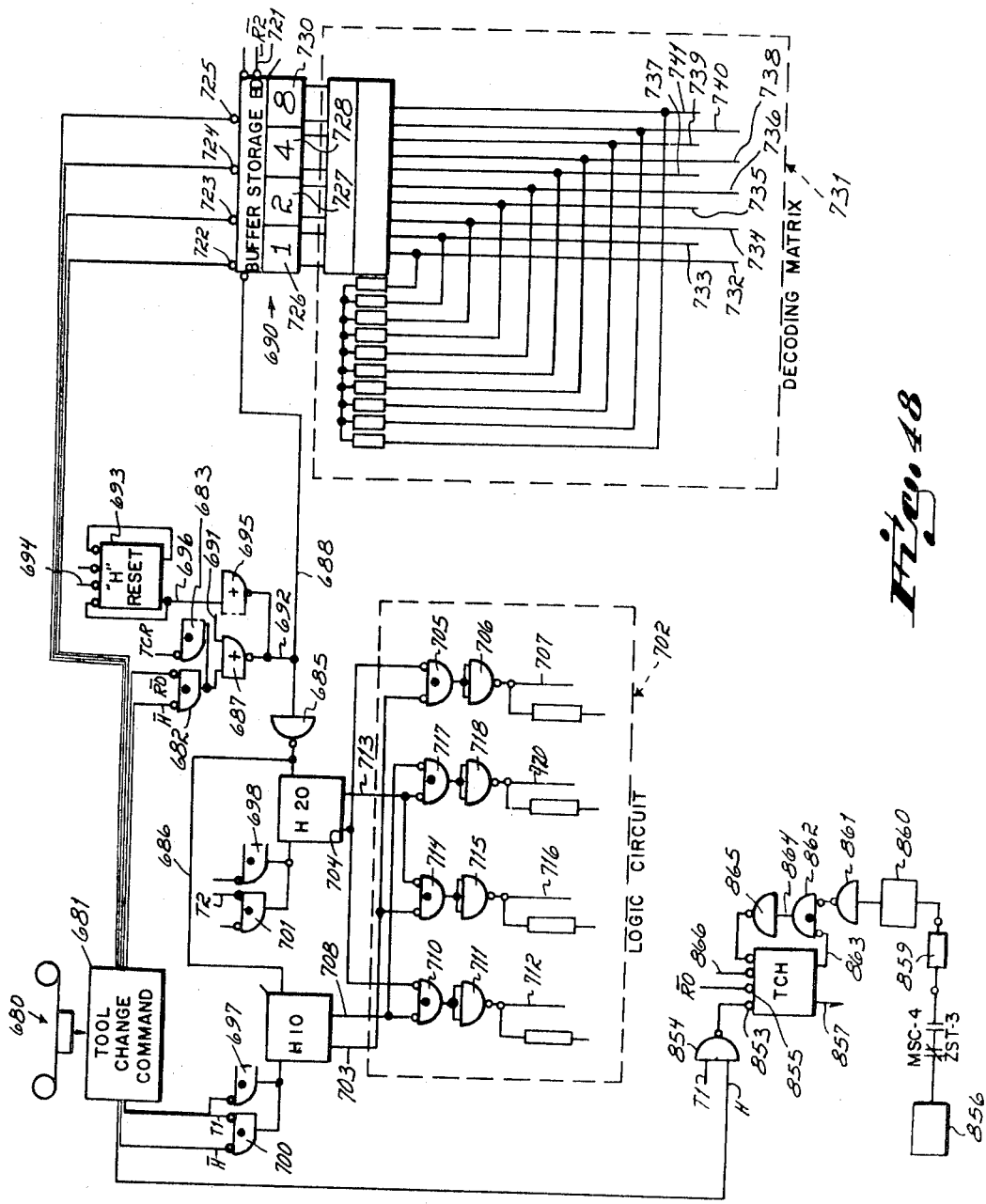

In order to prevent the reading by the tape reader of another H block or tool change block of information before the completion of a tool change cycle, the safety circuit of FIG. 48 is provided. This circuit is operative to stop the tape and prevent any further reading of tool change command information after identifying another H command and before the reading of the first row of the H command block of information. To accomplish this, a tool change hold flip-flop TCH and associated control circuit is provided. This flip-flop TCH has its set steering input terminal 853 connected to the output of an OR gate 854. The input to this OR gate 854 is a positive tool change signal H from the tape reader 680 or a turret index signal T from the tape. Whenever a turret index T signal or a tool change H signal is generated by the tape reader 680, it supplies a one logic signal to the OR gate 854 which then has a zero logic output signal to the set steering terminal 853 of the tool change hold flip-flop TCH. Subsequently, upon reading a row zero $\overline{RO}$ signal of an H block of information on the tape, the set trigger terminal 855 of the flip-flop TCH receives a zero logic signal from the tape reader, causing the tool change hold flip-flop TCH to be set. So long as this tool change hold flip-flop TCH remains set, it has a one logic level output signal on lead 857. This lead 855 is connected through a conventional control circuit (not shown) to the tape reader and is operative, when at the one logic level to hold the tape reader against read out of further information until the tool change hold flip-flop TCH is reset.

On the reset side, the tool change hold flip-flop TCH receives an input from an 80 volt source 856 through a normally closed contact MSC-4 of a magazine search control relay MSC and a normally open contact ZST-3 of a Z standby control relay ZST. The contact MSC-4 is open whenever the magazine is in the process of searching for a tool and the contact ZST-3 is closed only when the Z' slide is in the Z standby position. Thus, a signal is passed through these contacts only when the Z' slide is in the Z standby position and the magazine conveyor is stationary. A signal passed through these contacts is fed through a line filter 859 to a working voltage of 0 volts or one logic level. When at the one logic level, a signal from the control network 860 is fed as an input to an inverter 861 which inverts the signal and puts out a zero logic level signal to an AND gate 862. This AND gate 862 also receives a zero logic signal via a lead 863 from the reset output of flip-flop TCH when the tool change hold flip-flop TCH is in a set condition. The output of this AND gate is a one logic level signal only when the two inputs are at the zero logic levels. This one level signal from gate 862 is fed via lead 864 to an inverter 865, which then puts out a zero logic level signal to the set steering input on the reset side of the flip-flop TCH. The reset trigger input to this flip-flop is supplied via a lead 866 from a reference clock source which generates or puts out a pulse signal of 125kc.

In operation, this tape reader hold circuit operates to hold the tape reader against the read out of further tape information whenever a tool change H signal is supplied to the OR gate 854 or whenever a turret index signal T is supplied to the OR gate 854. The output of this OR gate 854 is supplied to the set steering input 853 of the tool change hold flip-flop TCH which is immediately triggered through terminal 855 by a $\overline{RO}$ signal from the tape reader. This results in the tool change hold flip-flop TCH being set so that an output one logic level signal is supplied via a lead 857 to the tape reader 680. This signal causes the tape reader to stop further read out of information until the flip-flop TCH is reset. Resetting then occurs only if the magazine is stationary (so that the contact MSC-4 is closed) and if the Z' slide is in the Z standby position (so that the contact ZST-3 is closed). When both of these conditions are fulfilled, a signal is fed from the 80 volt source 856 to the AND gate 862, and the tool change hold flip-flop TCH is reset so that a zero logic level signal is supplied via lead 857 from the flip-flop TCH to the tape reader. The reader then completes the reading of the H or T command block of information.

Figure 51A:
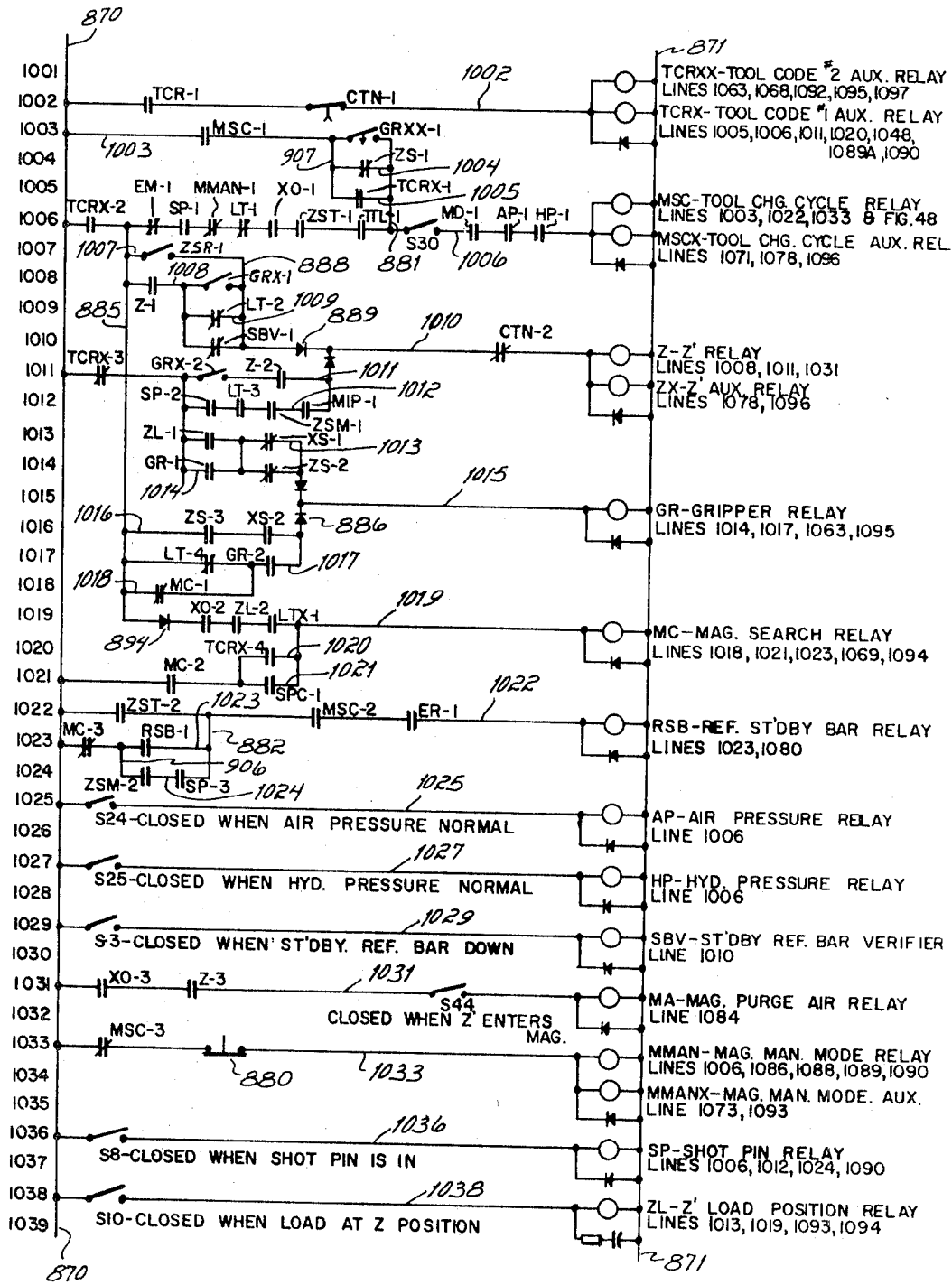
Figure 51B:
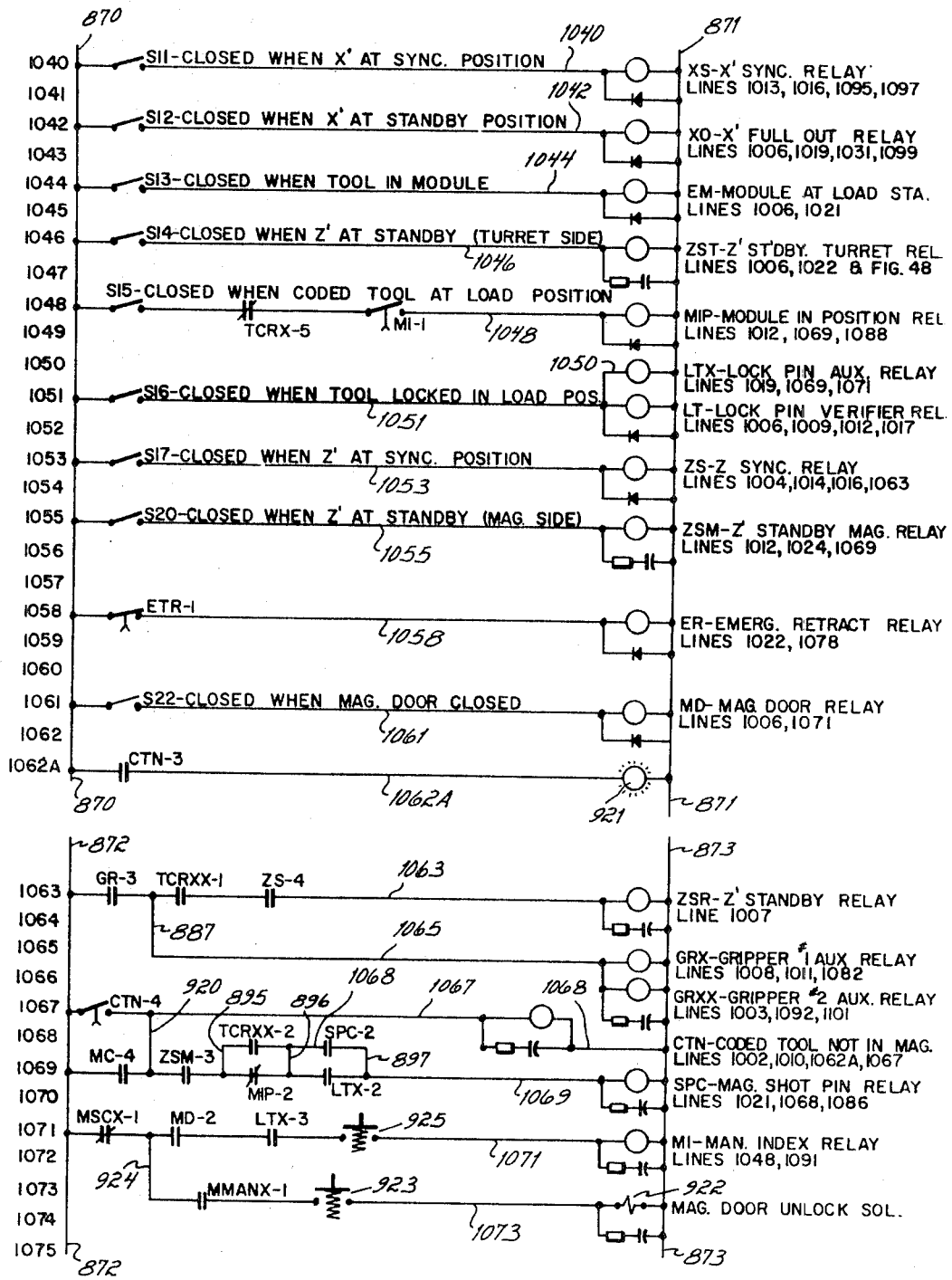
Figure 51G:
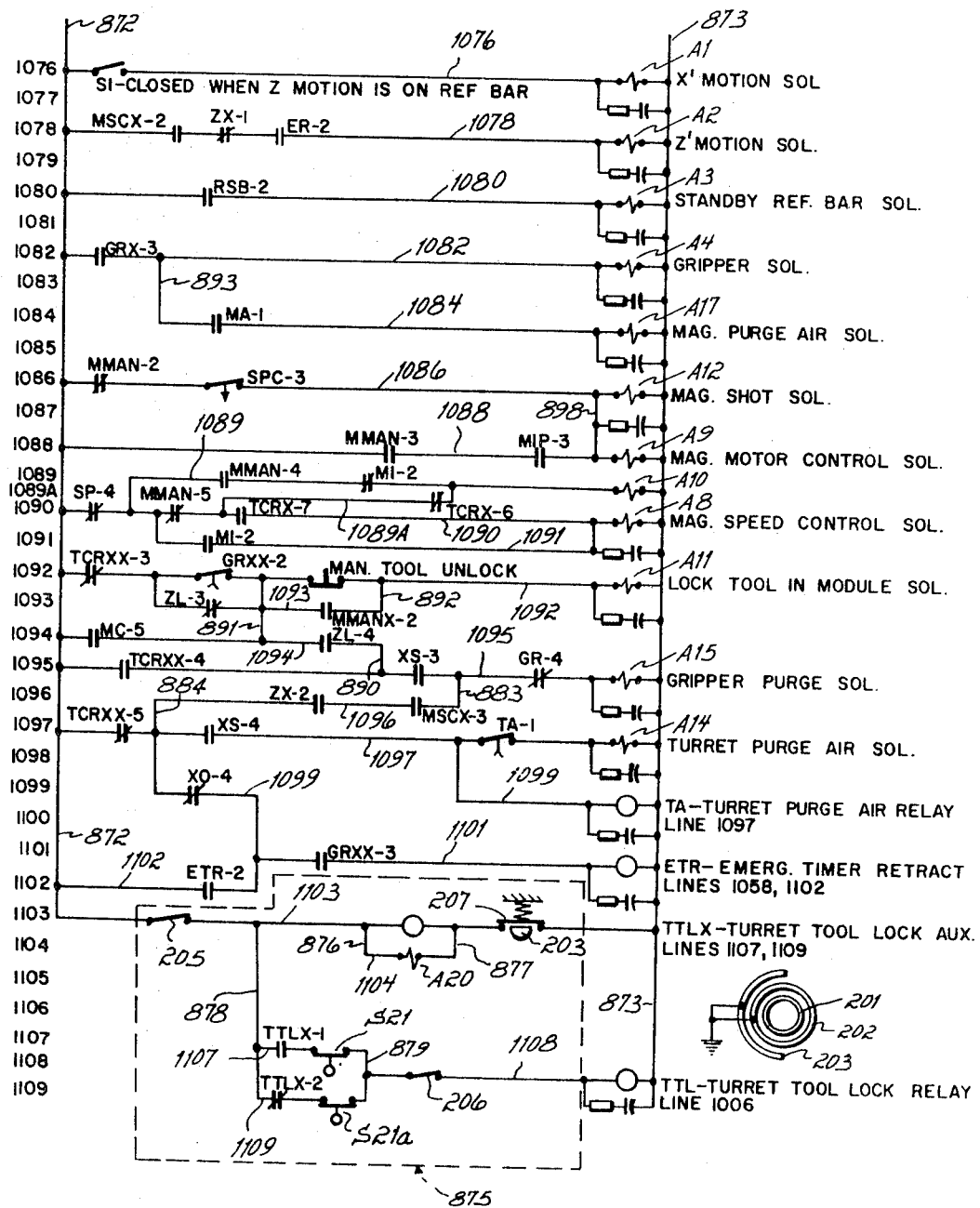

Referring now to FIGS. 51A, 51B and 51C, there is illustrated the magnetic control circuit for controlling the functions of the machine. This circuit includes main leads 870, 871 which are connected to a 24 volt DC power source and main leads 872, 873 which are connected to a 110 volt AC power supply. The control circuit of FIGS. 51A, 51B and 51C is a conventional ladder type circuit diagram in which each branch or horizontal line 1001 through 1109 of the ladder diagram is numbered consecutively along the left-hand side of the diagram. To facilitate reading of the diagram, the control relays are all located along the right-hand side of the diagram where the name of the relay appears together with the numbers of the horizontal branches of lines of the ladder diagram in which contacts of the relays are located.

Figure 52:
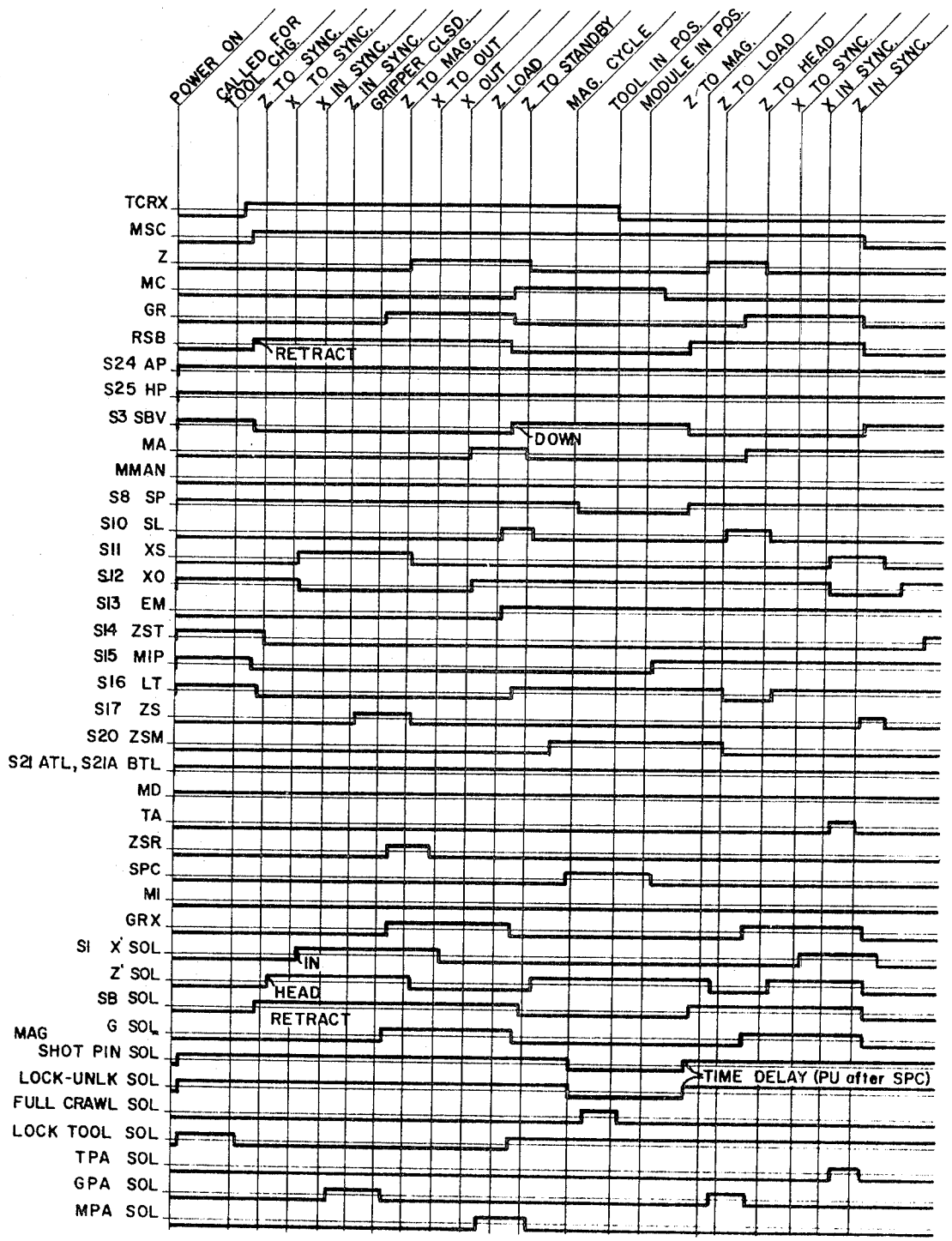
FIG. 52 is a timing chart of the control relays and solenoids of the electrical control circuit.

To further facilitate reading of the diagram, the timing of all of the relays and the control solenoids of FIGS. 51A, 51B and 51C is programmed in relation to the tool change cycle in FIG. 52. With this chart, the condition of each relay and solenoid may be determined throughout the cycle.

As was mentioned hereinabove, completion of the tool change input data or H block of information into the control circuit causes the relay TCR (FIG. 49) to be energized. Energization of this relay results in closing of the contact TCR–1 in line 1002. This contact is in series with a manually closed magazine timer relay contact CTN–1 so that immediately upon closing of the contact TCR–1, a circuit is completed to the relays TCRXX and TCRX (lines 1001, 1002). The contact CTN–1 is a contact of a timer relay CTN which is in series with a magazine control circuit as is explained more fully hereinafter. This contact CTN–1 and the associated relay CTN function to stop the tool change cycle by opening the contact CTN–1 in the event that a tool is not found in the magazine after a predetermined time, as for example, a time equal to approximately two full revolutions or cycles of the tool magazine. If the tool is found, this contact is never opened and has no function in the circuit.

Energization of the relay TCRX results in closing of the normally open contact TCRX–1 in line 1005, which results in energization of the tool change start relays MSC and MSCX (lines 1005, 1006). These relays are energized by the completion of a circuit through lead 1006 via the contact TCRX–2, normally closed contact EM–1, normally contact SP–1, normally closed contact MMAN–1, normally open contacts LT–1, XO–1, ZST–1, TTL–1, switch S30, and normally open contacts MD–1, AP–1 and HP–1. The contact SP–1 is closed as a consequence of energization of the magazine shot pin relay SP which is energized whenever the module locking pin 325 (FIG. 20) is located in a lowered position in engagement with a module at the interchange station. When the locking pin 325 is lowered by the fluid motor 327, the switch S8 is closed, thereby completing the circuit to relay SP via line 1036 in FIG. 51A.

The normally closed contact LT–1 in line 1006 is closed as a consequence of deenergization of the lock bar relay LT (line 1051). This relay LT and the parallel connected relay LTX (line 1050), are deenergized as a consequence of the opening of switch S16. This switch, S16, is open whenever a tool is unlocked in the module at the interchange station of the magazine.

The normally open contact XO–1 (line 1006) is closed as a consequence of energization of the relay XO (line 1042). This relay XO is energized whenever the X' slide is in the full out or standby position in which it is engaged with the switch S12 (FIG. 2). The circuit to the relay XO is completed via switch S12 in line 1042 (FIG. 51B).

Normally open contact ZST–1 (line 1006) is closed upon energization of the relay ZST (line 1046) (FIG. 51B). This relay ZST is energized at the initiation of a tool change cycle as a consequence of the Z' slide being located at the Z' standby position on the turret side of the reference bar 50 so that the normally open switch S14 is closed. Closing of the switch S14 completes the circuit to the relay ZST through the lead 1046.

The normally open contact TTL–1 (line 1006) is closed whenever the tool in the rear station 22a (FIG. 2) of the turret is unclamped. This condition is detected by the turret tool lock verification control circuit enclosed by the dashed box 875 of FIG. 51C. This circuit, in cooperation with the pressure switches S21 and S21a in the hydraulic clamping circuit (FIG. 47), insures that the tool in the rear station 22a of the turret is unclamped and the tool in the forward station 21a is clamped. When this condition obtains, the relay TTL (line 1108) is energized and the normally open contact TTL–1 is closed.

The tool lock verification circuit 875 comprises the pressure switches S21 and S21a which are connected in parallel with each other and are each connected in series with one contact TTLX–1 and TTLX–2, respectively, of the turret tool lock relay TTLX.

The brushes 205, 206, and 207 and the commutators 201, 202 and 203, which interconnect the turret base and tool block (FIG. 39), act as switches in this turret tool lock verification circuit. The brushes 205, 206 and 207 are movably mounted in the tool holder block 75 of the turret so that they rotate with the tool holder block throughout its indexing operations. The commutators 201, 202 and 203 are all fixedly mounted below the turret so that they are stationary at all times. The commutator 201 is connected to a 110 volt source of power while the commutators 202 and 203 are both connected to ground, as indicated by the turret slip ring layout diagram to the right of the turret tool lock verification circuit 875 on FIG. 51C.

Since the brushes 205 and 206 are in contact with the commutators 201 and 202 at all times, these brushes and the associated commutators act as a closed switch at all times in the turret tool lock verification circuit. The contact 207, however, engages the commutator 203 only during that half of the turret rotational cycle when the tool station 21a is facing toward the headstock or is in a tool cutting position. When the other tool station 22a is located in a tool cutting position, the switch formed by the brush 207 and the commutator 203 is open.

In operation, this circuit 875 maintains the turret tool lock verification relay TTL energized at all times so long as the circuit is operating properly and that tool which is located at the tool cutting station is clamped in the turret. Assuming that the tool in the station 21a of FIG. 38 is facing the headstock and is in a cutting position, its tool should be clamped, as shown. The tool of this station is clamped so long as the tool clamp solenoid A20 (FIG. 47 and line 1104 of 51C) is energized so that fluid is supplied through the valve 610 to the pressure port 166b of the tool clamping motor 169b of turret station 21a. The circuit to this solenoid is completed at this time from lead 872, via lead 1103 through brush contact 205, lead 876, through the solenoid A20, lead 877, brush contact 207 to lead 873. At the same time, the turret tool lock relay TTLX is energized since it is connected in parallel with the solenoid A20. Energization of the turret tool lock relay TTLX closes the normally open contact TTLX–1 (line 1107) of relay TTLX., and assuming the pressure switch S21 to be closed (because fluid is being supplied to the pressure side of the clamping motor at station 21a of the turret), completes a circuit to the turret tool lock verification relay TTL. This circuit is completed from lead 872 via line 1103, brush contact 205, lead 878, contact TTLX–1, pressure switch S21, lead 879 and brush contact 206. So long as the relay TTL is energized, a feed hold signal is not initiated in the main control circuit of the machine so that the machine operates according to the programmed schedule. If, on the other hand, the tool in station 21a had not been locked in the turret, and the tool in station 22a unlocked, the pressure switch S21 would have remained open so that the relay TTL would have been deenergized. The feed hold signal resulting from deenergization of the relay TTL would have stopped all machine operations and opened the contact TTL–1 in line 1006 until the tool was properly clamped as indicated by detection of clamping pressure at the pressure switch S21.

When the turret is indexed to present the other station 22a of the turret to the workpiece or headstock, the brush contact 207 rides off of the semicircular commutator 203 and thus breaks the circuit in line 1103 of FIG. 51C. Opening of this contact 207 deenergizes the solenoid A20 and the turret tool lock relay TTLX. As was mentioned hereinabove in connection with the description of the hydraulic circuit diagram of FIG. 47, deenergization of the tool clamping solenoid A20 results in movement of the turret tool clamp control valve 610 to a position in which clamping pressure is supplied to the clamping motor 169 of turret station 22a and unclamping pressure is supplied to the tool in station 21a. Assuming the tool in station 22a to be properly clamped, the pressure switch S21a will be closed with the result that a circuit is completed to the turret tool lock verification relay TTL from lead 872, through brush contact 205, lead 878, normally closed contact TTLX–2, pressure switch S21a, lead 879 and brush contact 206. Had the tool at station 22a been unclamped, the pressure switch S21a would have opened so that the turret tool lock a feed hold signal to the control circuit (not shown) of the lathe so as to stop all machining operations and simultaneously opening the contact TTL-1 (line 1006) to stop the tool change operation.

The switch S30 in lead 1006 is closed by one of two lobes on the cam 150 (FIG. 45) whenever the tool turret is in one of the two tool turret index positions in which a tool may be removed from the turret 20. Consequently, the lobes on the cam 150 are 180° apart and are so located on the cam that they close the switch S30 when either tool station is in a position in which the tool contained therein is properly located for movement of the gripper of the tool transfer slide into engagement with the tool contained in the turret tool station.

The normally open contact MD-1 (line 1006) is closed by energization of the magazine door relay MD (line 1061). This relay MD is energized whenever the door 253A FIGS. 1 and 20) of the magazine housing 253 is closed. The door is provided as an access area to the tool storage magazine to facilitate insertion of tools into the magazine or replacement of tools. Whenever the door 253A is closed, a safety switch S22 (FIG. 20) is closed so that a circuit to the relay MD is completed via lead 1061 through the closed switch S22.

The normally open contact AP-1 in lead 1006 is closed upon energization of an air pressure verifier relay AP (line 1025). This relay AP is energized upon closing of the pressure switch S24 (FIG. 47) indicating that sufficient air pressure is being supplied to the machine. Closing of this switch results in completion of the circuit to the relay AP through the lead 1025 and the normally open switch S24.

The normally open contact HP-1 in lead 1006 is closed upon energization of the hydraulic pressure verifier relay HP (line 1027). This relay HP is energized as a consequence of closing of the pressure sensitive switch S25 (FIG. 47) indicating that sufficient hydraulic pressure is being supplied to the machine. Closing of this switch S25 results in completion of the circuit to the relay HP through the switch S25 and lead 1027 (FIG. 51A).

The normally closed contact EM-1 (line 1006) of relay EM (line 1044) is closed so long as an empty module is located in the tool magazine at the tool interchange station of the magazine. If a tool is located in the module at the magazine interchange station, it will contact the switch S13 (FIG. 21) thereby completing the circuit to the relay EM via lead 1044 and opening the relay contact EM-1.

The normally closed contact MMAN-1 in lead 1006 is a contact of a magazine manual mode relay MMAN (lead 1033). This relay is deenergized so long as the magazine is not in a manual mode of control. To operate the magazine manually, the manual magazine mode button or switch 880 is moved to a manual control position in which it closes a circuit to the relay MMAN via lead 1033 and normally closed contact MSC-3 of relay MSC (line 1005). To initiate an automatic tool change cycle, the switch 880 must be moved to the magazine mode automatic control position which the switch 880 is opened to deenergize the relay MMAN. So long as this relay is deenergized, the contact MMAN-1 in lead 1006 remains closed so that the tool automatic change cycle may be initiated.

When all of the conditions enumerated above have been met, as indicated by closing of all of the contacts in lead 1006, the tool change start cycle relays MSC and MSCX (lines 1005 and 1006) are energized. Energization of these relays MSC, MSCX results in closing of the holding contact MSC-1 in lead 1003 so that a holding circuit is then completed to the relays MSC and MSCX via lead 1003, the closed contact MSC-1, lead 907, closed contact TCRX-1, lead 881 and lead 1006.

When the relay MSC is energized, it results in closing of the relay contact MSC-2 in lead 1022 so that a circuit is then completed to the Z' reference standby bar relay RSB via lead 1022, through the normally open contact ZST-2, the contact MSC-2, and the normally open contact ER-1. The contact ER-1 is normally open contact of an emergency transfer slide retract relay ER (line 1058) which is only deenergized as a consequence of manual actuation of an emergency transfer slide retract button as is explained more fully hereinafter. Energization of the Z' reference standby bar relay RSB results in closing of the contact RSB-1 in lead 1023 with the result that a holding circuit is then completed to the relay RSB via lead 1023 through the normally closed contact MC-3, contact RSB-1, lead 882 and line 1022.

When the Z' reference standby bar relay RSB is energized, it results in closing of the contact RSB-2 in lead 1080 so as to complete a circuit through lead 1080 to the standby reference bar solenoid A3 (FIG. 47 and 51C). When this solenoid A3 is energized, fluid is supplied under pressure to the Z' reference bar motor 492 (FIG. 18) with the result that the motor causes the Z' reference bar 50 to be raised to a nonblocking position relative to the Z' slide stylus 43. When no longer blocked by the reference bar 50, the Z' slide 32 is free to move past the reference bar 50 along the Z' axis.

When the relay MSCX is energized, it results in closing of the contact MSCX-2 in lead 1078 so as to complete a circuit to the Z' solenoid A2 via lead 1078, through contact MSCX-2, closed contact ZX-1 and ER-2. As was heretofore explained in connection with the description of FIG. 47, energization of the Z' solenoid A2 results in the stylus biasing motor 463 being biased in a direction to cause the Z' slide 32 to move toward the turret 20.

The Z' slide 32 moves at high speed toward the turret until the abutment 39 (FIG. 2) of the slide engages the switch S1 attached to the Z' reference wing 38. Closing of this switch S1 through lead 1076 completes a circuit to the X' motion control solenoid A1. Energization of the X' solenoid A1 results in the stylus biasing motor 463X being biased in a direction to cause the stylus 43X to initiate movement of the X' slide 33 toward the turret 20 through the pneumatic-hydraulic circuit of FIG. 47 as has previously been described.

Movement of the tool transfer slide 31 toward the tool turret then proceeds along both the X' and the Z' axes until the X' slide is slowed by engagement of the air switch S41 with the ramp-down pin 512 when the pin abuts the edge 523 of the reference wing 40. This results in the deceleration control motor 462X being moved to an intermediate or slow speed position by the pneumatic-hydraulic control circuit of FIG. 47, as has been previously explained.

Subsequently, the Z' slide is slowed by engagement of the air switch S39 with the ramp down cam 465 on the Z' reference wing 38. This results in opening of the air switch S39 and deceleration of the Z' slide through the previously described pneumatic-hydraulic control circuit.

The X' slide continues to move at slow speed toward the turret 20 until the stylus 43X engages the X' reference wing 40 and thus becomes locked into synchronization with the X cross-slide 18. When the stylus 43X is located in a synchronous position, the switch S11 (FIG. 2) of the X' slide is closed so as to complete a circuit via lead 1040 to the X' synchronization relay XS. Energization of this relay XS results in closing of the contact XS-3 in lead 1095 so that a circuit is completed to the gripper purge air control solenoid A15 via the normally open contact TCRXX-4 of relay TCRXX, contact XS-3, and normally closed contact GR-4. Energization of the solenoid A15 opens the valve 667 (FIG. 47) so that high-pressure air is supplied through the orifices 369 of the gripper fingers and is blown against the tool clamping notches 229, 231 of the tool in the station 22A of the turret.

The Z' slide continues to move toward the turret after the X' slide is in synchronization with the X slide until the stylus 43 engages the abutment 460 on the Z' reference wing 38. When the Z' slide reaches the synchronized position, it engages and closes the switch S17 (FIG. 2), thereby completing a circuit to the Z synchronization relay ZS via a lead 1053. Energization of the Z synchronization relay ZS causes the gripper purge air to be turned off and the turret purge air to be turned on. The turret purge air is turned on as a consequence of the completion of a circuit to a turret purge air solenoid A14 FIGS. 47 and lead 1097 in 51C) via a circuit through lead 1095, the contact TCRXX-4, contact XS-3, lead 883, lead 1096, contact MSCX-3, contact ZX-2, lead 884, lead 1097, contact XS-4, and normally closed contact TA-1.

Simultaneously with the completion of the circuit to the turret purge air solenoid A14, a circuit is completed to a parallel turret purge air timer relay TA (line 1099). This relay TA has a time constant of 2 or 3 seconds which insures that the relay remains on for a sufficient length of time to enable the tool to be completely inserted into the turret or extracted from it. Approximately 2 or 3 seconds after the turret purge air solenoid A14 is energized, the contact TA-1 (lead 1097) of the turret purge air timer relay TA is opened so as to open the circuit to the solenoid A14 and turn off the air to the turret.

After both the Z' and X' slides are in synchronization with the Z axis slide 17 and X axis slide 18, respectively, (so that the relays ZS and XS are both energized) a circuit is completed to a gripper relay GR (line 1015) via lead 1006, contact TCRX-2, lead 885, lead 1016, contacts ZS-3 and XS-2, through diode 886, and lead 1015. Energization of the relay GR causes two timer relays GRX and GRXX (lines 1065 and 1066) to be energized through a circuit which includes a normally open contact GR-3 of relay GR. This circuit is completed from lead 872 through contact GR-3 in lead 1063, lead 887, and lead 1065. Completion of the circuit to the timer relay GRX completes a circuit to the gripper control solenoid A4 (FIGS. 47 and lead 1082 in 51C) from lead 872 via contact GRX-3. Energization of the solenoid A4 causes the gripper arms 400, 401 to be closed by motor 383M as has been heretofore described in connection with the description of the pneumatic-hydraulic diagram of FIG. 47.

Upon energization of the relay GR, a circuit is completed to a Z' standby timer relay ZSR (lead 1063) via contact GR-3, contact TCRXX-1, and contact ZS-4. A predetermined time after the relay ZSR is energized (and the gripper fingers are closed) contact ZSR-1 (lead 1007) of the relay ZSR is closed, thereby completing a circuit to a Z' slide control relay Z (lead 1010) via the lead 1006, contact TCRX-2, lead 885, lead 1007, contact ZSR-1, lead 888, lead 1010, diode 889 and normally closed contacts CTN-2. A second Z' slide control relay ZX, connected in parallel with the relay Z, is also energized simultaneously with the relay Z. When energized, the Z and ZX relays cause the Z' slide 32 to move away from the tool turret 20 and toward the magazine. This occurs as a consequence of the opening of the normally closed contact ZX-1 in lead 1078 which results in the opening of the circuit to the Z' control solenoid A2. As was previously described in connection with the description of the pneumatic-hydraulic diagram of FIG. 47, deenergization of this solenoid A2 results in the Z' motor 450 being driven in a direction to move the Z' slide 32 away from the turret 20.

Energization of the Z relay pulls in a holding contact Z-1 in lead 1008 which is operative to complete a holding circuit around the contact ZSR-1 via contact Z-1, and a time delay out contact GRX-1 of relay GRX. This holding contact then maintains the Z relay energized until a predetermined time after the gripper opens and the gripper relay GRX opens.

Upon initial movement of the Z' slide away from the turret, and out of engagement with the switch S17, the Z synchronization relay ZS in lead 1053 becomes deenergized As the Z' slide continues to move rearwardly, the switch S1 is opened when the Z' slide passes off of the Z'reference wing 38. Opening of this switch causes the circuit to the X' solenoid A1 to be opened and the solenoid A1 to be deenergized. Deenergization of the solenoid A1 causes fluid to be supplied through the valve 475X to the motor 450X in a direction to cause the X' slide to be driven away from the turret 20, as was previously described in connection with the description of the fluid control circuit of FIG. 47.

Upon initial movement of the X' slide away from the turret, the switch S11 opens so as to deenergize the X' slide synchronization relay XS.

When the X' slide reaches its full out or standby position, the switch S12 (FIG. 2) is closed, thereby completing a circuit to the X' full out relay XO (lead 1042) through the switch S12.

The Z' slide continues to move rearwardly after the X' slide is in the full out or standby position until the Z' stylus 43 engages the ramp down cam 47, thereby causing the Z' slide to be slowed. The slide continues to move at slow speed until the Z' stylus 43 engages the abutment 48 and is moved to the null or centered position. At this time, the switch S10 (FIG. 2) is closed, verifying that the Z' slide is at the tool interchange station of the magazine with the tool which had been picked up at the turret. Closing of the switch S10 in lead 1038 then completes a circuit via the lead 1038 (FIG. 51A) to the Z load position relay ZL.

Energization of the relay ZL completes a circuit to a tool lock control solenoid A11 (FIGS. 47 and lead 1092 in 51C). This circuit is completed via lead 1095, contact TCRXX-4, lead 890, contact ZL-4, in lead 1094, lead 891, normally closed contact MMANX-2 in lead 1093, lead 892 and, lead 1092 to lead 873. Energization of the solenoid A11 causes the valve 568 (FIG. 47) to be moved to a position in which the tool lock motor 311 is actuated to move a module locking pin 305 downwardly into the module at the interchange station, as was explained hereinabove in connection with the description of FIG. 47.

When the tool is locked in the module by the fluid motor 311, the normally open switch S16 (FIG. 20) is closed, thereby completing a circuit to the lock pin relay LT in lead 1051 and the parallel connected lock pin auxiliary relay LTX in lead 1050 via the switch S16 and the lead 1051 (FIG. 51B).

During movement of the Z' slide along the Z' axis toward the magazine, and just about the time that Z' slide begins to enter the magazine, an abutment on the slide engages the switch S44 (FIG. 2) causing this normally open switch (FIG. 51A) to close, thereby completing a circuit to a magazine purge air relay MA via lead 1031, contact XO-3, contact Z-3, and switch S44. Energization of the relay MA completes a circuit to a magazine purge air control solenoid A17 (lead 1084) via lead 1082, contact GRX-3, lead 893, and contact MA-1 (in lead 1084). Energization of this solenoid A17 results in the opening of a pneumatic circuit to air orifices 580 directed at the empty module of the magazine. This airstream blows any dust, dirt, debris, etc. off of the module so that the entering tool may be seated therein.

When the Z' slide reaches the load position in the magazine, it abuts the switch S13, verifying that the Z' slide has stopped moving and is located in the magazine. Closing of the switch S13 completes a circuit to a magazine empty relay EM via lead 1044 (FIG. 51B) and switch S13.

Upon energization of the lock pin auxiliary relay LTX (lead 1050), the contact LTX-1 in lead 1019 is closed, thereby completing a circuit to the reference standby bar relay MC. (FIG. 51A). This circuit is completed via lead 1006, contact TCRX-2, lead 1019, diode 894, contact XO-2, contact ZL-2, and contact LTX-1. Upon energization of this relay MC the reference standby bar relay RSB is deenergized by opening of the normally closed contact MC-3 in lead 1023. This results in opening of the holding circuit for the relay RSB. At this time, the contact ZST-2 in lead 1022 is open so that the circuit to the relay RSB is thereby opened. Opening of this circuit opens the contact RSB-2 in lead 1080 to deenergize the standby reference bar solenoid A3. When the solenoid A3 is deenergized, the motor 492 moves the reference bar 50 downwardly into a blocking position relative to the Z' slide. This location of the reference bar 50 is verified by a switch S3 (FIG. 18) which closes to energize a standby reference bar verifier relay SBV in lead 1029.

Upon energization of the standby reference bar relay MC (lead 1019), the circuit to the gripper relay GR (lead 1015) is opened so that the relay is deenergized and the gripper arms 400, 401 are opened. Opening of this circuit occurs as a consequence of opening of the contact MC-1 in lead 1018. At this time, the normally closed contact LT-4 (lead 1017) is open as a consequence of earlier energization of the relay LT. The normally open contacts ZS-3 and XS-2 in lead 1016 are both open at this time because neither the X nor Z slides are in the synchronized position and the relays ZS and XS are both deenergized. Consequently, one contact in each of the three parallel leads 1016, 1017, and 1018 is open so that the circuit to the gripper relay GR (lead 1015) is open.

Deenergization of the relay GR results in opening of the contact GR-3 with the result that the relays GRX, and GRXX in leads 1063, 1065, and 1066 are all deenergized. Deenergization of the relay GRX results in opening of the contact GRX-3 in lead 1082 and consequently deenergization of the gripper control solenoid A4 and the magazine purge air control solenoid A17. Deenergization of both of these solenoids A4, A17 results in the gripper being opened to release the tool in the previously empty magazine module, and the air supply to the magazine being shut off.

Upon opening of the gripper relay circuit and deenergization of the relay GR, the circuit to the relay Z (lead 1010) and the parallel connected relay ZX is opened. This occurs as a consequence of the opening of the contact GRX-2 (lead 1011) of relay GRX. At this time, the contact LT-2 of relay LT is opened because the lock pin verifier relay LT is energized. The contact SBV-1 (lead 1010) of the relay SBV is opened because the standby reference bar is down so that the verifier switch S3 is closed and the relay SBV is energized. At this time, the contact ZSR-1 is also open because of the relay ZSR having been deenergized when the contact ZS-4 of relay ZS was opened upon retraction of the Z' slide away from the synchronized position. Upon deenergization of the relays Z and ZX, the ZX-1 contact in lead 1078 is closed so that the circuit to the Z' slide control solenoid A2 is thereby completed and the solenoid A2 is energized. As was previously explained, energization of this solenoid A2 results in movement of the Z' slide toward the turret. The Z' slide continues to move toward the turret until the stylus 43 engages the Z' reference bar 50 and stops forward movement of the slide.

When the Z' slide is engaged with the Z reference bar 50 on the magazine side of the bar, the switch S20 (FIG. 36) is closed. This results in the completion of a circuit to the Z standby relay ZSM via a circuit through switch S20 and lead 1055.

Upon energization of the Z standby relay ZSM, a circuit is completed to a magazine shot pin timer relay SPC via a circuit which includes lead 1069, contact MC-4, normally closed contact ZSM-3, lead 895, contact TCRXX-2, lead 896 and contact LTX-2. Energization of the relay SPC closes a contact SPC-2 in a holding circuit in lead 896, 897, and 1068 around contact LTX-2. Additionally, energization of this relay SPC closes contact SPC-1 and seals in a holding circuit in lead 1021 around contact TCRX-4 in lead 1020.

Upon energization of the relay SPC, the normally closed contact SPC-3 is opened so as to open a circuit to the magazine shot pin control solenoid A12 and a circuit to the magazine motor control solenoid A9. The open circuit to the shot pin control solenoid A12 includes the lead 1086, a normally closed contact MMAN-2 and the normally open contact SPC-3. Deenergization of the solenoid A12 results in the hydraulic motor 327 lifting the lock or shot pin 325 out of engagement with the module located at the tool interchange position in the magazine. Thus, the magazine conveyor is free for movement. Simultaneously with the deenergization of the solenoid A12, the circuit to the solenoid A9 (which includes lead 1086, contacts MMAN-2 SPC-3, and lead 898) is opened. This results in the solenoid A9 being deenergized, in which condition it is operable to move the valve 551 to a position in which fluid is supplied to the magazine drive motor 270 (FIG. 47).

When the shot pin 325 is raised out of engagement with the module at the tool interchange station in the magazine, the switch S8 (FIG. 21) is opened so that the shot pin relay SP (lead 1036) is deenergized. Deenergization of the relay SP results in closing of the normally closed contact SP-4 in lead 1090 with the result that a circuit is completed to the magazine's speed control solenoid A8. This circuit is completed via the lead 1090, contact SP-4, normally closed contact MMAN-5 and normally open contact TCRX-7. So long as this solenoid is energized, the magazine will operate at full speed.

The magazine conveyor continues to run at high speed until the preselected tool is detected at the magazine tool read out station 320 by the presence of the right combination of tool coding rings on the coding sites of the preselected tool. When this condition occurs, the tool identification circuit 719 of FIG. 49 detects that the preselected tool is located adjacent the read out station and generates a one logic level signal on one of the 31 output leads 818-1 through 818-31. As was described hereinabove, each of the 31 leads is connected to one of the 31 AND gates 817-1 through 817-31 of FIG. 49. Assuming that tool No. 2 was the preselected one, upon arrival of tool No. 2 adjacent the readout head 320, a one logic level signal will be transmitted via lead 818-2 to AND gate 817-2. This results in the output of gate 817-2 and the input to OR gate 821 going from the one logic level to the zero logic level. A zero logic level input signal on the OR gate 821 causes its output to become a one logic level signal. This signal is transmitted via lead 840 and lead 901 to an inverter 902. When the input to this inverter 902 is a one logic level signal, the output is a zero logic level signal which is then transmitted to AND gate 903. Assuming that the verifier switch S37 of the readout station 320 is indicating that a tool is properly oriented in the module and is not caught in some intermediate or cocked position, there will be a zero logic level signal on lead 904 to the AND gate 903. Therefore, both of the inputs to the AND gate 903 will be zero logic level signals so that it will have a one logic level output to an inverter 905. The output of this inverter 905 is then a zero logic level which is transmitted to the set steering input on the reset side of the TCR flip-flop 684. Subsequently, when the following pulse to the reset trigger input 846 of the flip-flop goes to a zero level, the TCR flip-flop is reset. This results in the reset output on lead 850 to the inverter 851 going to a one logic level. The output of this inverter 851 is then supplied to the amplifier 852 which, when it receives the zero logic level signal, transmits a one logic level output operative to deenergize the relay TCR.

Simultaneously with the deenergization of the relay TCR, the original command signals on the flip-flops H10, H20 and the buffer storage board 690 are wiped out so that this command storage portion of the control circuit is prepared for a new command input. This is accomplished by the set output of flip-flop TCR on lead 848 going to a zero logic level when the flip-flop is reset. This signal is supplied to the set trigger input 694 of "H" reset flip-flop 693 with the result that the flip-flop 693 is set. When this occurs, the set output on lead 696 goes to a one logic level. This signal is then supplied to the OR gate 695 which then has a zero output level. This zero logic level signal is then transmitted via lead 692 to the inverter 685 which then puts out a one logic level signal to the reset sides of the flip-flops H10 and H20. Resetting of these flip-flops then conditions them for a new command signal. Simultaneously, a zero logic level signal on lead 688 resets the buffer storage board 690 so that it, too, is conditioned for a new command signal.

When the relay TCR is deenergized, it opens the normally open contact TCR-1 in lead 1002, causing the relays TCRX and TCRXX to be deenergized.

When the relay TCRX is deenergized, it opens the normally open contact TCRX-7 in lead 1090, thereby deenergizing the magazine full speed solenoid A8. When this solenoid is deenergized, the magazine continues to move but at a slow speed as a consequence of the energization of the solenoid A10 (line 1089). This solenoid is energized through a circuit which includes normally closed contacts SP-4, and MMAN-5, line 1090, contact TCRX-6, and lead 1089A.

The magazine continues to move forward at a slow speed after detection of the preselected tool by the identification switches at the readout head 320 until the next tool engages the switch S15 (FIG. 20). Closing of this switch completes a circuit to the module in-position relay MIP via the switch S15, lead 1048, and normally closed contacts TCRX-5 of relay TCRX and contact MI-1 of the module in-position relay MI. Energization of the relay MIP opens the circuit to the magazine shot pin timer relay SPC as a consequence of the opening of contact MIP-2 in lead 1069. This contact is connected in parallel with contact TCRXX-2 in lead 895 which is now open because of the prior deenergization of the relay TCRXX.

Upon deenergization of the relay SPC, the normally closed contact SPC-3 (line 1086) of relay SPC closes after a predetermined time delay, thereby energizing the magazine shot control solenoid A12 and the magazine motor control solenoid A9. Energization of the solenoid A9 moves the solenoid controlled valve 551 to a blocking position in which all fluid flow is blocked to the magazine drive motor 270. Simultaneously with the blocking of fluid flow to the magazine control motor 270, the magazine lock pin 325 is dropped into the recess 330 in that module which is located at the tool interchange position, thereby centering the module in the interchange position.

Upon deenergization of the shot pin control relay SPC, the contact SPC-1 (line 1021) opens, thereby opening the circuit to the magazine search control relay MC.

Movement of the Z' slide 31 is now initiated toward the magazine upon energization of the Z and ZX relays (in lines 1010 and 1011). These relays are picked up or energized through a circuit which includes lead 1011, the normally closed relay contact TCRX-3, lead 1012, normally open contact SP-2, normally open contact LT-3, normally open contact ZSM-1, normally open contact MIP-1, lead 1010, and contact CTN-2. The ZSM-1 contact is closed when the ZSM relay (line 1055) is energized as a consequence of closing of the switch S20. This switch S20 is closed whenever the Z' slide 31 is in the standby position on the magazine side of the reference bar 50.

Energization of the Z and ZX relays results in the deenergization of the Z' motion control solenoid A2 upon opening of the normally closed contact ZX-1 in line 1078. As was described hereinabove, deenergization of the solenoid A2 results in motion of the Z' slide toward the magazine.

As soon as the Z' slide moves off of the Z standby position, the ZSM relay is opened, thereby opening the contact ZSM-1 in line 1012. The Z and ZX relays, however, remain energized as a consequence of the closing of the holding contact Z-2 (in line 1011) of the relay Z.

When the Z' slide movement toward the magazine is finally terminated by the hydraulic servosystem with the Z' slide in the tool load position, the verification switch S10 (line 1038) closes, thereby energizing the ZL relay.

Energization of the ZL relay results in closing of the normally open contact ZL-1 in line 1013, thereby completing a circuit to the gripper relay GR. This circuit is completed from line 1011, through normally closed contact TCRX-3, contact ZL-1, contact XS-1, and lead 1015. Energization of the relay GR seals in a normally open holding contact GR-1 of relay GR in line 1014, thereby completing a holding circuit to the gripper relay GR. Energization of the gripper relay GR results in energization of the auxiliary gripper relays GRX and GRXX through the circuit which has previously been described. This results in the contact GRX-3 (lead 1082) of the gripper relay GRX being closed, thereby completing a circuit to the gripper solenoid A4. Upon energization of the solenoid A4, the gripper arms close to clamp the tool.

Upon energization of the gripper relay GRX, the circuit to the tool lock control solenoid A11 (line 1092) is opened by opening of the contact GRXX-2, a time-delay-to-open contact. when the solenoid A11 is deenergized, it results in the shot pin 305 being lifted and disengaged from the preselected tool at the tool interchange station.

After energization of the gripper relay GR and consequent gripping of the tool in the interchange station of the magazine, and after raising of the shot pin 305, which holds that tool in the module, the contact GRX-2 (line 1011) of relay GRX is opened to open the circuit to the Z' control relay Z (line 1010). The time constant of the relay contact GRX-2 is much longer than the time constant of the contact GRXX-2 so as to insure that the tool lock pin has been raised and is out of a locking engagement with the tool in the module at the interchange station of the magazine prior to initiation of the Z' slide movement toward the turret 20. Upon opening of the contact GRX-2, the holding circuit to the relay Z is open so that the relay is thereby deenergized. Deenergization of this relay Z (in line 1010) and the parallel connected relay ZX (line 1011) results in a closing of the contact ZX-1 (lead 1078) so that the Z' direction control solenoid A2 is energized. When energized, this solenoid causes the Z' motor 450 to be actuated in a direction to move the Z' slide toward the turret, as was previously explained.

When movement of the Z' slide toward the magazine from the standby position was initiated, the Z' reference bar 50 was raised to an elevated position in which it would not interfere with subsequent movement of the Z' slide past the bar during movement from the magazine to the turret. This raising of the reference bar 50 occurs when the module locking shot pin 325 is lowered after removal of the selected tool from the module. Lowering of the shot pin occurred as a result of energization of the shot pin relay SP. Consequently, one contact SP-3 (lead 1024) of the relay SP is closed, completing a circuit to the reference standby bar relay RSB via the then closed contact MC-3, lead 906, contact ZSM-2, contact SP-3, lead 882, contact MSC-2, contact ER-1 and lead 1022. Energization of the reference standby bar relay RSB results in closing of the contact RSB-2 so as to complete a circuit to the standby reference bar solenoid A3 via lead 1080. So long as this solenoid is energized, fluid is supplied to the lower side of the hydraulic motor 492 so that the motor raises and holds the reference bar 50 in a noninterfering position relative to the Z' slide.

The Z' slide continues to move toward the turret until the switch S1 is closed by engagement of the slide with the switch S1 on Z' reference wing 38. Closing of this switch S1 completes a circuit to the X' control solenoid A1 (line 1076), with the result that motion of the X' slide toward the turret is initiated. The movement of the X' slide along the X' axis continues until the switch S11 is closed to indicate that the X' slide is in synchronization with the X axis cross-slide 18. Closing of the switch S11 causes the X synchronization relay XS (line 1040) to be energized. Energization of the relay XS causes the contact XS-4 (line 1097) of the relay to be closed, thereby completing a circuit to the turret purge air control solenoid A14 and initiating air flow through the turret orifices 116. Simultaneously with the energization of the turret purge air control solenoid A14, the turret purge air control timer relay TA (line 1099) is energized. A predetermined time after energization of the relay TA, its contact TA-1 (line 1097) opens, thereby opening the circuit to the turret purge air control solenoid A14 and shutting off the flow of air through the turret orifices 116.

The timer of the relay TA is set so that the air supply through the orifices 116 is not shut off until after the tool has been inserted into the tool holder socket of the turret.

After the Z' slide is synchronized with the Z' axis slide 17, and has closed switch S17, the ZS relay (line 1053) is energized and the contact ZS-2 (line 1014) of the relay ZS is opened, thereby opening the circuit to the gripper relay GR (line 1015). At this time, the X' slide is already in synchronization with the X' slide so that the XS relay (line 1040) is energized a nd the contact XS-1 (line 1013) is open. When the relay GR is deenergized, the contact GR-3 (line 1063) is opened, thereby opening the circuit to the relays GRX and GRXX. When the relay GRX is deenergized, it opens the contact GRX-3 (line 1082), thereby deenergizing the gripper solenoid A4 with the result that the hydraulic motor 383M of the gripper head is actuated to move the gripper arms apart and release the tool in the socket of the turret station 22a. Deenergization of the relay GRXX causes a time-delay-to-open contact GRXX-1 (line 1003) to open, thereby opening and deenergizing the relays MSC and MSCX (lines 1005, 1006). At this time, the parallel connected contacts ZS-1 and TCRX-1 (lines 1004, 1005) are also open so that none of these three parallel circuits is complete to the relays MSC, MSCX. These relays then remain deenergized until the next tool change cycle.

Upon deenergization of the tool change cycle start relay MSC, the contact MSC-2 (line 1023) of relay MSC is opened, thereby opening the circuit to the Z' reference standby bar relay RSB. Deenergization of relay RSB results in opening of the contact RSB-2 (line 1080) so as to open the circuit to the standby reference bar solenoid A3. Upon deenergization of this solenoid A3, the reference bar 50 is lowered to a position in which it blocks rearward movement of the Z' slide along the Z' axis by engaging the stylus 43 of the Z' slide.

Upon deenergization of the relay MSCX, the contact MSCX-2 (line 1078) is opened to deenergize the Z' direction control solenoid A2. Deenergization of solenoid A2 results in movement of the Z' direction control valve to a position in which the motor is driven in a direction to move the Z' slide towards the magazine or away from the turret. Immediately upon initial movement of the Z' slide away from the synchronized position, the switch S1 (line 1053) is opened, thereby deenergizing the Z' synchronization control relay ZS.

Upon rearward movement of the Z' slide past the Z' reference wing 38, the Z' slide disengages the switch S1 (line 1076), thereby permitting it to open and deenergize the X' motion control solenoid A1. Upon deenergization of this solenoid A1, the valve 475X moves to a position in which the X' slide drive motor 450X is operable to drive the X' slide in a direction to move the slide out away from the turret. As soon as the X' slide moves out of the synchronized position, the switch S11 (line 1040) opens to deenergize the X synchronization relay XS.

Upon movement of the X' slide along the X axis continues until the slide engages and closes the switch S12, indicating that the X' slide is in the full out position. Closing of the switch S12 energizes the X' full out relay XO via lead 1042.

The Z' slide continues to move rearwardly until the stylus 43 of the Z' slide engages the abutment 499 of the standby reference bar. Engagement of the stylus with this bar stops all movement of the Z' slide. Simultaneously with the contacting of the Z' slide stylus 43 with the abutment 499, the Z' reference bar verification switch S14 (line 1046) is closed, energizing the Z' standby relay ZST.

As was mentioned hereinabove, movement of the conveyor of the tool magazine is initiated by the magazine search relay MC (line 1019). When this relay was energized, it caused the module locking shot pin 325 to be lifted and the magazine drive motor to be actuated. To prevent this motor from continuously driving the magazine if a selected tool is not found, a tool missing safety circuit is provided. This circuit comprises a contact MC-4 (line 1069) in a circuit to a coded tool missing relay CTN. Energization of the magazine search relay MC causes the contact MC-4 to close, thereby completing the circuit to the relay CTN via line 1069, contact MC-4, lead 920 and line 1067. Upon energization of the relay CTN, a time closing contact CTN-4 (line 1067) of this relay starts to close. The time constant for this relay is equal to the time required to make two full cycles of the magazine or, in other words, for every module in the magazine to pass readout station 320 twice. After the predetermined time has expired, the time closing contact CTN-4 will close, thereby sealing in the relay CTN. Alternatively, if the preselected tool is located prior to completion of the closing of the contact CTN-4, the contact MC-4 (line 1069) will open and deenergize the relay CTN. So long as the relay CTN is energized, the contact CTN-3 will remain closed, thereby completing a circuit 1062A to a light 921 located in an exposed position on the control panel. Simultaneously with the closing of the contact CTN-4, a time-delay-to-open contact CTN-1 (line 1002) of relay CTN opens, thereby opening the circuit to the relays TCRX and TCRXX. This results in completely stopping the tool change cycle until the preselected tool is replaced in the machine or another tool is selected.

In order to avoid potential machine wrecks which might occur in the event of slow movement of a tool in the transfer slide between the X out position and an empty station of the turret, a safety circuit is provided. This circuit functions a predetermined time after initiation of the movement of the tool from the X out position toward the empty station of the turret to initiate (1) lowering of the standby reference bar 50 and, simultaneously, (2) movement of the Z' slide away from the turret. An example of one situation in which this circuit would come into play would be a situation in which a flow control valve in the circuit to the X' motor might be partially closed or clogged, thereby causing the X' slide to move at less than its regular speed toward the synchronized position. In this situation, and absent a safety circuit, the Z' slide could reach its synchronized position before the X' slide with a consequent catastrophic result.

This safety circuit comprises a normally closed contact TCRXX-5 of the relay TCRXX in line 1097, a normally closed contact XO-4 in line 1099, and a normally open contact GRXX-3 in line 1101. These contacts are all connected in series with an emergency timer retract relay ETR (line 1101). This circuit is completed only when the Z' slide is moving from the storage magazine toward the turret with a tool (so that the relay GRXX is energized) and the X' slide is moving from the full out position toward the turret (so that the relay XO is deenergized) with a tool in the gripper head (so that the relay TCRXX is deenergized). A predetermined time after the relay ETR is energized, a time-delay-to-open contact ETR-1 (line 1058) of relay ETR opens, thereby opening a circuit to a normally energized emergency retract relay ER. Deenergization of the relay ER opens the circuit to the reference standby bar relay RSB (line 1022) by opening the normally open contact ER-1 of the relay ER Simultaneously, deenergization of the relay ER results in opening of the normally open contact ER-2 in line 1078 thereby deenergizing the Z' control solenoid A2. As was mentioned hereinabove, deenergization of the Z' solenoid A2 results in the Z' direction control valve causing the Z' motor to be driven in a direction to move the Z' slide toward the magazine. It will continue to move in that direction until it engages the standby reference bar 50 at which time it will be stopped and the cycle stopped through the control circuitry identified hereinabove.

In order to load the tool magazine and to replace tools in the magazine, a manual mode of magazine control is provided. To initiate this mode of control, the magazine mode selector switch 880 in line 1033 must be moved to the manual position, thereby closing a circuit to the parallel connected magazine manual mode relays MMAN and MMANX through the normally closed contact MSC-3 of relay MSC and lead 1033. As is most apparent in the timing chart of FIG. 52, the relay MSC is energized for the whole tool change cycle so that the manual mode of movement of the magazine cannot be initiated during an automatic tool changing cycle.

To preclude an automatic cycle being initiated while the magazine is in the manual mode of control, a contact MMAN-1 is provided in line 1006. Thus, selection of the manual mode of control causes this contact MMAN-1 to be opened so that the tool change cycle start relay MSC cannot be energized.

Energization of the manual mode relay MMANX also causes the contact MMANX-1 (line 1073) of this relay to be closed, thereby permitting the magazine door 253A to be opened by a magazine door unlock solenoid 922. With contact MMANX-1 closed, a circuit is completed to the magazine door unlock solenoid 922 by pushing a manual switch button 923. This circuit is then completed via line 1071, normally closed contact MSCX-1, lead 924, contact MMANX-1, and the push button switch 923. When the solenoid 922 is energized, the door 253A of the magazine may be pulled open so that access may be gained to the interior of the magazine.

A safety switch is provided to preclude the magazine conveyor from being rotated while the magazine door 253A is open. To this end, a switch S22 is mounted on the inside of the door and is engageable with the door. This switch is closed by the closed magazine door so as to energize a magazine door relay MD in line 1061. Thus, closing of the door energizes the relay MD so as to close the contact MD-1 in line 1006 to the tool change cycle start relays MSC and MSCX. So long as the door is open and the relay is deenergized, a contact MD-2 (line 1071) of the relay MD is open and a circuit to a manual index relay MI remains open. Closing of the door closes the contact MD-2 and, assuming the lock pin verifier switch S16 to be closed so that the lock pin verifier auxiliary relay LTX is energized and the normally open contact LTX-3 is closed, a manual index relay circuit may be completed by actuation of a manual index control button 925. This circuit is completed through line 1071 via contact MSCX-1, contact MD-2, contact LTX-3, and the normally open magazine index control button 925. Actuation of the magazine index button 925 then completes the circuit to the relay MI causing the contact MI-1 (line 1048) to be opened. Opening of relay contact MI-1 deenergizes the module-in-position relay MIP, thereby opening the normally open contact MIP-3 (line 1088). Opening of this contact causes the magazine shot pin control solenoid A12 to be deenergized together with the magazine motor control solenoid A9. Deenergization of these solenoids causes the magazine locking shot pin 325 to be lifted as was explained hereinabove, and the magazine motor to be operated. At this time, the magazine operates at full speed because of the energization of the magazine speed control solenoid A8 through the normally open contact MI-3 (line 1091) of relay MI. The magazine continues to operate at full speed until the magazine index control button 925 is manually released, at which time the manual index relay MI is deenergized. Deenergization of the relay MI opens the contact MI-2 and thus deenergizes the speed control solenoid A8. The magazine then continues to rotate at slow speed until the time-delay-to-close contact MI-1 is closed and the switch S15 is closed. The contact MI-1 will close some predetermined time after the manual index relay MI is deenergized and the switch S15 will close upon engagement of the next module with the switch after the magazine index button is released and the contact MI-1 opened. When the relay MIP (line 1048) is energized by the closing of the switch S15 and the contact MI-1, the contact MIP-3 (lead 1088) closes to complete a circuit to the magazine shot solenoid A12 and the magazine motor control solenoid A9. When the solenoid A12 is energized, it causes the shot pin 325 to be moved downwardly into engagement with the recess 330 of the module located at the tool interchange position of the magazine. Energization of the magazine motor control solenoid causes fluid flow to the motor to be blocked and thus the magazine rotation to be stopped.

TURRET INDEX CONTROL CIRCUIT

Referring now to FIG. 50, there is illustrated the turret positioning control circuit. This circuit is responsive to command data supplied to the machine from the tape reader 680. Signals from the reader 680 are stored in a storage command matrix 930 which is a standard conventional circuit operative to store the command information derived from the tape in any one of 12 different banks, each one of which indicates one index position of the turret. The output of the matrix 930 is supplied to a comparator circuit 931 which is operative to compare the signal derived from the turret position cam actuated switches S26 through S29. If the commanded turret position differs from actual turret position, the comparator is operative to generate a zero logic level signal on an output lead 935.

Should the turret be already in the position commanded by the tape reader 680, the comparator output signal is a one logic level signal which has no effect on the turret control circuit.

The turret control logic circuit includes four flip-flops operative to control three solenoids. These flip-flops, TCS, TRF, TRC, and TCR control a turret clamp solenoid A5, a turret rotate fast solenoid A7, and a turret crawl speed solenoid A6.

All four flip-flops TCS, TRF, TRC, and TCR are in a rest condition upon initiation of a turret repositioning cycle. These flip-flops are all placed in this condition automatically when power is initially turned on to the control system and to the machine or at the completion of a turret index operation, as is explained more fully hereinafter.

A zero logic level signal from the comparator 931 is supplied via lead 935 to an AND gate 936 of the turret control circuit. This AND gate 936 is connected in parallel with an AND gate 937 which is supplied with input signals from the set output of the flip-flops TRC and TCR. Upon initiation of a turret indexing operation, both of these set output signals are at the zero logic level with the flip-flops in the reset condition. Upon receipt of a zero logic level signal at the AND gate 936, this gate has a one logic level output. This output signal is then supplied to an inverter 938 which then supplied a zero logic level signal to the turret clamp control flip-flop TCS. The set trigger and the reset trigger of this flip-flop TCS are both connected to a 1 kc. clock so that immediately after receipt of the set steering signal from the inverter 938, the set trigger input is pulsed and the flip-flop TCS set. This results in a one logic level signal on the output lead 939 to an inverter 940. The inverter 940 then supplies a zero logic level output signal to an amplifier 941, the output of which is then supplied to the turret unclamp control solenoid A5. Energization of this solenoid A5 results in the turret clamping control valve 591 being moved to a position in which fluid pressure is supplied to the turret unclamping motor, causing the turret to be lifted and the curvic coupling of the turret to be disengaged.

When the flip-flop TCS is set, the reset output of the flip-flop TCS goes to a zero logic level. This zero logic level signal is then supplied to AND gate 942, one input to which is connected in parallel with the set side of the flip-flop TRF and TRC. This parallel connection comprises a lead 943 from the set output contact 944 of the flip-flop TRF to the input of gate 942 on a lead 932 and a circuit connection from the set output 945 of the flip-flop TRC through an AND gate 946 to the output lead 947 of the AND gate 942. The AND gate 946 has a second input from a pressure switch 584, as may be seen in FIG. 47. The pressure switch 584 is operable to detent turret lifting pressure in fluid line 221 and to thus close the contacts of the switch when the pressure in line 221 is sufficient to lift the turret. If both of the flip-flops TRF and TRC are in the reset condition, the flip-flop TCS is in the set condition, and a zero logic level signal is supplied to AND gate 946 via lead 926, (indicating that the turret is unclamped), a one logic level signal will appear on lead 947 to an inverter 948. A zero logic level signal from this inverter 948 is supplied through an RC circuit 949 as an input to the set steering input of the flip-flop TRF. The RC network 949 insures a delay of approximately two seconds between the setting of the flip-flops TCS and the setting of the turret rotate fast flip-flop TRF.

Upon receipt of a zero logic level signal on the set steering input to the flip-flop TRF, and a pulse signal from a 1 kc. reference clock to the set trigger input contact 950, the flip-flop TRF is set. This results in the output signal on the set output lead 943 going from a zero to a one logic level. This one logic level signal is then supplied to an inverter 951 which results in a zero logic level signal being supplied to an amplifier 952. The output of this amplifier is supplied to a turret rotate fast control solenoid A7 so that approximately two seconds after the initiation of a turret unclamping cycle, turret rotation is initiated at a fast rate.

Upon the flip-flop TRF going to a set condition and the set output lead 943 going to a one logic level, the signal on the lead 932 goes to a one logic level and blocks the output from the AND gate 942. This results in the set steering input contact signal going to a one logic level so that the flip-flop TRF is conditioned for resetting.

The turret continues to rotate at a fast rate until the turret position sensing switches S26 through S29 detect the approach of the turret to the preselected turret position. This results in the matching of the commanded signal from the matrix 930 with the signal from the turret position control switches S26 through S29 so that the output signal from the comparator 931 changes from a zero logic level to a one logic level. A one logic level signal input to the AND gate 936 results in a zero output from the AND gate 936 to the inverter 938. This in turn results in a one logic level output from the inverter 938 on lead 933. A one logic level signal on lead 933 results in a one logic level signal being supplied to the set steering input of the flip-flop TCS via lead 934, thereby conditioning the flip-flop TCS for resetting. This signal on lead 933 is also supplied to the inverter 953 which supplied a zero logic level signal to the reset steering input contact 954 of the flip-flop TRF. Subsequently, a pulse signal on the reset trigger input 955 of the flip-flop TRF causes the flip-flop TRF to be reset. Resetting of the flip-flop TRF results in the set output contact 944 of the flip-flop going to the zero logic level. This results in the turret rotate fast solenoid A7 being deenergized because of the wrong logic level being supplied to the amplifier 952. The zero logic level signal on the set output contact 944 of the flip-flop TRF is also supplied via lead 956 to the set trigger contact 957 of the flip-flop TRC. The set steering input contact 958 of this flip-flop had previously been set at the zero logic level when the flip-flop was originally reset so that the flip-flop TRC is placed in the set condition upon receipt of the zero logic level signal at the set trigger contact 957. Upon setting of the flip-flop TRC, the set output contact 945 goes to the one logic level, preconditioning the set steering contact 958 for resetting. Simultaneously, a one logic level steering signal is supplied to an inverter 959 so that a zero logic level signal is supplied from the inverter 959 to an amplifier 960. The output of this amplifier 960 is supplied to the turret crawl speed control solenoid A6, resulting in the solenoid moving the turret speed control valve to a slow speed position.

The turret continues to rotate at the crawl speed and the cams 146 through 149 (FIG. 45) which control the switches S26 through S29 continue to rotate. These cams are cut so that they only close the switches S26 through S29 momentarily. Immediately after the approach of the preselected turret position is detected by the switches S26 through S29, the switches reopen, indicating to the comparator 931 that the turret position differs from the commanded position in the command matrix 930. This results in the signal on the output lead from the comparator 931 going back to the zero logic level. A zero logic level on lead 935 results in a zero logic level signal being supplied via lead 961 to an input contact of an AND gate 962. The other input contact of this AND gate 962 is connected by a lead 963 to the reset output contact of the flip-flop TRC. Since the flip-flop TRC is now in the set condition, the signal on lead 963 is a zero logic level signal so the output from the AND gate 962 is placed in the one logic level condition upon detection of a zero logic level signal on lead 961. The output of the AND gate 962 is inverted by an inverter 964 and supplied as a zero logic level signal to the reset steering contact 965 of the flip-flop TRC. The reset trigger contact 966 of the flip-flop TRC is connected to a 125 kc. clock signal so that immediately after receipt of a zero logic level signal on the reset steering input contact 965, the flip-flop TRC is reset. When the flip-flop TRC is reset, the output on the set output contact 945 goes back to the zero logic level so that the output of the inverter 959 is then a one logic level signal. A one logic level signal cuts off the output of the amplifier 960 to the solenoid A6 so that the turret crawl solenoid A6 is then deenergized.

Upon deenergization of the turret crawl speed solenoid A6, the turret is very close to its preselected angular position.

Upon setting of the flip-flop TRC a zero logic level signal is supplied from its set output contact 945 to a set trigger contact 967 of the flip-flop TCR via a lead 968. The flip-flop TCR is initially in the reset condition so that the set output is at a zero logic level. The set output of this flip-flop is connected to the set steering contact so that the flip-flop is self-steering and when in the reset condition, the set steering contact 969 is at the zero logic level. Therefore, upon receipt of a zero logic level signal from the set output contact of the flip-flop TRC at the set trigger contact 967 of the flip-flop TCR, the flip-flop TCR is set. This results in the set output of the flip-flop being supplied via a lead 970 to the AND gate 937. So long as a one logic level signal remains on this gate, it clocks a set signal to the flip-flop TCS through the inverter 938.

When the turret command reset flip-flop TCR is set, it results in the reset output signal on contact 971 going to the zero logic level. This zero logic level signal is then supplied via lead 972 to an AND gate 973 where it is compared with the set contact output of the flip-flop TRC. At his time, the flip-flop TRC is in the reset condition so that the set output is at the zero level. This output signal is supplied from the set output contact 945 to the AND gate 973 via lead 974, lead 975, and lead 976. The AND gate 973 is connected in parallel with another and gate 977, the input to which is a signal on lead 978 from the turret-in-position verifier switch S31 (FIG. 45). When the turret is exactly in any one of the 12 possible index positions, this switch is closed. Assuming the turret to be in one of these positions and the switch S31 to be closed, a zero logic level signal is supplied from the switch S31 to the AND gate 977 via lead 978.

When the logic levels of the signals on lead 972, 976 and 978 are all at the zero logic level (as they are when the turret is finally located in the preselected position), the parallel connected AND gates 973 and 977 supply a one logic level signal to an inverter 978. This inverter 978 then supplied a zero logic level output signal via lead 979 to the reset steering input contact 980 of the flip-flop TCS. Subsequently, upon receipt of a reset trigger signal from a 1 kc. reference clock (not shown) via lead 981, the flip-flop TCS is reset. Upon resetting of the flip-flop TCS, the output on the set output lead 939 goes to the zero logic level. When this occurs, the output of the inverter 940 goes to the zero logic level. When this occurs, the output of the inverter 940 goes to the one logic level and the output of the amplifier 941 drops to 0 volts so that the solenoid A5 is deenergized. Deenergization of the turret clamp solenoid A5 results in location of the turret clamping control valve 591 in a position in which the turret clamp motor 67M is caused to move in a direction to clamp the turret to the turret base, thereby recoupling the curvic coupling of the turret.

Upon resetting of the turret clamp control flip-flop TCS, the reset output signal on lead 982 goes to the one logic level. This one logic level signal is then supplied via lead 982 and lead 983 to an inverter 984. The inverter then supplied a zero logic level signal to an RC circuit, indicated generally by a numeral 985. This RC circuit has a time constant of approximately 2 seconds, after which it will have a zero logic level output to the reset steering contact 986 of the turret command reset flip-flop TCR. The reset trigger contact 987 of this flip-flop TCR is connected to a 125 kc. clock signal source so that immediately after receipt of a zero logic level signal at the reset steering contact 986, the flip-flop TCR is reset.

During the two second time interval from the resetting of the flip-flop TCS to the resetting of the flip-flop TCR, the reset output contact 971 of the flip-flop TCR is at a zero logic level. This signal is supplied as an input to an AND gate 988. This AND gate 988 also receives zero logic level signals from the switch S2 via lead 989 when the switch is closed and from the switch S43 via a lead 990 when that switch is closed. The switch S2 is a fine positioning verification switch (FIG. 45) which is only closed when the tool turret is exactly in one of the 12 possible index positions. In other words, the lobes of the cam 142 which actuate the switch S2 are much narrower than the lobes of the cam which actuate the switch S31. If this switch is closed, a zero logic level signal is supplied to the AND gate 988 via lead 989.

The switch S43 is a turret clamp verification switch which only closes after the turret is fully clamped on the turret base. When this switch is closed, a zero logic level signal is supplied to the AND gate 988 via lead 990. When all three of these signals are at the zero logic level, the output of the AND gate 988 is a one logic level signal. This signal is a reset signal to the turret storage command matrix 930 on line 991. If the turret is not exactly in one of the 12 index positions so that the switch S2 is open, or if switch S43 is open because the turret is not fully clamped during the 2 second interval when the signal from the reset output contact 971 of the flip-flop TCR is at a zero logic level, the turret storage command matrix 930 will not be reset. If the turret command reset flip-flop TCR is reset without the turret storage command matrix 930 having been reset, the set output signal from the flip-flop TCR on lead 970 will go to the zero logic level. This zero logic level signal will then be supplied to the AND gate 937. Since all four of the control circuit flip-flops will have then been reset, the complete circuit will then be reconditioned for initiation of a new turret search or index cycle. In other words, both inputs to the AND gate 937 will then be at a zero logic level as well as the input to the AND gate 936 from the comparator 931 so that the control circuit will gain initiate another index cycle seeking that turret position which was originally commanded by the tape in tape reader 680 and which is still stored in the turret storage command matrix 930.

If the turret storage command matrix 930 had been reset, there would be no information sorted in the matrix 930 and the output from the comparator 931 would be a one logic level signal. In this condiiton, there is no output from the AND gates 936 and 937 to the inverter 938 so that the circuit is inactive.

OPERATION

The tool changer 25 is usually programmed to change the tool 22 in the turret 20 while the other tool 21 continues its cutting operation and the turret 20 continues to move along both the X and Z axes. The location and number of tools in the turret 20 is such that while one tool 21 is engaged with a workpiece, the other tool 22 on the opposite side of the turret 20 is idle and is accessible for a tool change.

A tool change is always initiated with the tool transfer carriage 31 in the standby or parked position as illustrated in FIG. 4. In this position of the carriage 31, the Z' axis transfer slide 32 is parked near the rearward extent of its movement along the Z' axis and the X' tool transfer cross-slide 33 is located at one end of its travel along the X' axis (at the bottom of the X' axis as viewed in FIG. 4).

A tool change transfer cycle is initiated by the tape reader 680 reading an H or tool change block of information from the programming tape. This results in the tool transfer carriage 31 being moved toward the turret 20 along the Z' axis at a maximum or high speed rate of travel until a control switch S1, attached to a Z' axis reference wing 38 of the turret slide 18 is actuated by engagement with an abutment 39 on the Z' tool transfer slide 32. When this switch S1 is actuated, the tool gripper 38 is in its X40 standby position and the Z' slide is a preset distance from the turret carriage 17. Actuation of the switch S1 is operable through the control circuit of FIGS. 51A—51C to initiate travel of the tool transfer cross-slide or X' axis slide 33 at high speed toward the turret while simultaneously the high-speed travel of the tool transfer Z' slide 31 continues along the Z' axis.

The relative speeds of the tool gripper 34 along the X' and Z' axes is such that the tool transfer cross-slide 33 always engages and becomes synchronized with the movement of the turret cross-slide 18 along the X axis before the Z' slide 31 of the tool transfer carriage 32 engages and becomes synchronized with the movement of the Z axis slide 17 of the turret carriage. To this end, in one preferred embodiment, the high speed rate of movement of the X' tool transfer cross-slide 33 along the X' axis is 3,000 inches per minute while the high speed rate of movement of the Z' tool transfer carriage 32 along the Z' axis slide is 1,500 inches per minute.

While the X' tool transfer cross-slide 33 and the attached tool gripper 34 are simultaneously moving along both the X' and Z' axes, the actuator 510 of the pneumatic switch S41 is engaged by the rod 512 which is pushed outwardly by its engagement with the X' reference wing 40, causing the movement of the X' slide to be slowed. Subsequent engagement of the stylus 43X of the X' slide with the wing 40 stops relative movement between the wing 40 and the X' cross-slide 33 and causes the tool transfer cross-slide 33 to thereafter continue to move in synchronization with the wing 40 and thus with the turret cross-slide 18.

After the movement of the X' cross-slide 33 has been slowed by actuation of the switch S41, the air switch S39 on the tool transfer carriage 32 engages a Z' axis reference wing 38 attached to the turret carriage 17. Actuation of this switch S39 causes the movement of the Z' tool transfer slid 32 along the Z' axis to be slowed through the pneumatic-hydraulic control circuit of FIG. 47. Thereafter, the Z' slide 32 continues to move toward the turret at a slow rate of speed until the stylus 43 on the slide 32 engages the Z' reference wing 38. Thereafter the stylus 43 controls movement of the tool transfer carriage 32 along the Z' axis maintains the tool transfer carriage 31 synchronized with movement of the turret carriage 17.

Final movement of the tool gripper 34 along the Z' axis locates the tool grasping arms of the tool gripper 34 over the idle tool 22 contained in the station 22a of the tool turret. Subsequently, when the Z' slide is synchronized with the Z axis slide 17, as indicated by the verification switch S17, the control circuit is operable to close the tool gripper arms 400, 401 and thus securely clamp the tool 22 in the gripper.

After the tool 22 is clamped by the gripper, it is taken out of the turret 20 upon movement of the tool transfer Z' slide 32 away from the tool turret 20 along the Z' axis. During this initial movement of the Z' slide 32 toward the magazine 30, the X' slide 33 remains synchronized with the X axis slide 18 so that there is no relative movement between the tool gripper 34 and the turret 20 along the X' axis.

After complete extraction of the tool 22 from the turret 20 and disengagement of the Z' slide 32 with the switch S1, the tool gripper 34 is moved simultaneously along both X' and Z' axes (as depicted in FIG. 9) toward the tool transfer standby position. The X' slide 33 moves outwardly at a fast speed or rate of travel until the air switch S42 engages the ramp down cam 513 and slows outward movement of the X' slide. Subsequently, upon engagement of the X40 slide stylus 43X with the abutment 527, outward movement of the X' slide is terminated. Because of the relative speeds, the X' slide always reaches its standby position or outer limit of travel and stops moving along the X' axis before the Z' slide reaches its standby position.

As the tool transfer carriage 31 continues to move rearwardly along the Z' axis with the tool cross-slide 33 at its outer limit of movement or in its standby position, the tool transfer carriage 31 passes through the Z' standby position. At this time, the vertically movable Z' standby control abutment 50 is located in a raised position out of alignment with the Z' control switches S39, S40 and the stylus 43 so that the carriage 31 passes through the Z' standby position and continues at high speed toward and into the magazine 30.

When the carriage 31 reaches a predetermined position spaced forwardly from the magazine, the Z' deceleration control switch S40 on the Z' slide engages the abutment or cam 479 on the bed of the machine and through the pneumatichydraulic control circuit of FIG. 47, causes the movement of the carriage 31 along the Z' axis to be slowed or decelerated. The Z' slide then continues rearwardly at a slow rate of travel until the stylus 43 on the Z' slide 32 engages the abutment 48 on the bed 11 of the machine and stops all movement of the carriage along the Z' axis. During the slow rearward movement of the tool carriage 31 along the Z' axis, the tool 22 in the carriage gripper 34 is inserted into the empty module of the magazine.

After the tool 22 is deposited in the empty module, it is locked in the module by lowering of the module locking pin 305. The gripper arms 400, 401 then open, and the carriage is moved at a fast speed away from the tool 22 along the Z' axis to the standby position illustrated in FIG. 11.

Just prior to the arrival of the carriage 31 at the standby position, the Z' deceleration control switch S39 engages the ramp down cam 501 of the movable reference bar 50, which is now in a lowered position to engage the switch. Engagement of the switch S39 with the abutment 50 causes the forward movement of the carriage 31 to be slowed until the stylus 43 engages another abutment 499 of the reference bar 50 and stops all forward movement of the carriage.

While the tool transfer carriage 32 is in the standby position, the module locking shot pin 325 is raised out of engagement with the module at the tool interchange station of the magazine and the magazine conveyor 254 is actuated so as to sequentially move the tools in the magazine past the reader head 320. When the code of the preselected tool matches the tool selected by the program, the control circuit of FIGS. 48—51C is operable to slow the movement of the magazine conveyor 254 until the next tool in the magazine engages the switch S15. This results in the magazine conveyor 254 being stopped with the preselected tool located at the tool interchange station. The motor 327 is then actuated to lock the module of the preselected tool in a centered position at the interchange station, and the motor 311 is actuated to lift the module locking pin 305 out of engagement with the tool of the module.

As soon as the new tool 23 is located in the interchange station and is unlocked, rearward movement of the tool carriage 31 is initiated. Just prior to arrival of the gripper head 34 at the interchange station, the Z' slide deceleration control switch S40 engages the ramp down cam 479, causing the rearward movement of the tool transfer slide 31 along the Z' axis to be slowed. The carriage 31 then continues to move rearwardly at a slow rate of movement until the Z' slide stylus 43 engages the abutment 48 on the bed 11 and stops rearward movement of the carriage with the movable arms of the gripper 34 located over the new preselected tool 23. The gripper arms are then closed to clamp the new tool 23 on the tool transfer carriage 31, and forward movement of the carriage 31 is initiated along the Z' axis.

When the carriage 31 reaches the Z' standby position in its forward travel toward the turret, the movable reference bar 50 is out of the alignment with the Z' deceleration control switches S39, S40 and the stylus 43 so that the carriage 31 continues its forward travel at a high rate of speed past the Z' standby position.

The carriage then continues its high speed forward travel along the Z' axis until an abutment 39 on the Z' slide 32 engages the control switch S1 on the Z' reference wing 38 of the tool carriage 17. Actuation of the switch S1 initiates movement of the tool transfer cross-slide or X' slide 33 toward the turret 20 so that the tool is then moving simultaneously along both the X' and Z' axes.

As the X' slide moves toward the turret, the X' deceleration control switch S41 on the tool transfer cross-slide or X' 33 slide is closed, causing the movement of the tool transfer cross-slide or X' 33 to be slowed or decelerated. The X' slide continues to move toward the turret 20 at the slow rate of travel until the stylus 43X of the cross-slide 33 engages the X' reference wing 40 and stops all relative movement between the turret cross-slide 18 and the X' slide 33. Thereafter, the X' cross-slide 33 continues to move along the X' axis in synchronization with movement of the turret cross-slide along the X axis under the control of the stylus 43X. It should be appreciated that the tool located in the station 21a of the tool turret 20 is at this time continuing its machining operation and, therefore, is in motion relative to the workpiece and may be moving along the X axis.

After all movement of the tool transfer X' axis slide 33 has been terminated, or while it is moving toward the turret at a slow speed, the switch S39 on the tool transfer Z' axis slide 32 engages the Z' reference wing 38 of the turret carriage 17 with the result that the forward movement of the carriage 31 toward the turret is slowed and continues at slow speed until the stylus 43 engages the wing 38. Thereafter, the tool transfer carriage 31 and the turret carriage 17 continue to move in synchronization along the Z' axis under the control of the stylus 43 while the tool 21 in the station 21a of the turret continues to move relative to the workpiece. During the slow forward movement of the carriage 31 along the Z' axis, the tool 23 held by the movable arms of the gripper 34 is inserted into the empty station 22a of the turret 20 as shown in FIG. 15. After the tool has been fully inserted into the turret, the arms of the gripper 34 are opened to release the tool from the tool transfer carriage 32.

As depicted in FIG. 16, the tool carriage 31 is then moved rearwardly along the Z' axis while the X' tool transfer cross-slide 33 remains synchronized with the movement of the X' slide 17 until the gripper 34 has completely disengaged the tool 23 and moved clear of a possible interference position between the tool 23 and the gripper. Thereafter, and after the Z' slide disengages the switch S1, the X' slide is moved toward its standby position while the tool transfer Z' slide 32 continues to move rearwardly. This simultaneous high speed movement of the X' and Z' slides continues until the actuator of switch S42 of the tool transfer cross-slide or X' slide 33 engages the ramp down cam 513. This results in the movement of the X' slide being slowed until the X' slide stylus 43X engages the abutment 527 and stops the X' slide in the standby position The tool transfer Z' slide 32 continues to move at a high speed toward its standby position until the Z' deceleration switch S40 engages the movable reference bar 50 which is then located in the path of movement of the switch S40. Upon engagement of the switch S40 with the abutment 50, rearward movement of the tool transfer carriage 31 along the Z' axis is slowed until the stylus 43 engages the abutment 499 and stops all rearward movement of the tool transfer carriage 31 with the Z' slide 33 in the standby position.

When the tool transfer carriage 31 reaches its standby position as indicated by a verification switch S14, the turret is free to be subsequently indexed in the normal course of machining so as to present the new tool 23 to the workpiece as shown in FIG. 17. Upon indexing of the turret under the control of the control circuit of FIG. 47, the new tool is automatically clamped in the turret and the old tool unclamped. Thereafter, the machine is conditioned for replacement of the tool at the station 21a of the turret 20 by following exactly the same procedure described hereinabove.

As will readily be appreciated by those persons skilled in the machine tool arts, the primary advantage of the tool changer is its ability to automatically change cutting tools with a minimum of lost cutting cycle time, usually none at all.

While only a single embodiment of our invention has been illustrated and described herein, those persons skilled in the arts to which this invention pertains will readily appreciate numerous changes and modifications which may be made without departing from the spirit of our invention. One such obvious modification which we envision and which would result in a functionally equivalent structure would be to substitute a completely electrical or electrohydraulic control circuit for the stylus and hydraulic servomotor control circuit used to locate and maintain the tool transfer slide in synchronization with the turret carriage. While we have chosen the hydraulic servomotor control circuit as being preferable for this application, we envision many applications in which such a purely electrical control system would be advantageous and fully equivalent to the structure illustrated and described herein. Therefore, we do not intend for our invention to be limited except by the scope of the appended claims.

Having described our invention, We claim:

1. A method of changing tools in a machine tool having a longitudinally extending bed, a workpiece support, and a tool support having a tool receiving station mounted upon the bed for movement along longitudinal and transverse axes of the bed, said tool changing method comprising,
  storing a plurality of tools in a tool storage matrix which is located in a fixed position relative to the machine tool bed,
  picking up a first tool at the tool support upon a movable tool transfer slide,
  moving the slide between the support and the matrix to transport said first tool from the support to the matrix,
  transferring the first tool from the slide to the matrix and picking up a second tool on the slide at the matrix,
  moving the slide in a predetermined path of travel along both of said axes away from said matrix until said slide finds said tool support,
  thereafter holding said slide in a predetermined position relative to said tool support,
  while said transfer slide is being held in said predetermined position transferring a tool from said slide to the tool receiving station of said support.

2. The method of claim 1 which further includes the step of indexing a conveyor of said tool storage matrix after transfer of the first tool to the matrix and before pick up of the second cool on the slide at the matrix.

3. The method of claim 1 wherein said slide moves away from said matrix along said predetermined path of travel at a fast rate of speed until said slide reaches a first position a predetermined distance from said tool support and thereafter moves at a slow rate of speed until said slide reaches said predetermined position.

4. The method of claim 3 wherein said slide moves away from said support and toward said matrix at first a fast rate of travel until said slide reaches a position a predetermined distance from said matrix and thereafter moves toward said matrix at a slow rate of travel.

5. A noninterruptive method of changing tools in a machine tool of the type having a multiple station tool turret movable mounted upon a stationary bed, the turret being movable along at least two mutually perpendicular axes of the machine tool, which method comprises the steps of
  removing one tool from one station of the tool turret while a second tool continues its machining operation,
  transporting said one tool on a transfer slide to a tool storage matrix which is fixedly mounted relative to the bed,
  depositing said one tool in said matrix while the second tool continues its machining operation,
  picking up a third tool from said matrix,
  transporting said third tool on the transfer slide toward said tool turret while said second tool continues its machining operation,
  moving said slide along a predetermined path of travel until the slide finds the tool turret,
  synchronizing the movements of said slide and third tool with the movements of said tool turret while said turret continues to move relative to said workpiece and said second tool continues its machining operation, and
  depositing said third tool in said one station of said turret while the movements of said tool and turret remain synchronized and while said second tool continues to move relative to said workpiece and to machine said workpiece.

6. A method of changing tools in a machine tool having a bed, a workpiece support, a tool turret movable longitudinally and transversely relative to said bed, a tool storage matrix for the storage of a plurality of tools, a tool transfer slide for moving tools between said matrix and said turret, said tool transfer slide being movable longitudinally of said bed independently of movement of said turret, and a tool gripper transversely movably mounted upon said slide, which method comprises the steps of
  engaging one tool in one station of said turret with said gripper of the tool transfer slide and moving said slide relative to said turret so as to remove said one tool from said one station of the tool turret while a second tool in said turret continues a machining operation by moving relative to a workpiece,
  transporting said one tool longitudinally and transversely away from said turret while held in said gripper of said transfer slide to a tool storage matrix and depositing said one tool in said matrix,
  engaging a third tool in said tool storage matrix with said gripper of said transfer slide,
  moving said slide longitudinally of said bed toward said turret so as to remove said third tool from said matrix,
  moving said transfer slide along a predetermined path of travel toward said tool turret until said transfer slide finds said tool turret,
  synchronizing and thereafter tracking the movements of said transfer slide with the movements of said turret and, while said transfer slide continues to track said turret moving said third tool into said one station of said turret as said turret continues to move relative to said workpiece and said second tool continues a machining operation.

7. The method of changing tools in a machine tool having an indexable tool support and a tool changer for replacing tools in said support, which tool changer comprises a tool storage magazine, a multiple carrier conveyor in the magazine for storing tools and for moving tools to a tool interchange station, and a tool transfer slide having a gripper thereon for transporting tools between said magazine and said tool support, which method comprises the steps of
  a. indexing said tool support to locate a first tool in said support in a tool replacement station, and a second tool in aid support in a workpiece machining position,
  b. moving said tool gripper from a withdrawn position to a position of engagement with said first tool in said support, while said second tool is in the process of a machining operation,
  c. moving said gripper while engaged with said first tool away from said tool support so as to remove said first tool from said support,
  d. moving said gripper while engaged with said first tool to said tool interchange station of said magazine and inserting said tool into an empty carrier of said magazine conveyor,
  e. indexing said magazine conveyor so as to locate a third preselected tool at said interchange station of said magazine,
  f. engaging said third preselected tool at said interchange station with said gripper of said transfer slide,
  g. transporting said third tool while engaged by said gripper along a predetermined path of travel until said third tool and gripper find said tool support,
  h. synchronizing the movement of this third tool and gripper with the movement of said tool support,
  i. inserting said third tool into said tool support while engaged by said gripper, and while said second tool continues a machining operation,
  j. disengaging said gripper from said third tool,
  k. moving said gripper and transfer slide to a withdrawn position relative to said third tool, and
  l. indexing said tool support to present said third tool in said tool support to a workpiece.

8. A method of changing tools in a machine tool of the type having a multiple station tool turret movable mounted upon a stationary bed, the turret being movable along at least two mutually perpendicular axes of the machine took, which method comprises the steps of
  removing one tool from one station of the tool turret,
  transporting said one tool on a transfer slide to a tool storage matrix which is fixedly mounted relative to the bed, said one tool being transported to the matrix while a second tool is in the process of machining a workpiece, depositing said one tool in said matrix while the second tool continues its machine operation, picking up a third tool from said matrix, transporting said third tool on the transfer slide toward said tool turret while said second tool continues its machining operation moving said slide along a predetermined path of travel toward said tool turret until the slide finds the tool turret, and depositing said third tool in said one station of said turret.

9. The method of claim 8 which further includes the step of indexing a conveyor of said tool storage matrix after transfer of said one tool to the matrix and before pickup of said third tool at the matrix.

10. The method of claim 8 wherein said transfer slide moves away from said matrix along said predetermined path of travel at a fast rate of speed until said slide reaches a first position a predetermined distance from said tool turret and thereafter moves at a slow rate of speed until said slide reaches a second predetermined position and stops relative to said tool turret.

11. The method of claim 10 wherein said slide moves away from said tool turret and towards said matrix at first a fast rate of travel until said slide reaches a position a predetermined distance from said matrix and thereafter moves toward said matrix at a slow rate of travel.

12. A method of changing tools in a machine tool having a bed, a workpiece support, a tool turret movable longitudinally and transversely relative to said bed, a tool storage matrix for the storage of a plurality of tools, a tool transfer slide for moving tools between said matrix and said turret, said tool transfer slide being movable longitudinally of said bed independently of movement of said turret, and a tool gripper transversely movably mounted upon said slide, which method comprises the steps of engaging a first tool in one station of said turret with said gripper of the tool transfer slide and moving said slide relative to said turret so as to remove said first tool from said one station of the tool turret, transporting said first tool longitudinally and transversely away from said turret while held in said gripper of said transfer slide to a tool storage matrix and depositing said first tool in said matrix, said first tool being transported away from said turret and deposited in said matrix while a second tool in said turret performs a machining operation upon a workpiece, engaging a third tool in said tool storage matrix with said gripper of said transfer slide, moving said slide longitudinally of said bed toward said turret so as to remove said third tool from said matrix while said second tool continues its machining operation, moving said transfer slide and said third tool along a predetermined path of travel toward said tool turret until said transfer slide finds said tool turret, and moving said third tool into said one station of said turret.

13. The method of changing tools in a machine tool having an indexable tool support and a tool changer for replacing tools in said support, which tool changer comprises a tool storage magazine fixedly mounted on said machine tool remote from and independently of said tool support, a multiple carrier conveyor in the magazine for storing tools and for moving tools to a tool interchange station in said magazine, and a tool transfer slide having a gripper thereon for transporting tools between said magazine and said tool support, which method comprises the steps of a. indexing said tool support to locate a first tool in said support in a tool replacement station, and a second tool in said support in a workpiece machining position, b. moving said tool gripper from a withdrawn position to a position of engagement with said first tool in said support, c. moving said gripper while engaged with said first tool away from said tool support so as to remove said first tool from said support, d. moving said gripper independently of all movement of said tool support while engaged with said first tool to said tool interchange station of said magazine and inserting said tool into an empty carrier of said magazine conveyor while said second tool in said support performs a machining operation, e. indexing said magazine conveyor so as to locate a third preselected tool at said interchange station of said magazine, f. engaging said third preselected tool at said interchange station with said gripper of said transfer slide, g. transporting said third tool while engaged by said gripper along a predetermined path of travel independently of all movement of said tool support until said third tool and gripper find said tool support, h. inserting said third tool into said tool support while engaged by said gripper, i. disengaging said gripper from said third tool, j. moving said gripper and transfer slide to a withdrawn position relative to said third tool, and k. indexing said tool support to present said third tool in said tool support to a workpiece machining station.

UNITED STATES PATENT OFFICE
CERTIFICATE OF CORRECTION

Patent No. 3,590,463    Dated July 6, 1971

Inventor(s) Robert K. Burroughs and Timothy A. Wakefield

It is certified that error appears in the above-identified patent and that said Letters Patent are hereby corrected as shown below:

Col. 1, line 67, change "one" to -- on --.
Col. 14, line 7, change "should" to -- shoulder --.
Col. 19, line 54, after "of", omit "he".
Col. 22, line 71, after "station", delete "22a of the turret and";
Col. 22, line 72, delete "unclamping of the tool at the station".
Col. 24, line 9, after "is", insert -- a --;
Col. 24, line 40, after "continues", insert -- to --.
Col. 25, line 3, change "815" to -- A15 --.
Col. 26, line 5, after "the", change "rest" to -- reset --;
Col. 26, line 32, after "H20", insert -- and --;
Col. 26, line 44, after "information of the", change "tap" to -- tape --;
Col. 26, line 65, after "flip-flops H10 and H20", change "are" to -- the --.
Col. 27, line 17, change "SIn" to -- In --.
Col. 28, line 11, after "tens", insert -- three --;
Col. 28, line 35, after "817-1", change "871-3" to -- 817-3 --;
Col. 28, line 73, after "AND gate 817-1", insert the following clause -- so that there is a one logic level signal output from the AND gate 817-1. --.
Col. 29, line 9, after "change", insert -- cycle --;
Col. 29, line 53, after "OR" and before "gate", insert -- - --;
Col. 29, line 67, after "OR" and before "gate", insert -- - --;
Col. 29, line 71, after "OR" and before "gate", insert -- - --.
Col. 30, line 19, after "to a" and before "working", insert -- control network 860 where the 80 volt signal is decreased to a --;

UNITED STATES PATENT OFFICE
CERTIFICATE OF CORRECTION

Patent No. 3,590,463            Dated July 6, 1971

Inventor(s) Robert K. Burroughs and Timothy A. Wakefield

It is certified that error appears in the above-identified patent and that said Letters Patent are hereby corrected as shown below:

Col. 30, line 69, after "branches", change "of" to -- or --.
Col. 33, line 56, after "position", insert -- in --;
Col. 33, line 74, after "ER-1 is", insert -- a --.
Col. 34, line 41, after "being moved to", insert -- a position in which the X' slide control stylus is moved to --;
Col. 34, line 75, after "A14" and before "FIGS. 47", insert -- ( --.
Col. 36, line 54, after "TCRX-2", insert -- lead 885 --.
Col. 39, line 73, change "when" to -- When --.
Col. 40, line 71, after "energized", change "a nd" to -- and --.
Col. 41, line 41, delete "Upon" and change "movement" to -- Movement --.
Col. 44, line 9, change "rest" to -- reset --;
Col. 44, line 24, after "then", change "supplied" to -- supplies --.
Col. 46, line 24, change "and" to -- AND --;
Col. 46, line 36, change "supplied" to -- supplies --;
Col. 46, lines 42 and 43, delete "When this occurs, the output of the inverter 940 goes to the zero logic level.",
Col. 46, line 54, change "supplied" to -- supplies --.
Col. 47, line 26, change "gain" to -- again --;
Col. 47, line 31, change "sorted" to -- stored --;
Col. 47, line 62, change "38" to -- 34 --;
Col. 47, line 62, change "X40" to -- X' --.
Col. 48, line 20, change "slid" to -- slide --;
Col. 48, line 52, change "X40" to -- X' --.
Col. 49, line 66, after "cross slide or X'" and before "33", insert -- slide --.
Col. 51, line 26, change "cool" to -- tool --;

UNITED STATES PATENT OFFICE
CERTIFICATE OF CORRECTION

Patent No. 3,590,463　　　　　　　　Dated July 6, 1971

Inventor(s) Robert K. Burroughs and Timothy A. Wakefield

It is certified that error appears in the above-identified patent and that said Letters Patent are hereby corrected as shown below:

Col. 51, line 40, change "movable" to -- movably --.
Col. 52, line 35, change "aid" to -- said --;
Col. 52, line 67, change "movable" to -- movably --;
Col. 52, line 69, change "took" to -- tool --.

Signed and sealed this 22nd day of February 1972.

(SEAL)
Attest:

EDWARD M. FLETCHER, JR.　　　　ROBERT GOTTSCHALK
Attesting Officer　　　　　　　　Commissioner of Patents